(12) United States Patent
Son et al.

(10) Patent No.: US 11,442,535 B2
(45) Date of Patent: Sep. 13, 2022

(54) SYSTEMS AND METHODS FOR REGION OF INTEREST ESTIMATION FOR VIRTUAL REALITY

(71) Applicant: PCMS Holdings, Inc., Wilmington, DE (US)

(72) Inventors: JuHyung Son, Uiwang-si (KR); Jin Sam Kwak, Gyeonggi-do (KR); Hyun Oh Oh, Seoul (KR)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 17/285,065

(22) PCT Filed: Oct. 17, 2019

(86) PCT No.: PCT/US2019/056793
§ 371 (c)(1),
(2) Date: Apr. 13, 2021

(87) PCT Pub. No.: WO2020/086380
PCT Pub. Date: Apr. 30, 2020

(65) Prior Publication Data
US 2021/0349528 A1 Nov. 11, 2021

Related U.S. Application Data

(60) Provisional application No. 62/750,024, filed on Oct. 24, 2018.

(51) Int. Cl.
*G06F 3/01* (2006.01)
*G02B 27/00* (2006.01)
(Continued)

(52) U.S. Cl.
CPC .......... *G06F 3/012* (2013.01); *G02B 27/0093* (2013.01); *G02B 27/017* (2013.01);
(Continued)

(58) Field of Classification Search
CPC ........ G02B 2027/0187; G02B 27/0093; G02B 27/017; G02B 27/0179; G06F 3/012; G06F 3/013; G06F 3/017; G06T 13/40
See application file for complete search history.

(56) References Cited

U.S. PATENT DOCUMENTS 10,258,259 B1 * 4/2019 Zets .................... A61H 5/00
2011/0128223 A1 * 6/2011 Lashina ................ G06F 3/012
345/158

(Continued)

FOREIGN PATENT DOCUMENTS

CN 106993181 A 7/2017
WO 2017024177 A1 2/2017
WO 2018086399 A1 5/2018

OTHER PUBLICATIONS

International Search Report and Written Opinion of the International Searching Authority for PCT/US2019/056793, dated Mar. 25, 2020, 11 pages.

(Continued)

*Primary Examiner* — Dmitriy Bolotin
(74) *Attorney, Agent, or Firm* — Invention Mine LLC

(57) ABSTRACT

Systems and methods are described for estimating a direction of interest of a user. In some embodiments, a method of estimating a direction of interest of a user includes tracking a head orientation of the user, detecting a shift in the head orientation, determining a head rotation rate during the shift in the head orientation, and estimating the direction of interest of the user based at least in part on the head rotation rate.

20 Claims, 47 Drawing Sheets

(51) Int. Cl.
*G02B 27/01* (2006.01)
*G06T 13/40* (2011.01)
(52) U.S. Cl.
CPC ......... *G02B 27/0179* (2013.01); *G06F 3/013* (2013.01); *G06T 13/40* (2013.01); *G02B 2027/0187* (2013.01)

(56) References Cited

U.S. PATENT DOCUMENTS

| | | | |
|---|---|---|---|
| 2012/0069301 | A1 | 3/2012 | Hirata |
| 2015/0235432 | A1 | 8/2015 | Bronder |
| 2017/0092235 | A1 | 3/2017 | Osman |
| 2017/0160518 | A1 | 6/2017 | Lanman |
| 2017/0285736 | A1 | 10/2017 | Young |
| 2019/0232113 | A1* | 8/2019 | Zets ................ A63B 24/0075 |
| 2019/0355325 | A1 | 11/2019 | Xu |
| 2020/0225473 | A1* | 7/2020 | Selan ................ G02B 27/0172 |
| 2020/0233487 | A1* | 7/2020 | Grzesiak ................ G06F 3/017 |
| 2020/0265649 | A1* | 8/2020 | Chaurasia ................ G06F 3/013 |
| 2021/0349528 | A1* | 11/2021 | Son ................ G02B 27/017 |
| 2021/0373325 | A1* | 12/2021 | Petersen ................ G01S 17/58 |
| 2021/0402551 | A1* | 12/2021 | Xu ................ B24B 37/013 |

OTHER PUBLICATIONS

Tobii Gaming, "Introducing the Eye Tracking VR Devkit for HTC Vive", May 30, 2017, available at: https://blog.tobii.com/eye-tracking-vr-devkit-for-htc-vive-311cbca952df.

Wikipedia, "Eye Tracking". Wikipedia web article, edited on Oct. 14, 2018, retrieved from: https://en.wikipedia.org/w/index.php?title=Eye_tracking&oldid=863948216.

TobiiPro, "Tobii Pro VR Integration". Tobii.com Web Archive dated Sep. 8, 2018, retrieved from: https://web.archive.org/web/20180908212001/https://www.tobiipro.com/product-listing/vr-integration/, 10 pages.

Fang, Yu, et al., "Eye-Head Coordination for Visual Cognitive Processing". PLOS One, vol. 10, No. 3, Mar. 23, 2015, pp. 1-17.

Rosengart, Michael, "Basic Assessments and Movement Evaluations for Runners". PrehabExercises.com, Improving Movement, Sep. 26, 2016, , retrieved from Web Archive https://web.archive.org/web/20171026141355/https://www.prehabexercises.com/basic-assessments-and-movement-evaluations-for-runners, 35 pages.

Montenegro, Juan Manuel Fernandez, et. al., "Gaze Estimation Using EEG Signals for HCI in Augmented and Virtual Reality Headsets". 23rd International Conference on Pattern Recognition (ICPR), (2016), pp. 1159-1164.

Vlachos, A. "Advanced VR Rendering Performance" Game Developers Conference 2016 available at https://www.gdcvault.com/play/1023134/Advanced-VR-Rendering (52 pages).

http://www.aglass.com/ XR Eye Movement Series—Bejing Qixin Yiwei Information Technology Co., Ltd. retrieved Apr. 13, 2021 (2 pages).

Proudlock, Frank Antony, et. al., "Physiology and Pathology of Eye-Head Coordination". Progress in Retinal and Eye Research, vol. 26, No. 5, 2007, pp. 486-515 (30 pages).

\* cited by examiner

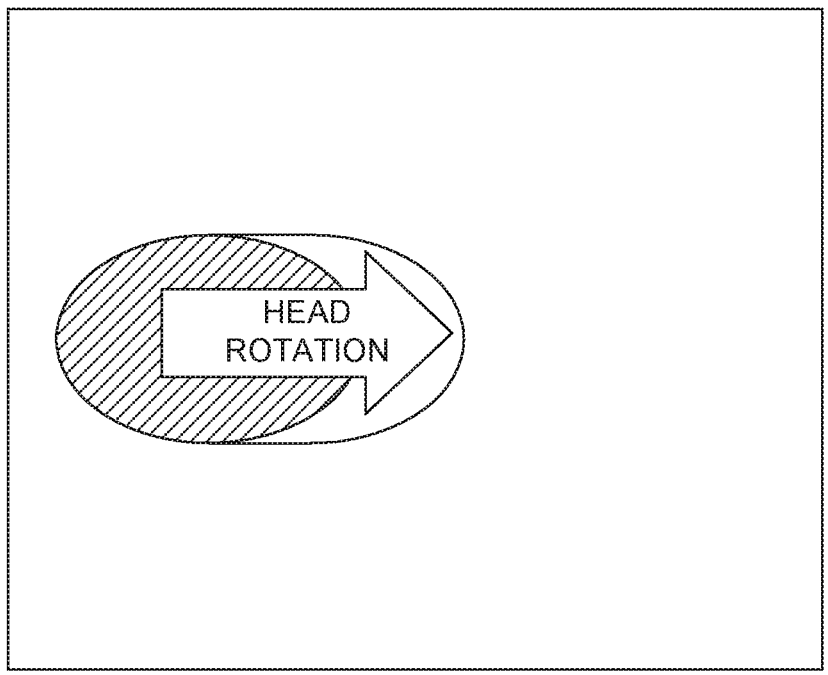
 ESTIMATED GAZE RANGE
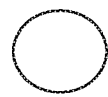 EXTENDED HIGH-RESOLUTION REGION
FIG. 37

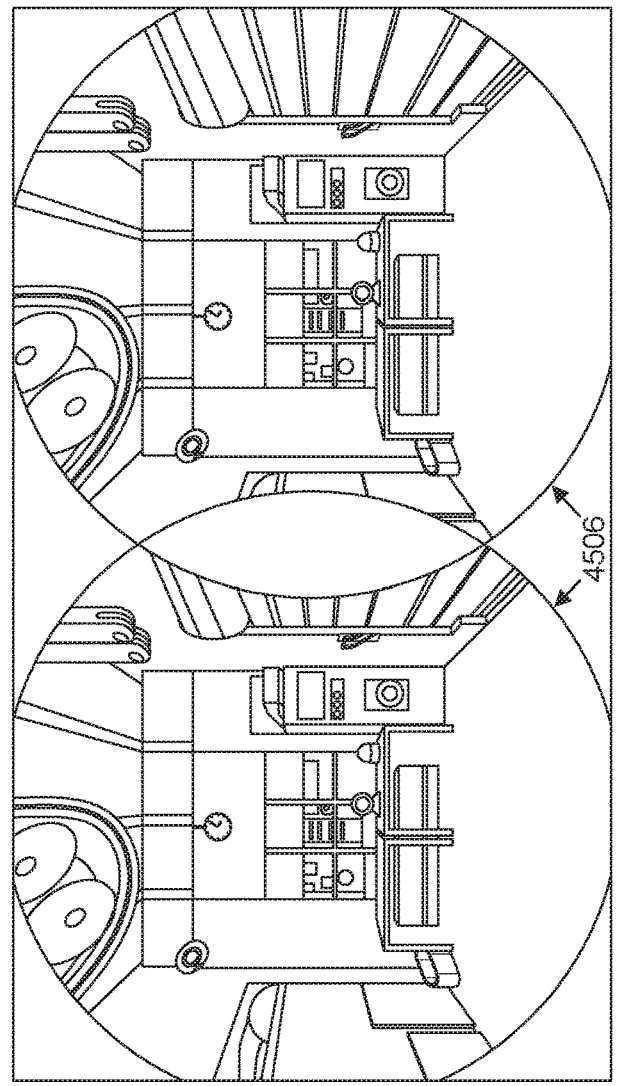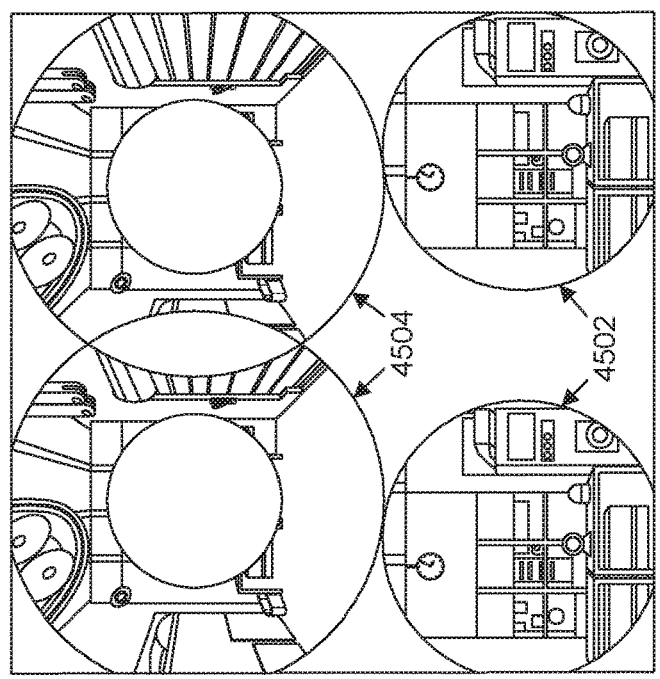
FIG. 45

SYSTEMS AND METHODS FOR REGION OF INTEREST ESTIMATION FOR VIRTUAL REALITY

CROSS-REFERENCE TO RELATED APPLICATIONS

The present application is a national stage application under 35 U.S.C. § 371 of International Application No. PCT/US2019/056793, entitled "SYSTEMS AND METHODS FOR REGION OF INTEREST ESTIMATION FOR VIRTUAL REALITY," filed on Oct. 17, 2019, which claims benefit under 35 U.S.C. § 119(e) from U.S. Provisional Patent Application No. 62/750,024 (filed Oct. 24, 2018), entitled "SYSTEMS AND METHODS FOR REGION OF INTEREST ESTIMATION FOR VIRTUAL REALITY," all of which are incorporated herein by reference in their entirety.

BACKGROUND

Virtual reality (VR) systems aim to provide a high level of immersion to users. As part of that effort, VR systems may generate high frames per second (FPS) and high-resolution images to generate natural appearing video and present it to the user in real-time. However, higher resolution and FPS may call for more computing power. Because a more powerful processor may generally be required to provide high quality images in real time, requirements for VR content servers are generally increasing day by day. These kinds of efforts to provide users with high quality contents may result in higher prices of VR contents and lower accessibility to the user.

Foveated rendering is a technique that adjusts the resolution of VR contents in order to reduce the computing power generally required to make VR contents. Foveated rendering may involve the application of high-resolution rendering to only particular areas of an image, e.g., areas of interest to the user. It may be especially useful, for example, to identify where a users gaze is directed. However, in order to identify the user's point of interest in the image, a VR system with foveated rendering may typically call for special eye tracking hardware within the head mounted display (HMD), which can incur additional cost.

Foveated rendering may be employed to reduce rendering overhead, e.g. by applying higher resolutions to areas where the user is actually paying attention and/or by using relatively low-resolution for relatively low-perceivable (e.g. peripheral) areas. In order for the VR system to perform effective foveated rendering, it may be helpful to identify the user's region of interest (ROI). This is because if low-resolution rendered areas appear in the user's ROI, the user's perceived performance or, e.g., subjective VR experience, may be degraded. Two types of foveated rendering include fixed foveated rendering and foveated rendering using eye tracking. Each type may use various different methods to estimate the user's ROI.

FIG. 45 depicts an example of fixed foveated rendering. Fixed foveated rendering assumes that the area that user has interest is the center of the screen. Therefore, this method applies high-resolution only to the center part of the image. The example in FIG. 45 illustrates separating the center 4502 from the periphery 4504 for an image (e.g. VR image 4506) in order to apply the fixed foveated rendering. In the example of fixed foveated rendering, the center may be assumed to be the area of interest of the user. FIG. 46 illustrates radial density masking, a method used in foveated rendering. In the example, all pixels on the high-resolution center area are rendered, but only half of the pixels on the low-resolution periphery area are rendered. For example, a renderer may skip rendering a checker pattern of 2×2 pixel quads (e.g., to match some example GPU architectures). As shown in FIG. 47, an example VR system may reconstruct the information of the empty (e.g., not rendered) pixels in the low-resolution area by combining information of the rendered pixels.

Unlike the fixed foveated rendering described above, an example foveated rendering method using eye tracking identifies the user's ROI by directly observing the user's eyes. The example system applies high-resolution to the important area (e.g., around the user's gaze point) and applies low-resolution to the other area. One reason for using eye-tracking to directly identify the area of interest is that an assumption of fixed foveated rendering, that the user is watching the center of the screen, is likely to collapse from time to time (or often). This is a plausible concern, given that a user of VR content is likely to actively move his eyes and rotate his head to observe the surroundings.

Table 1 lists, as an example, specifications of the Tobii Pro VR, an example eye-tracking system integrated into an HMD (retrieved from https://wws.tobiipro.com/product-listing/vr-integration/).

TABLE 1

Specifications of Example Eye-tracking System

| | |
|---|---|
| Gaze data output frequency (binocular) | 120 Hz |
| Preliminary accuracy | 0.5° |
| Calibration procedure | 5 point |
| Trackable field of view | 1100 (Full HTC Vive field of view) |
| Slippage compensation | Yes |
| Latency | Approximately 10 ms (time from mid exposure to data available on client interface) |
| Pupil measurement | Yes, relative pupil size |
| Tracking technique | Binocular dark pupil tracking |
| Data output (for each eye) | Timestamp (device and system) Gaze origin Gaze direction Pupil position Relative pupil size |
| Interface | Tobii Pro SDK (.Net/Matlab/Python/C) |
| 3D engine compatibility | Unity |

For example, eye-tracking may be integrated in a VR system for various applications in addition to foveated rendering. In applications where the user is represented by an avatar, it may in some cases be desirable for the avatar's eyes to accurately reflect movements of the user's real eyes, for example to provide appropriate social cues. In some applications, gaze information may be used to determine a user's intentions or the user's interest in an object.

To provide a high-quality VR experience, it may be helpful to render VR images with high-resolutions and high FPS. However, generating these high-quality contents on the fly may in some cases call for high-performance graphic rendering capabilities on, e.g., a VR server PC. Foveated rendering is a method that may be used to reduce the rendering overhead while keeping the quality of the contents around the user's gaze point. Foveated rendering may be implemented using eye tracking. However, in order to perform eye tracking, a VR system may in some cases call for additional devices and processing to estimate eye position. Additional processing for the tracking may result in additional delay.

Fixed foveated rendering may generally assume that the center of the image is the user's ROI. This assumption may not always be accurate. If the user watches the periphery of the image, the user may recognize that the resolution of the image is low. In other words, the system consumes more power to render a high-resolution area, but user may watch a low-resolution area and the consumed power is meaninglessly wasted. In addition, the changed resolution of the image expressed in the ROI may be distracting or disorienting to the person using the VR contents.

One method to find a users ROI (region of interest) around his/her fixation point is eye tracking. Eye tracking is the process of measuring either the point of gaze (where one is looking) or the motion of an eye relative to the head. An eye tracker is a device for measuring eye positions and eye movement. There are a number of methods for measuring eye movement. One method to extract eye position includes using video images. However, such a method may in some cases call for a set of hardware such as cameras and LED light sources, which generally makes HMD expensive and have a large form factor (large footprint). Some methods to extract eye position may be too slow for VR applications.

SUMMARY

Systems and methods are described for estimating a users gaze direction. The estimated gaze direction may be used to provide VR content with foveated rendering. In some embodiments a user's eye fixation points are predicted by utilizing the relationship between the user's head movement and a gaze movement of the user. In some embodiments, a VR system may apply high-resolution rendering only to the user's area of interest without eye tracking equipment, so that the system can reduce the rendering overhead without any additional hardware. Some embodiments utilize sensors such as inertial measurement units (IMUs).

An example method in accordance with some embodiments may include: tracking a head orientation of a user; detecting a shift in the head orientation of the user; determining a head rotation rate of the user during the shift in the head orientation; determining a user-specific parameter relating the head rotation rate to at least one of a gaze direction or a direction of interest; and estimating the at least one of the gaze direction or the direction of interest based at least in part on the user-specific parameter and the head rotation rate.

For some embodiments of the example method, tracking the head orientation may be performed using an inertial measurement unit.

For some embodiments of the example method, detecting the shift in the head orientation may include detecting that an angular acceleration of the users head exceeds a predetermined threshold.

For some embodiments of the example method, determining the head rotation rate may include determining a maximum head rotation rate.

For some embodiments of the example method, determining the head rotation rate may include determining a difference between a maximum head rotation rate during the shift in head orientation and an initial head rotation rate measured prior to the shift in head orientation.

For some embodiments of the example method, determining the user-specific parameter may include: determining a predicted change in gaze direction; and determining the user-specific parameter by comparing the head rotation rate to the predicted change in gaze direction.

Some embodiments of the example method may further include: directing the user to shift gaze from a first region of interest on a display to a second region of interest on the display, wherein the predicted change in gaze direction is equivalent to an angular distance between the first region of interest and the second region of interest on the display.

For some embodiments of the example method, directing the user to shift gaze from the first region of interest on the display to the second region of interest on the display may include generating, at the display, a virtual object at a location on the display associated with the second region of interest.

For some embodiments of the example method, determining the predicted change in gaze direction may include determining a predicted change in gaze direction based at least in part on metadata particular to content being shown to the user on the display.

For some embodiments of the example method, determining the user-specific parameter may include: in a training mode, determining an initial value of the user-specific parameter; and in a service mode, updating the initial value of the user-specific parameter based at least in part on the metadata particular to content being shown to the user on the display.

Some embodiments of the example method may further include adjusting the user-specific parameter based on a direction of the user's head rotation.

Some embodiments of the example method may further include adjusting the user-specific parameter based on a position of the head relative to a neutral position.

For some embodiments of the example method, estimating the at least one of the gaze direction or the direction of interest may include calculating a change in direction by multiplying the head orientation rate by the user-specific parameter.

For some embodiments of the example method, estimating the at least one of the gaze direction or the direction of interest may further include estimating the gaze direction by: identifying an initial gaze direction; and adding the estimated change in direction to the initial gaze direction.

Some embodiments of the example method may further include determining that the head rotation rate is substantially constant for a time period during the shift in head orientation; and wherein estimating the gaze direction may further include adding an offset to the estimated change in direction and the initial gaze direction.

For some embodiments of the example method, estimating the at least one of the gaze direction or the direction of interest may further include estimating the direction of interest by: identifying an initial direction of interest; and adding the estimated change in direction to the initial direction of interest.

Some embodiments of the example method may further include: determining that the head rotation rate is substantially constant for a time period during the shift in head orientation; and wherein estimating the direction of interest may further include adding an offset to the estimated change in direction and the initial direction of interest.

Some embodiments of the example method may further include, in response to a determination that an angular acceleration of the user's head is decreasing, holding the at least one of the gaze direction or the direction of interest at a substantially constant value.

Some embodiments of the example method may further include rendering, at a display of an HMD, a first region having a first resolution and a second region having a second resolution, wherein the first resolution is greater than the second resolution, and wherein the first region corresponds to the at least one of the gaze direction or the direction of interest.

Some embodiments of the example method may further include rendering, at a display of an HMD, an image for the user using foveated rendering based on the at least one of the estimated gaze direction or the estimated direction of interest.

Some embodiments of the example method may further include rendering an image for the user using foveated rendering, with a portion of the image toward the at least one of the estimated gaze direction or the estimated direction of interest being rendered with higher quality than a portion of the image away from the at least one of the estimated gaze direction or the estimated direction of interest.

Some embodiments of the example method may further include animating an avatar of the user using the at least one of the estimated gaze direction or the estimated direction of interest as an avatar eye direction.

Some embodiments of the example method may further include determining user interest in an object based on the at least one of the estimated gaze direction or the estimated direction of interest.

An example apparatus in accordance with some embodiments may include a processor and a non-transitory computer-readable medium storing instructions operative, when executed on the processor, to perform any of the example methods listed above.

An example method of estimating a direction of interest of a user in accordance with some embodiments may include: tracking a head orientation of the user; detecting a shift in the head orientation; determining a head rotation rate during the shift in head orientation; and estimating the direction of interest of the user based at least in part on the head rotation rate.

An example apparatus in accordance with some embodiments may include a processor and a non-transitory computer-readable medium storing instructions operative, when executed on the processor, to perform the method listed above.

An example method performed at least in part by a head-mounted display (HMD) configured to be worn by a user in accordance with some embodiments may include: tracking a head orientation of the user; detecting a shift in the head orientation; determining a head rotation rate during the shift in head orientation; determining a user-specific parameter relating head rotation rate to at least one of a gaze direction or a direction of interest; estimating the at least one of the gaze direction or the direction of interest based at least in part on the user-specific parameter and the head rotation rate; and rendering an image for the user at the HMD using foveated rendering based on the at least one of the gaze direction or the direction of interest.

For some embodiments, the example method may further include determining a position on a display of the HMD using the at least one of the gaze direction or the direction of interest; and rendering the image at the determined position on the display using foveated rendering.

Another example apparatus in accordance with some embodiments may include a processor and a non-transitory computer-readable medium storing instructions operative, when executed on the processor, to perform any of the example methods list above.

BRIEF DESCRIPTION OF THE DRAWINGS

FIG. 37 depicts high-resolution region extension into the direction of head rotation, in accordance with some embodiments.

FIG. 45 depicts an example of fixed foveated rendering.

EXAMPLE NETWORKS FOR IMPLEMENTATION OF THE EMBODIMENTS

Figure 1A:
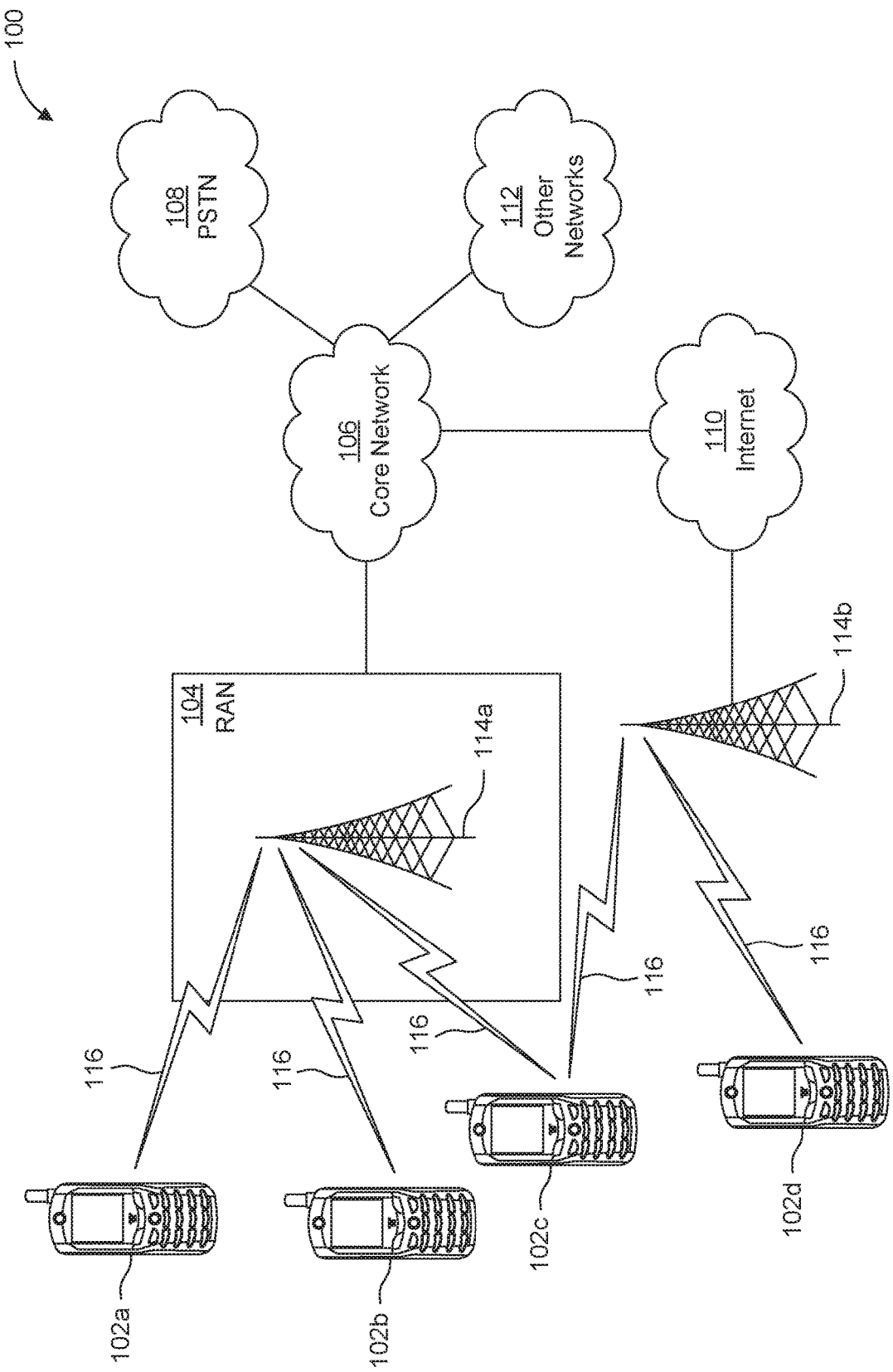
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (loT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
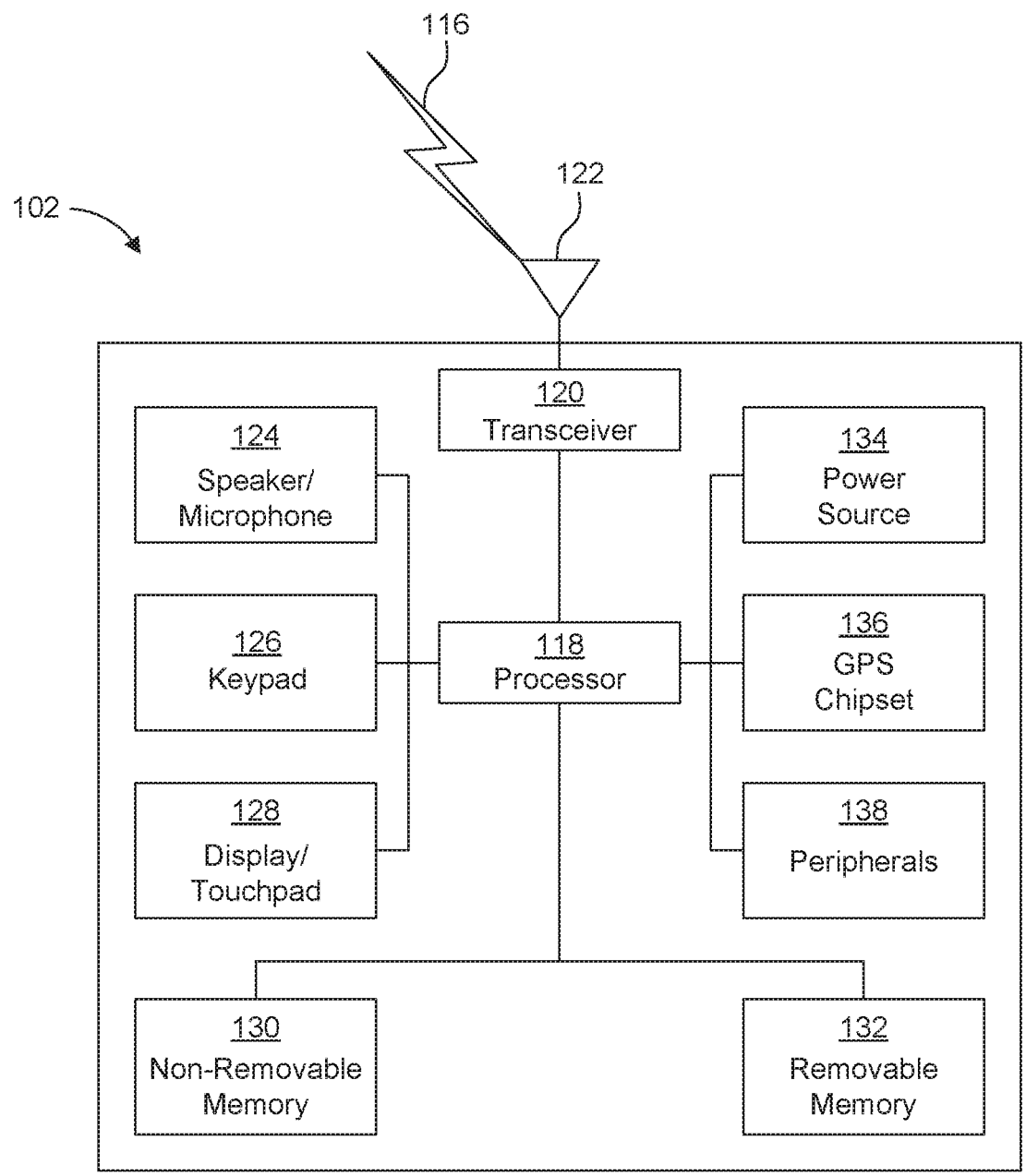
FIG. 1B is a system diagram illustrating an example wireless transmit/receive unit (WTRU) that may be used within the communications system illustrated in FIG. 1A according to an embodiment.
Figure 1C:
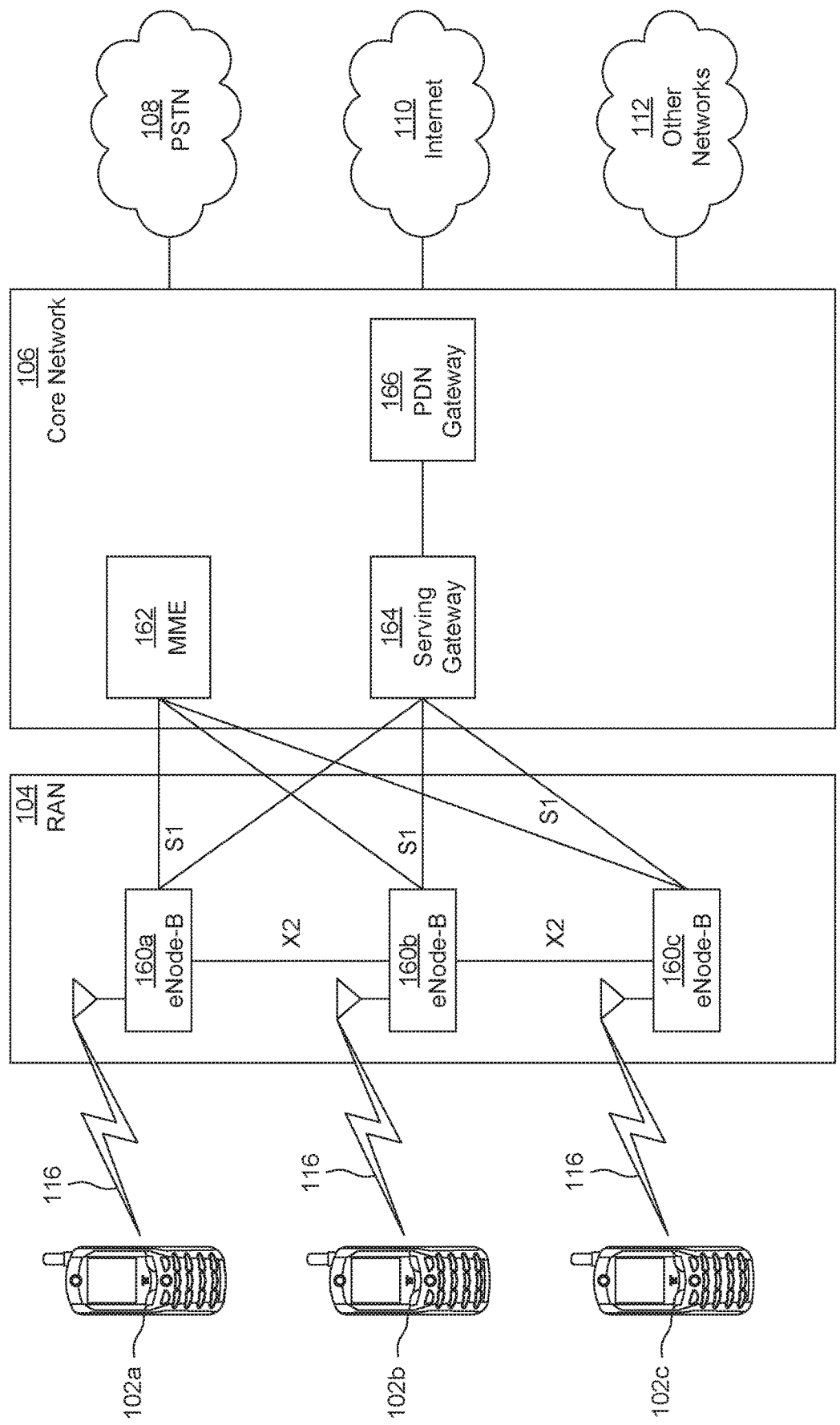
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
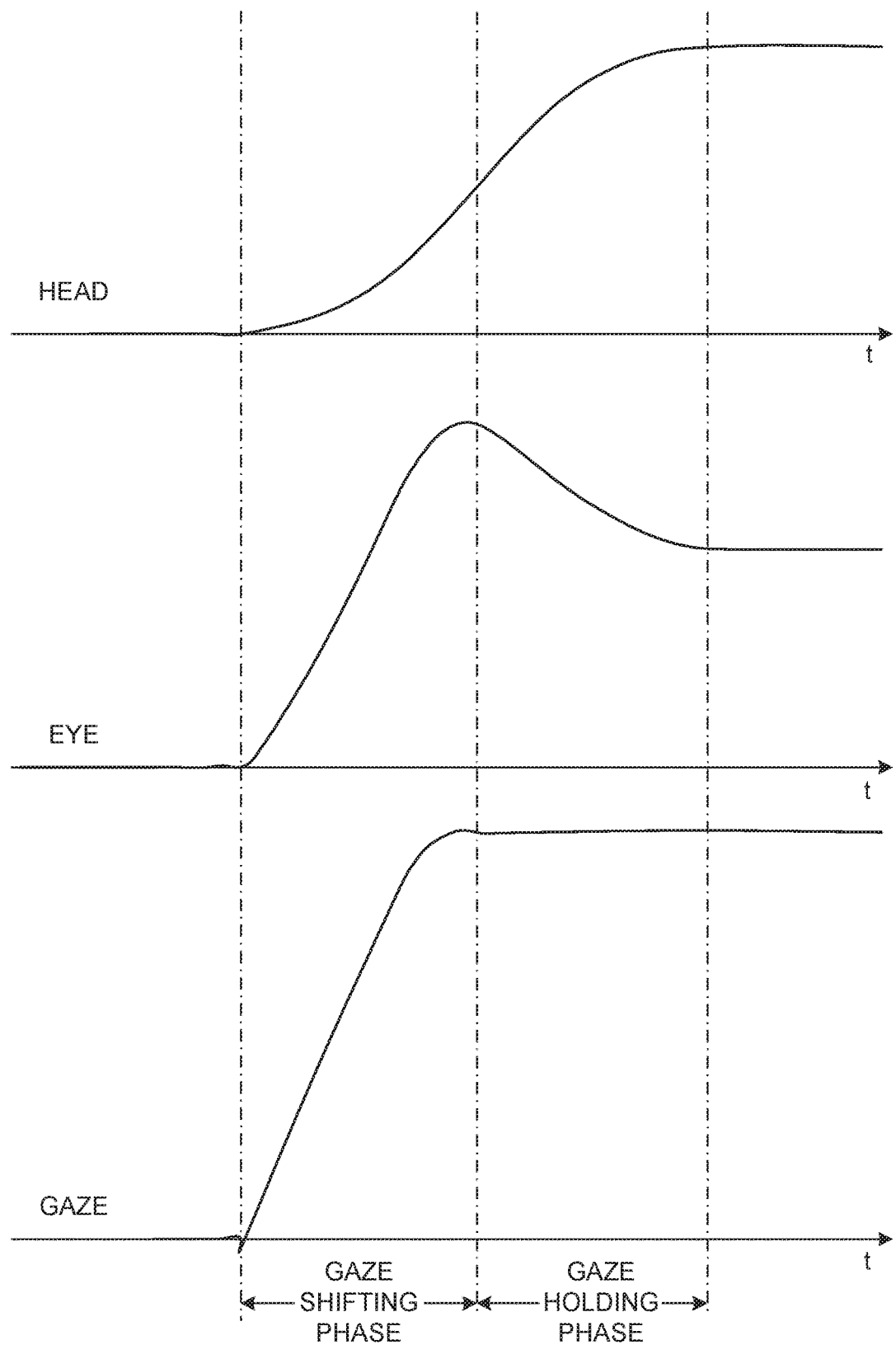
FIG. 10 illustrates a gaze shifting phase and a gaze holding phase for eye-head movement induced by a shift in gaze, in accordance with some embodiments.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
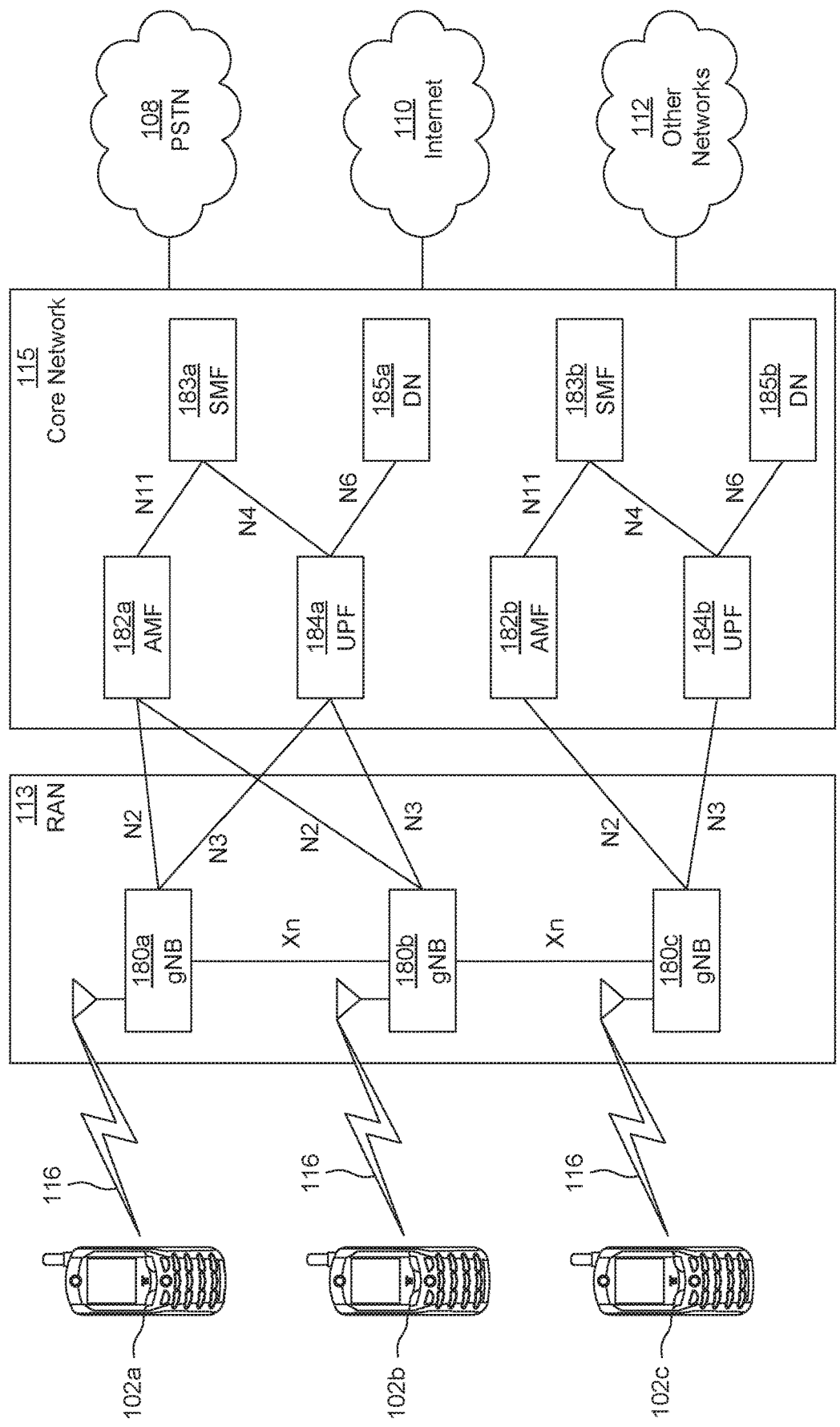
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N 3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

In some embodiments, a user's region of interest (ROI) is estimated using sensor data of the inertial measurement unit(s) (IMUs) of an HMD. The area to which high-resolution rendering is applied may then be determined. In some embodiments, the user's gaze angle may be estimated using information such as head orientation and peak rotation speed.

Figure 2:
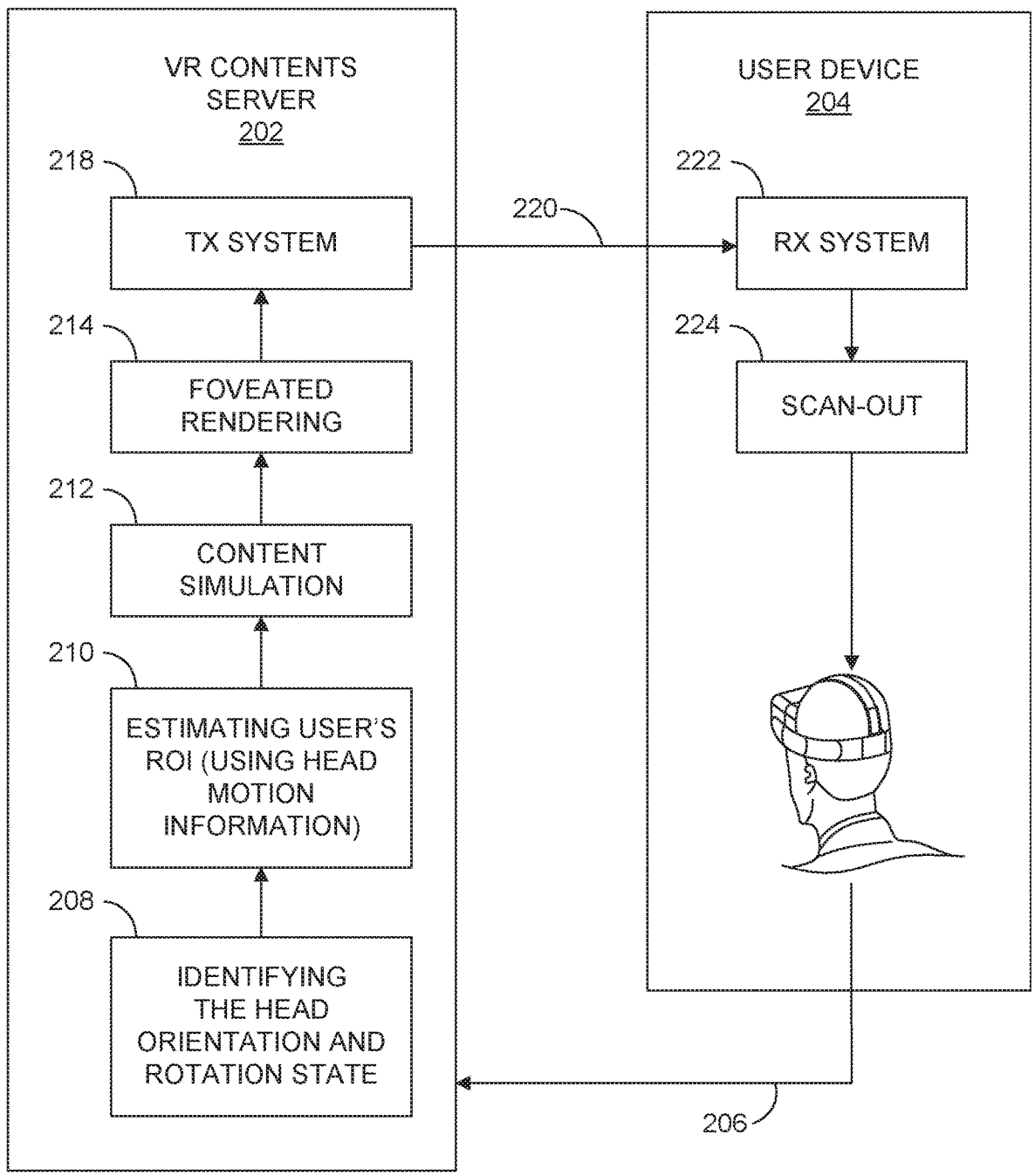
FIG. 2 is a flow diagram of an example method of producing foveated rendered images of VR contents, in accordance with some embodiments.

FIG. 2 is a flow diagram of an example method of producing foveated rendered images of VR contents, in accordance with some embodiments. At 206, VR contents server 202 receives feedback data 206 (e.g., IMU feedback data 206) received from user device 204. At 208, the users head orientation and/or rotation state are identified, e.g. using the IMU data 206. In some embodiments, IMU data is used to estimate the user's head angle and gaze status. At 210, the user's ROI (e.g. the direction of the user's gaze) is estimated. In some embodiments, the users ROI is estimated based on the user's head orientation and rotation (movement) information.

Figure 3:
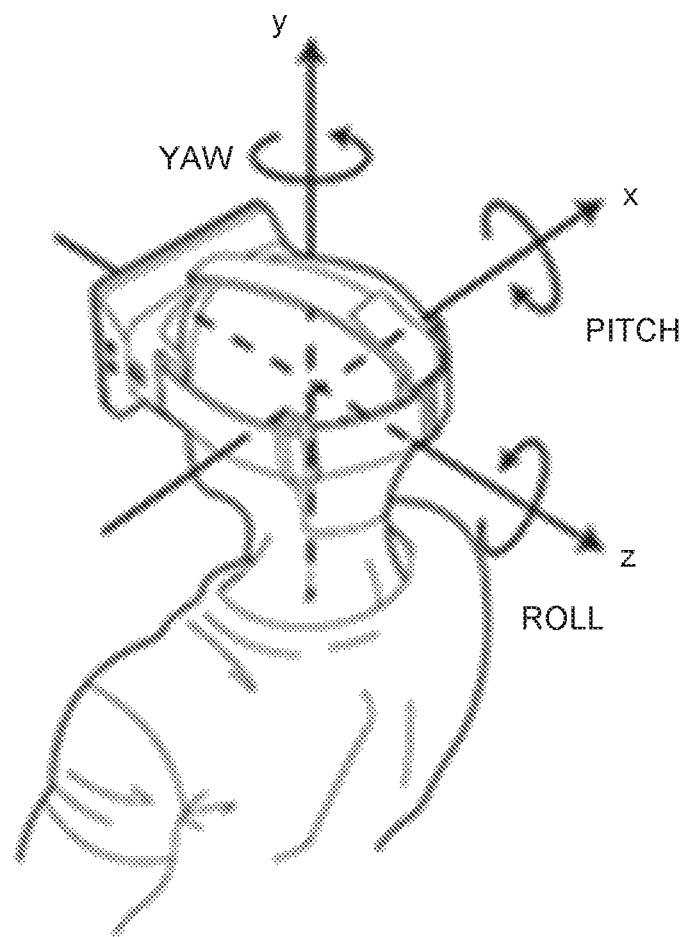
FIG. 3 depicts identified information regarding the orientation and movement states of a user's head, in accordance with some embodiments.

FIG. 3 illustrates as an example information regarding the orientation and movement states of a user's head that may be identified, in accordance with some embodiments. In some embodiments, estimating the direction of the users gaze utilizes a relationship between eye and head movement, such as the eye-head movement relationship identified in many studies. As a result, an estimated ROI location (e.g., gaze angle) corresponding to the user's head peak speed can be determined. Information regarding the orientation and movement states of a users head may be associated with particular axes of rotation. In the example of FIG. 3, axes in x, y, and z directions are identified, corresponding to pitch, yaw, and roll, respectively.

In some embodiments, an orientation of a user's head is identified. Orientation information may include orientation values with regard to one or more axes, e.g. yaw, pitch, and/or roll, in accordance with some embodiments. For example, orientation information may be expressed as the set (yaw, pitch, roll) or a subset thereof.

In some embodiments, angular velocity is identified. Angular velocity information may include angular velocity values with regard to one or more axes, e.g. $V_{yaw}$, $V_{pitch}$, and/or $V_{roll}$. For example, angular velocity information may be expressed as the set ($V_{yaw}$, $V_{pitch}$, $V_{roll}$) or a subset thereof.

In some embodiments, angular acceleration is identified. Angular acceleration information may include angular acceleration values with regard to one or more axes, e.g. $A_{yaw}$, $A_{pitch}$, and/or $A_{roll}$). For example, angular acceleration information may be expressed as the set ($A_{yaw}$, $A_{pitch}$, and/or $A_{roll}$) or a subset thereof.

Figure 4:
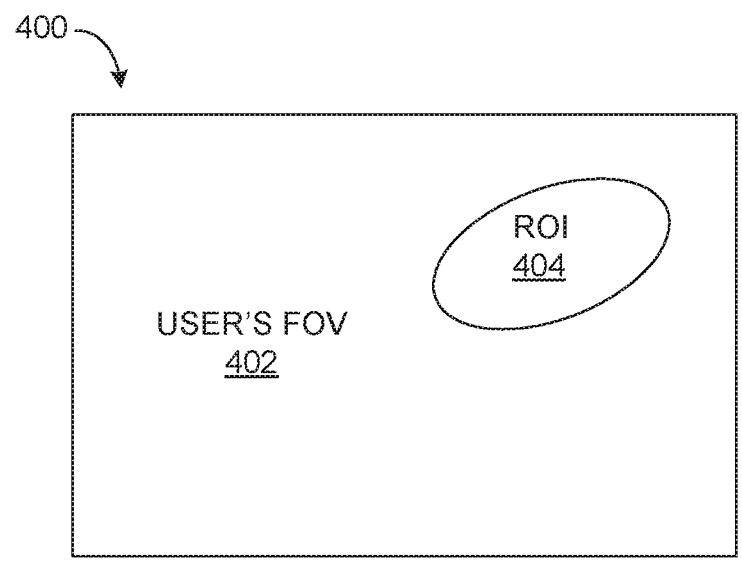
FIG. 4 illustrates the estimation of a user's region of interest (ROI) using head movement state information, in accordance with some embodiments.

FIG. 4 illustrates an example estimation of a user's region of interest (ROI) using head movement state information in accordance with some embodiments. In the scenario 400, a portion of the users total field of view (FOV) 402 is estimated to be the user's ROI 404.

The example method shown in FIG. 2 also includes, at 212, performing contents simulation and creating a service image by rendering the area of the user's FOV, e.g., according to the head orientation. At 214, the VR contents server performs foveated rendering by applying high-resolution only to the pixels corresponding to an area estimated as an ROI of the user. At 220, the method shown in FIG. 2 includes sending foveated rendered images (e.g. VR contents) from VR contents server 202 to user device 204. Foveated rendered images may be sent, for example, by transmit (TX) system 218 to receive (RX) system 222. The method may further include, at 224, scanning out the image on the user device.

Figure 5:
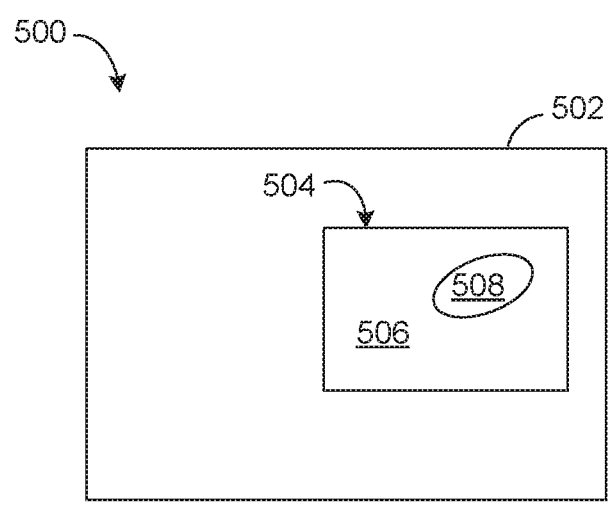
FIG. 5 depicts a foveated rendering region and the applied resolutions in a VR display, in accordance with some embodiments.

FIG. 5 depicts a foveated rendering region and the applied resolutions in aVR display, in accordance with some embodiments. In the example, a virtual world 502 contains a rendering region 504. The rendering region 504 may correspond to a VR view displayed to a user on a head mounted display (HMD). The rendering region 504 contains a low-resolution region 506 and a high-resolution region 508. The region rendered in high-resolution 506 may be determined by estimating the region of interest (ROI) of the user, as described herein.

In some embodiments, dynamic foveated rendering is provided to an HMD without using an eye-tracker. Some embodiments operate to estimate the user's ROI quickly in order to perform foveated rendering without, e.g., the need to detect eye-position.

In some embodiments, eye position is detected and social cues are determined for games and VR apps. The determination of social cues may provide value to many VR applications.

In some embodiments, the user's ROI is estimated before the user's gaze movement is completed. As supported by experiment, the gaze shift of a user may be anticipated by approximately 200 to 250 ms. In some embodiments, this lead time is utilized to secure more time for rendering VR images of VR systems, which may be very sensitive to latency.

In some embodiments, a users head movement may be evaluated based on head speed. A gaze shifting phase and a gaze holding phase may be determined based on the user's head acceleration. In some embodiments the user's ROI is updated, e.g., only in the gaze shifting phase. It may be noted that changes in the head orientation that occur during the gaze holding phase may not affect the user's ROI change, but may change the position of the high-resolution area of the frame to be rendered.

In some embodiments, the estimated ROI is continually updated based on the maximum velocity of the head during a single gaze shifting phase and the initial head orientation at the gaze shifting phase. A gaze shifting angle may be determined and may be proportionally related to the maximum velocity of the head during head rotation of the user.

In some embodiments, the size of the high-resolution region of the foveated rendering is determined. The determination of the size of the high-resolution region may take into account the user's possible eye movement range without head movements.

Some embodiments provide the ability to estimate a region of interest and provide foveated rendering at a lower cost than using eye-tracking, but with higher accuracy than fixed foveated rendering. Some embodiments estimate a user's ROI by observing the user's head orientation, which may reduce computing power and resource consumption, e.g. compared to that of eye-tracking systems.

For example, example methods for, e.g., estimated user gaze prediction and/or estimated user ROI may replace, e.g., eye tracking and detection functionality in accordance with some example embodiments. Of course, it should be understood, as described herein in accordance with some embodiments, that some combination of, e.g., detected eye position and tracking (e.g., with associated tracking equipment or functionality) and, e.g., estimated user gaze prediction or, e.g., estimated user ROI may be used.

Some embodiments operate to increase the hit ratio of the high-resolution area to the actual user's ROI, which reduces the risk of degradation of user's experience quality due to foveated rendering.

In some embodiments, foveated rendering is provided to HMDs without eye-tracker by using only native IMU sensor data.

Some embodiments operate to predict the user's ROI before the actual gaze movement is completed. In such embodiments, a VR system can determine the user's gaze area in advance and render it with high resolution, effectively reducing latency of the foveated rendering.

Eye-Head Coordination

Figure 6:
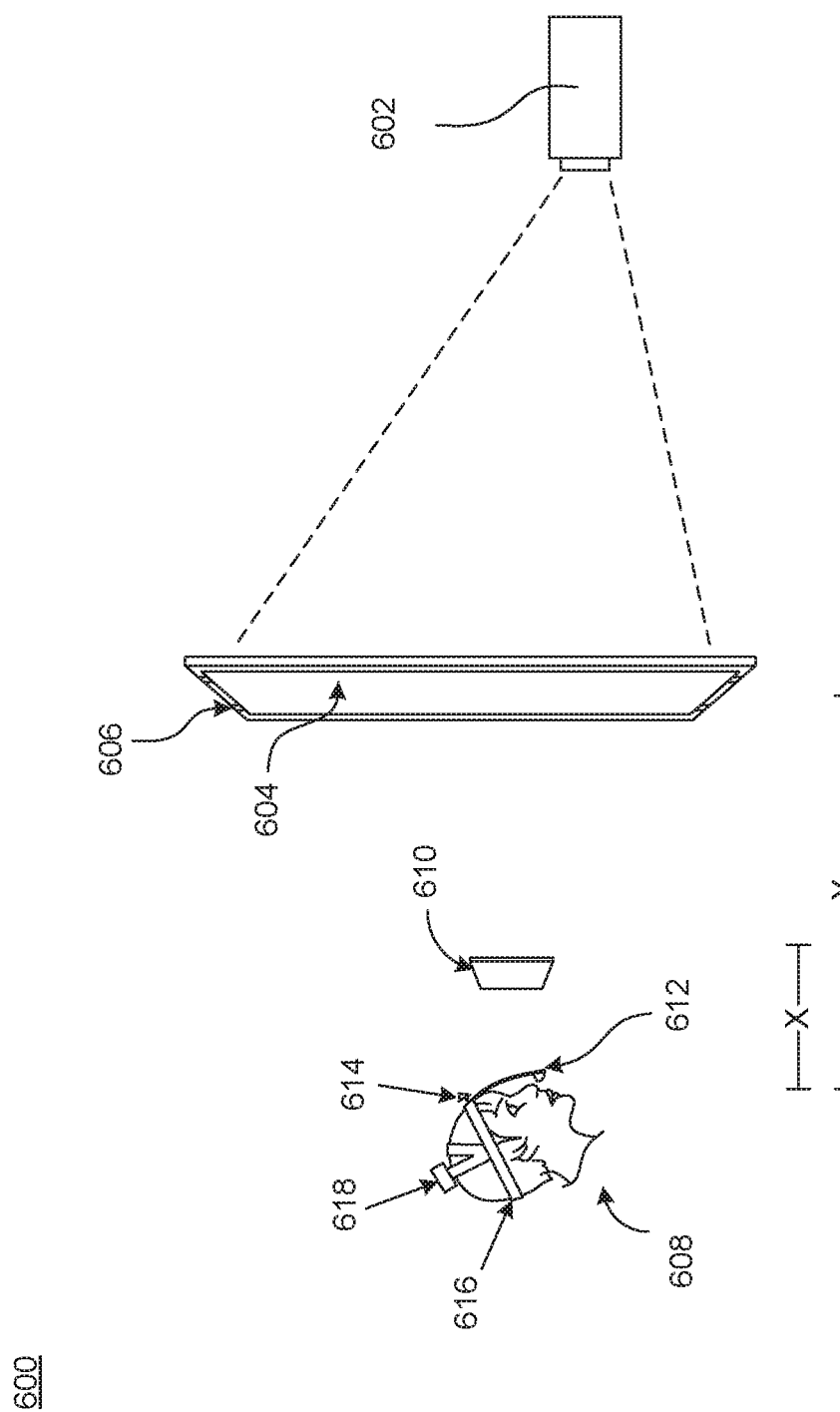
FIG. 6 depicts an example experimental set-up for observing eye-head coordination.

Beyond the limits of the eye with a relatively limited radius of motion, it is understood that the head moves and helps the human to observe a wider range. FIG. 6 depicts an example experimental set-up for observing eye-head coordination, e.g. when a person performs a gaze shift. This figure is adapted from Proudlock, F A, and Gottlob, I. "Physiology and pathology of eye-head coordination." *Progress in Retinal and Eye Research* 26.5 (2007): 486-515. ("Proudlock") In the example scenario 600, video projector 602 projects to a rear-projection screen 604 with infrared markers 606. A user 608 reads from a reading card 610. Eye-head coordination is observed using eye camera 612 and head camera 614. The cameras are fixed to the users head with headband 616. In the example shown in FIG. 6, the user 608 is positioned X meters away from the reading card 610 and Y meters away from the projection screen 602. In the experimental set-up described in Proudlock the distance X corresponds to 0.33M and the distance Y corresponds to 1.2M; of course, however, these are examples and other distances could certainly apply.

Example Factors of ROI Estimation

The following are some example ways in which example factors of, e.g., ROI estimation may be determined, in accordance with some embodiments.

Gaze Angle:

In some embodiments, the relationship between head orientation and gaze angle is used to determine the high-resolution region for foveated rendering. Gaze angle may be determined, e.g., by combining head orientation and eye position, and eye position may be determined (e.g., calculated), e.g., by comparing the difference between gaze angle (estimated, e.g., by peak head speed) and head orientation. In some embodiments, gaze angle is determined based on a relationship between changes in head orientation and predicted gaze change. For example, some embodiments may employ a transfer function to calculate a direction that the user is predicted to be looking based on head orientation information provided by IMU(s) of an HMD.

Head Rotation Acceleration

Another factor of interest is the temporal relationship between head rotation and eye rotation. The rotation angle of the eye and head are adjusted by the user over time while the user's gaze stays at the same position (angle). When a user gazes at an object at a certain angle, the user rotates his head and eye to the same direction in the early stage. At the end stage, the user continues to rotate his head in the gaze direction, but his eyes move in the opposite direction relative to the head. Therefore, in some cases, it may be useful to consider not only the head angle, but also rotation speed changes (angular acceleration) of the head.

Figure 7:
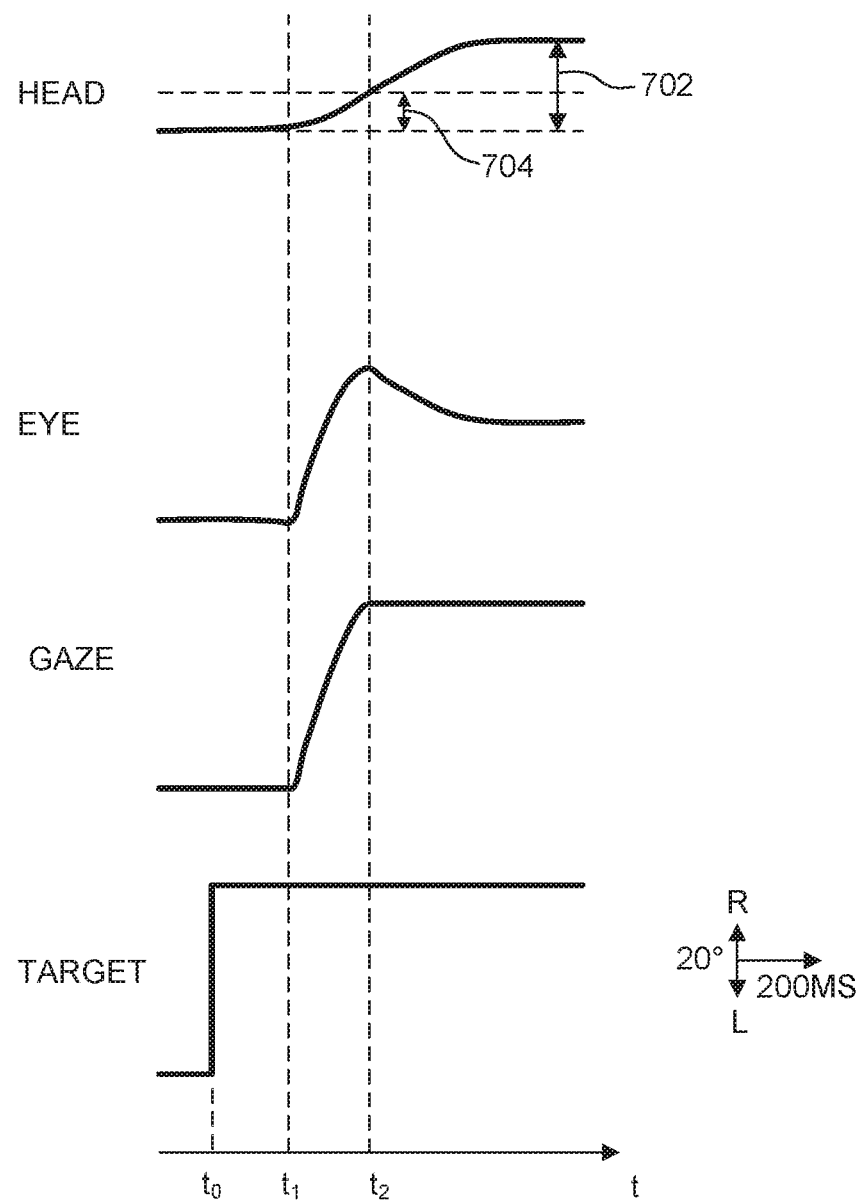
FIG. 7 illustrates an example of the time course of horizontal gaze, eye, and head movements during a coordinated eye-head gaze shift to a target jump of 50°.

FIG. 7 illustrates an example of the time course of horizontal gaze, eye, and head movements during a coordinated eye-head gaze shift to an example target jump of 50°. In the example, the change in orientation for each of the head, eye, gaze, and target are plotted against time. As shown in the figure, increasing values of orientation correspond to movement from left to right, while decreasing values of orientation correspond to movement from right to left. A key provides example distances on the graph corresponding to 200 ms (for the time variable) and 20° (for the rotation variable). At t0, the target moves to a new position by 50° to the right (e.g. from the perspective of a viewer). At $t_1$, the user's gaze beings to shift, e.g. to look at the moved target. The time between $t_1$ and $t_2$ corresponds to the time interval in which the users gaze is shifting, as can be seen by the time course corresponding to gaze. During the gaze shift, the eyes and head both move in the same direction as the gaze. At $t_2$, the head continues to move in the same direction, however its angular acceleration is reversed. Also at $t_2$, the direction of the rotation of the eyes is reversed. The distance 702 corresponds to the total head amplitude (e.g. the total change in orientation of the head), while the distance 704 corresponds to the contribution that the head provides to the user's gaze shift.

FIG. 7 illustrates that the eyes move in the opposite direction to the head rotation during the phase in which the head rotational speed is decreasing. As a result, the user gaze remains fixed during this phase. Therefore, in accordance with example method, it may be useful to not change the estimated ROI (e.g. by maintaining the ROI at substantially the same position in the virtual world) between the time when the direction of the head rotation angular acceleration is reversed and the point when head rotation is finished.

ROI Estimation Rule

Figure 8:
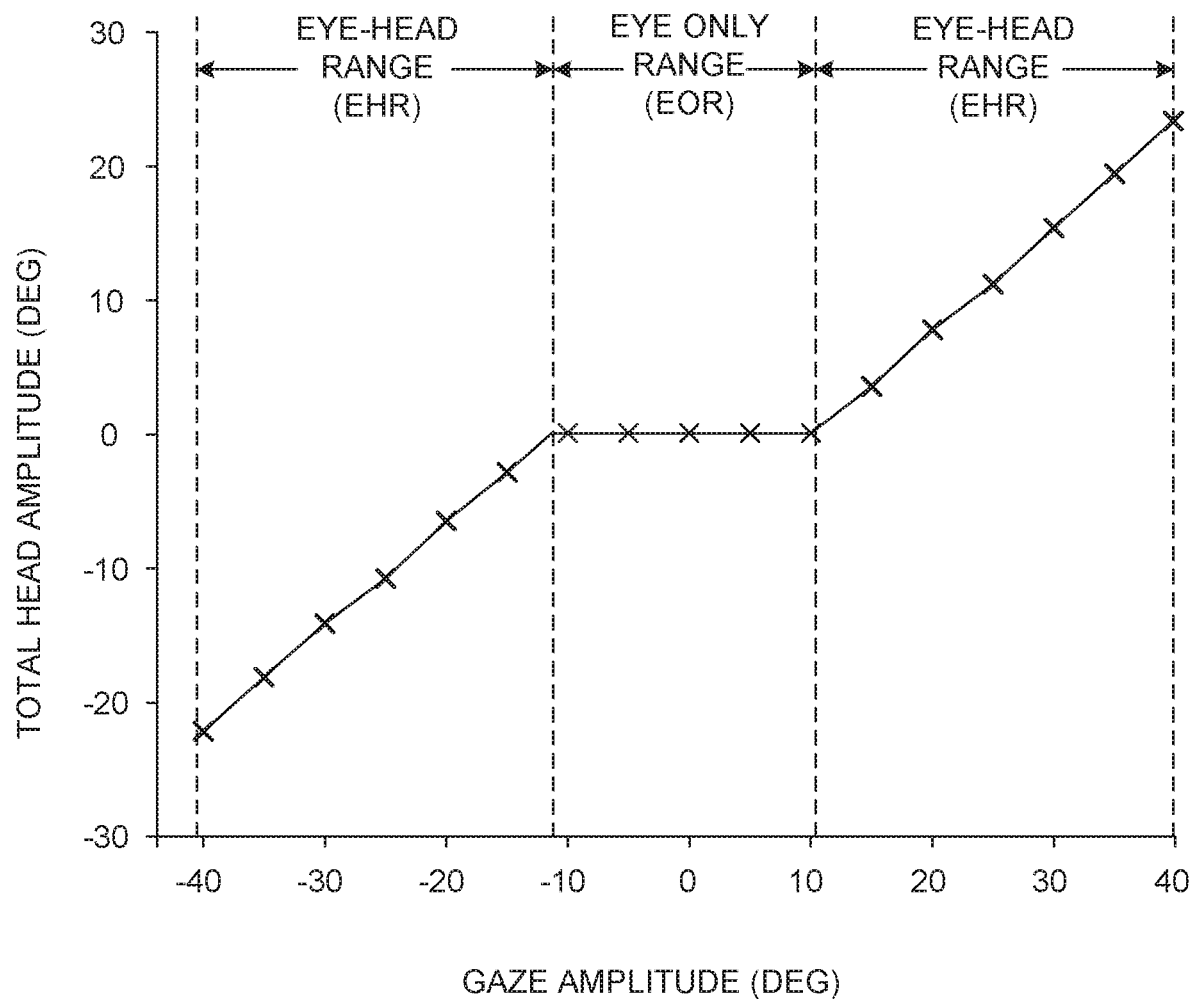
FIG. 8 is a schematic illustration of typical total head movement amplitudes made in response to unexpected horizontal gaze shifts, with both eyes and head commencing from a midline position.

FIG. 8 is a schematic illustration of example observed typical total head movement amplitudes made in response to horizontal gaze shifts, with both eyes and head commencing from a midline position. The figure is adapted from Proudlock, pp. 486-515. As illustrated by the eye-only range (EOR) in the example, if a user shifts his gaze within a certain angle, the user will typically make no head movement. One explanation for a range of head-rotation free gaze changes may be the optimization process in which a person refrains from head movement in order to save energy. Individuals show variability in the width of the eye-only range and the slope of the eye-head range. Regardless of the specific reason for rotation-free phenomenon, it may be useful to consider the range of the head rotation-free gaze changes in the determination of the area selected as the ROI. In some cases, it may be particularly useful to set the ROI to cover more than a certain angle (e.g., at least 20° in the example of FIG. 8). In addition, it may be helpful to apply a different relationship between gaze angle and head orientation relationship for each of the horizontal and vertical directions. In this way, the ROI (e.g. its location and range) may be estimated independently for each direction.

ROI Estimation Error Margin

The estimated ROI, which may be obtained using, e.g., head orientation and peak speed information, may differ from the user's actual ROI. There are many example reasons why there may be such an error. One reason involves a rapid movement of eyes called saccade that may occur as a user performs a scan of the surroundings. Another reason for error may stem from person-to-person variation in the relationship between head and eye movements. This variation may be found because the optimization process for each person's neck and eye movements may vary slightly. In some embodiments, the high-resolution rendering area is set wider to account for saccades and the difference in individual characteristics on the head movement.

Some studies have investigated coordinated movements between the eyes, head, and/or body during a subject's change in gaze. For example, Fang, Yu, et al. "Eye-head coordination for visual cognitive processing." *PloS one* 10.3 (2015): e0121035 ("Fang") provides experimental results of example horizontal eye and head movement trajectories showing the direction of the gaze angle by the subject's head, eyes, body angle and combination of them in the process of freely moving the gaze. The results of the above experiment show evidence of small angle of gaze changes where there is movement of the eyes but no movement of the head. Fang also examines a relationship between head orientation and eye position distribution. The study includes eye position probabilities according to eye-head orientation distribution, as well as eye position probabilities according to head orientation. The distributions of eye position measured for various head orientations display a strong relationship with the head's direction. For example, distributions of eye position for head orientations further from center tend to skew to the same direction away from center. By taking the peak eye position from each distribution and plotting it against the corresponding head orientation, Fang is understood to show that the eye position having the highest probability measured in each head orientation is roughly proportional to the head orientation. The results of Fang are understood to show that when the orientation of the head is approximately at the center point (near 0°), the eye position is observed in a considerably wide range. Thus, even if the exact direction of the head is known, it may be helpful to extend the high-resolution region in consideration of the free movement of the eye, in accordance with some embodiments (as noted in the above section, ROI Estimation Rule).

Some Example Systems and Methods

An example method in accordance with some embodiments is used for estimating the gaze direction of a user (e.g. a user of an HMD) based on the users head movement. In some embodiments, the example method includes tracking the user's head orientation, detecting a shift in the users head orientation, determining a head rotation rate during the shift in head orientation, and predicting the gaze direction of the user based at least in part on the head rotation rate. In some embodiments, predicting the gaze direction of the user may include determining a change in gaze direction. In some embodiments, the determined change in gaze direction may be proportional to a maximum head rotation rate (e.g. during the shift in head rotation). In some embodiments, the method may include resetting the gaze direction to the direction corresponding to the user's head orientation when the users head is determined to be substantially stationary. In some embodiments, a direction of interest or region of interest (ROI) is estimated.

In some embodiments, an example method includes training and/or customizing a user-specific proportionality constant that relates peak head speed to the amplitude of a gaze change. In some embodiments, the proportionality constant may be based on the axis of the users head movement. For example, a proportionality constant may be trained and customized for each axis.

In some embodiments, an example method includes calibrating user-specific proportionality constants (e.g. relating peak head speed to gaze change amplitude) based on metadata provided by a contents server. For example, a VR contents server may provide information that describes locations determined to be regions of interest to e.g. a viewer being shown the VR content.

Figure 9:
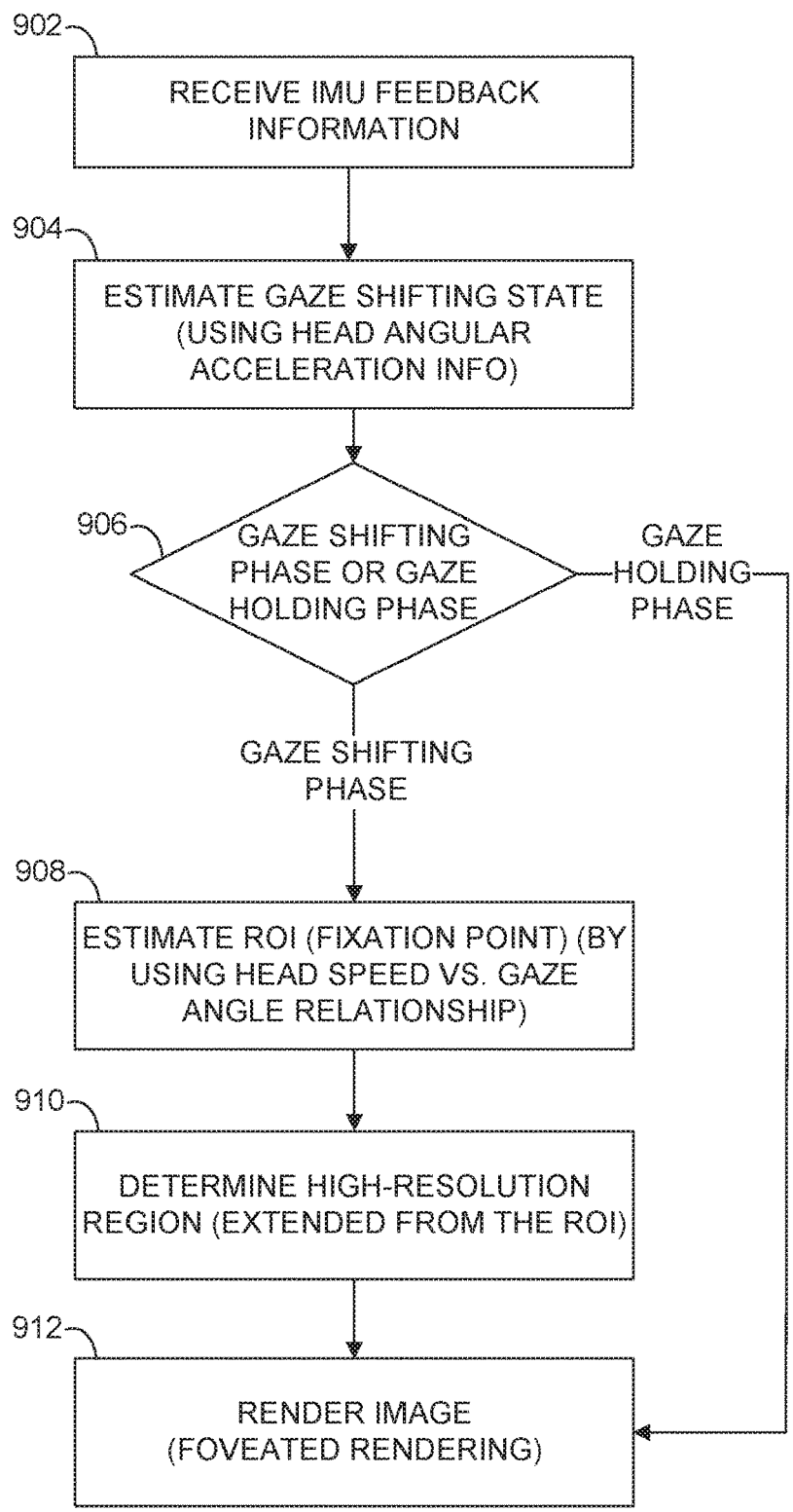
FIG. 9 is a process flow diagram of an example method in accordance with some embodiments.

In some embodiments, a users region of interest (ROI) is estimated using, e.g., feedback data such as IMU data regarding the user. In some embodiments, the estimated ROI may be used as a high-resolution area for foveated rendering of VR contents. FIG. 9 is a flow diagram of an example method in accordance with some embodiments. At 902, IMU feedback is received. At 904, a gaze shifting state is estimated. For example, the gaze shifting state may be estimated using head angular acceleration information. At 906, the flow of the example process depends on whether the gaze shifting state has been estimated to be in the gaze shifting phase (e.g., in which the user is shifting gaze) or the gaze holding phase (e.g., in which the user is holding gaze), see, e.g., FIG. 10 below. If it is estimated that the user is in the gaze holding phase, at step 912, foveated rendering is performed without, e.g., estimating a region of interest (ROI) and/or high-resolution region. On the other hand, if it is estimated that the user is in the gaze shifting phase, at 908, an ROI is estimated. An ROI may be estimated, for example, based on head orientation information. In some embodiments, estimating an ROI includes, e.g., using a relationship between head speed and gaze angle, as described herein in accordance with some example embodiments. In accordance with the example, at 910, a high-resolution region is determined based on the estimated ROI. In some embodiments, estimated ROI information may describe a point or direction, e.g., a direction of interest of the user. As such, determining a high-resolution region may include extending a region from the ROI. At 912, an image is rendered. In some embodiments, rendering an image includes performing foveated rendering based on the determined high-resolution region. For example, the portion of the image toward the estimated ROI direction may be rendered with higher quality than a portion of the image away from the predicted gaze direction. The example method 900 in FIG. 9 begins at the point of receiving IMU feedback data 902 from the user device merely for convenience of explanation. However, it should be understood that example processes of the example VR system may be executed repeatedly as VR contents are played and IMU feedback are received. Further example details of the example method 900 are further elaborated in the explanation of example steps below. Of course, these are merely explanatory examples and "steps" such as the identified "steps" of the example method may in some cases be performed, e.g., in a different manner, e.g., simultaneously, out of order, or in, e.g., a different order.

Step 1: Gaze Shifting State Estimation

In some embodiments, observed head movement information, e.g. based on IMU feedback data, may be utilized to evaluate how far the process of a gaze shift has progressed. In some embodiments, it is determined that the user is in a gaze holding phase. As described previously, when a users gaze arrives at a target point, the eyes may move (rotate) in the opposite direction relative to the rotation of the head while the head continues moving with reduced rotation speed. This determination may occur, for example, when the user's head orientation is changing during an interval in which the user's head rotation speed is decreasing. The ROI of the user may be understood to not be changing because the eye movement in the gaze holding state compensates the movement due to changes in head orientation.

In some embodiments, it is determined that the gaze shifting phase has begun. This determination may occur when the rotational speed of the head begins to increase. The user's head angle is recorded, e.g. as the head orientation basis, or $Head_{basis}$. The user may be determined to be in a gaze shifting phase in response to information indicating an angular acceleration of the users head. During the gaze shifting phase, a process is performed for estimating the users ROI.

FIG. 10 illustrates a gaze shifting phase and a gaze holding phase for eye-head movement induced by a shift in gaze, in accordance with some embodiments. FIG. 10 provides as an example an example relationship between eye and head movements that occur when a user changes gaze for a target ROI. As shown in the figure, the gaze holding phase corresponds to a period in which the gaze reaches the target ROI while the head movement is slowing down.

Figure 11:
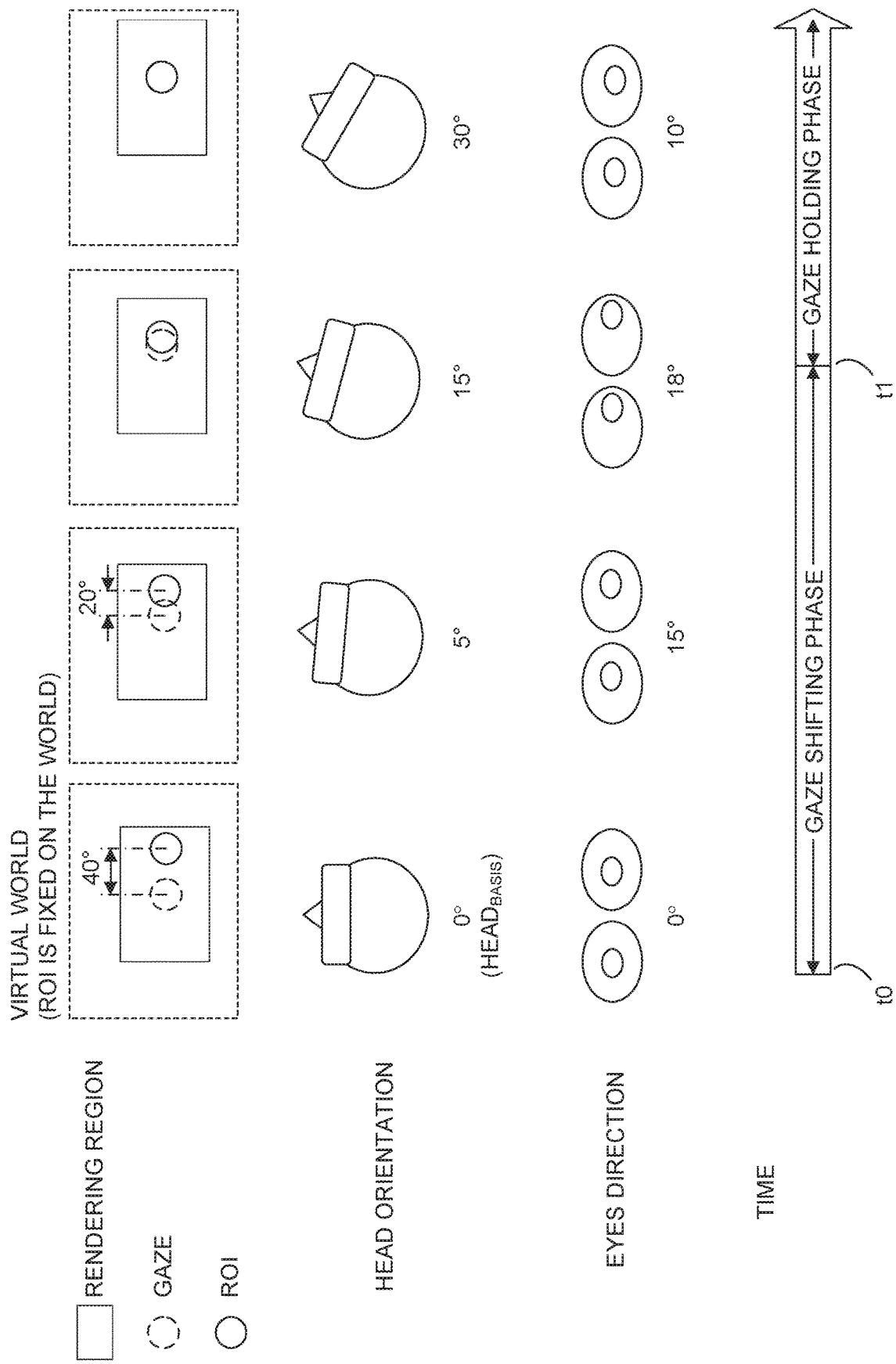
FIG. 11 illustrates an example procedure for horizontal gaze change in accordance with some embodiments.

FIG. 11 depicts an example horizontal gaze change procedure, in accordance with some embodiments. The example in FIG. 11 depicts a user's head orientation and eye direction as the user rotates his head and eyes to change the gaze to a ROI. In the scenario, the user's gaze is directed toward a rendering region in a virtual world. Notably, the ROI is at fixed location in 3D space. At time t0, the head orientation and eye direction are at an initial value of 0°, and an ROI appears at 40°. Between t0 and t1, the user tries to position his or her gaze to the ROI by moving the head and eyes. In the example, when the user's head orientation is 5°, the movement of the eyes is initially greater than the movement of the head. When the head orientation reaches 15°, the movement of the eyes slows down while the head continues to accelerate. The head orientation and eye direction values are provided merely as an example to illustrate each value's contribution to the total gaze shift. At t1, the gaze of the user reaches the ROI. The process of changing the gaze to the ROI has been achieved, and thus the ROI is in the user's fovea. After t1, the user's head rotates more and the user moves his eyes in the opposite direction (to the center) to maintain the gaze.

Step 2: ROI Estimation

Figure 12:
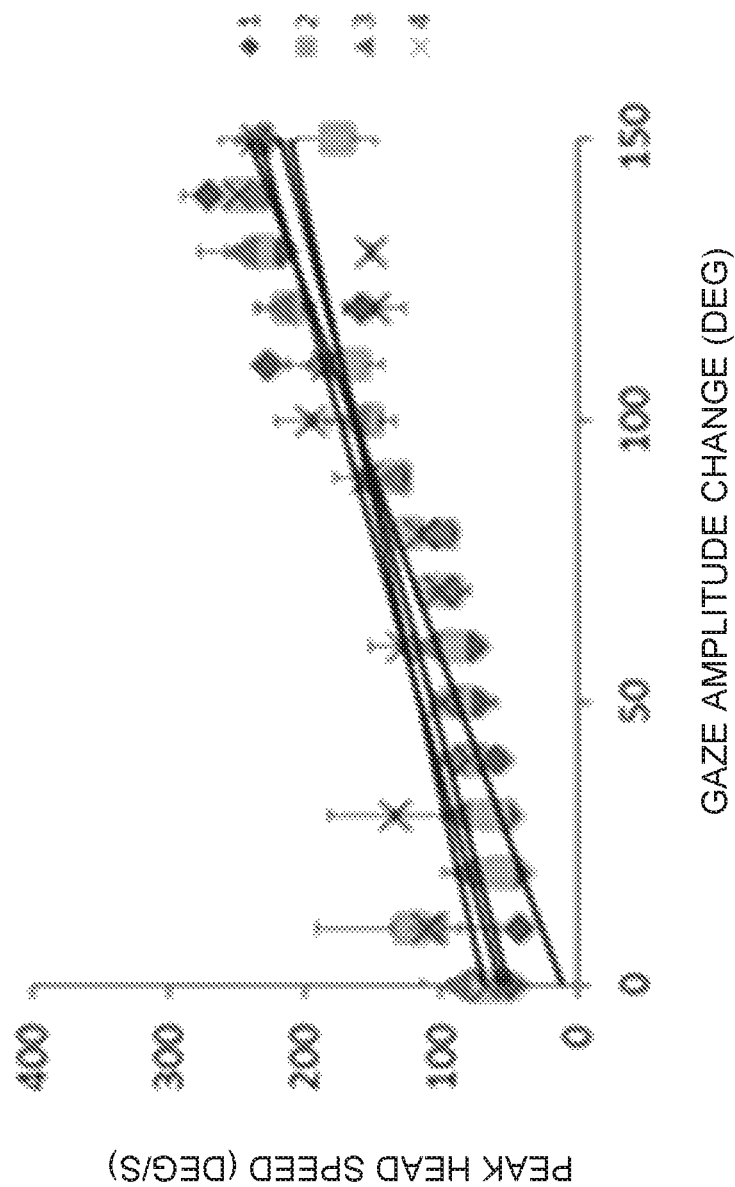
FIG. 12 is a plot of peak head speed versus total gaze amplitude change.

During the gaze shifting phase (e.g., when the user's head has started to move, but the rotational speed of the user's head is not decreasing) the user's head angle may be used to estimate the user's ROI. This step utilizes a relationship (matching) between peak head speed and gaze change. FIG. 12 is a plot of peak head speed versus total gaze amplitude change. In particular, the example in FIG. 12 shows a relationship between peak head speed and gaze change from the experiments in Fang.

In some embodiments, the peak head speed and the amount of the gaze amplitude change may be considered to be proportional. Therefore, during the gaze shifting phase, the ROI may be estimated using the following equation:

$$\text{Estimated ROI} = ROI_{basis} + c \times (\text{Headspeed} - \text{Headspeed}_{basis}) \quad \text{Eq. 1}$$

During the gaze holding phase, the ROI may be estimated using the following equation:

$$\text{Estimated ROI} = ROI_{basis} + c \times (\max(\text{Headspeed}) - \text{Headspeed}_{basis}) \quad \text{Eq. 2}$$

where c is the proportional constant, $C_{horizontal}$, $C_{vertical}$, and max(Headspeed) is the observed peak speed of the head during gaze shifting phase. Headspeed$_{basis}$ is the speed of the head just before the beginning of the gaze shifting phase, and ROI$_{basis}$ is the ROI just before the beginning of the gaze shifting phase. Because the head speed at each point in the gaze shifting phase may be the peak value at that time point, the ROI can be estimated using Eq. 2, for example. The proportional constant c can use empirically verified settings (e.g., for a particular unique user, or, e.g., estimated for a class of users), but it may vary, e.g., depending on the person's behavior characteristics. Thus, in some embodiments, it may be helpful to determine c values for each user by inducing a gaze change, e.g., before the service starts. Of course, it should be understood that updating or training c value may occur at any time, even during a service session. c values may be defined for each distinctive movement axis (Yaw, Roll, Pitch) and may also be separate values for different directions (e.g., left and right, or up and down) in each axis. Also, instead of the ROI$_{basis}$, the estimated ROI can be calculated based on the head orientation of the point at which the user starts to perform the gaze change using the following expression:

$$(\text{Head}_{basis} + c \times (\max(\text{Headspeed}) - \text{Headspeed}_{basis})) \quad \text{Eq. 3}$$

This assumption may be useful when resetting the system status if there is a high chance that the user's current gaze point is matched with the user's head direction, such as when the user is in static state. If the head orientation is used to estimate ROI, accumulation of the estimation error of the proposed solution may be prevented.

Figure 13B:
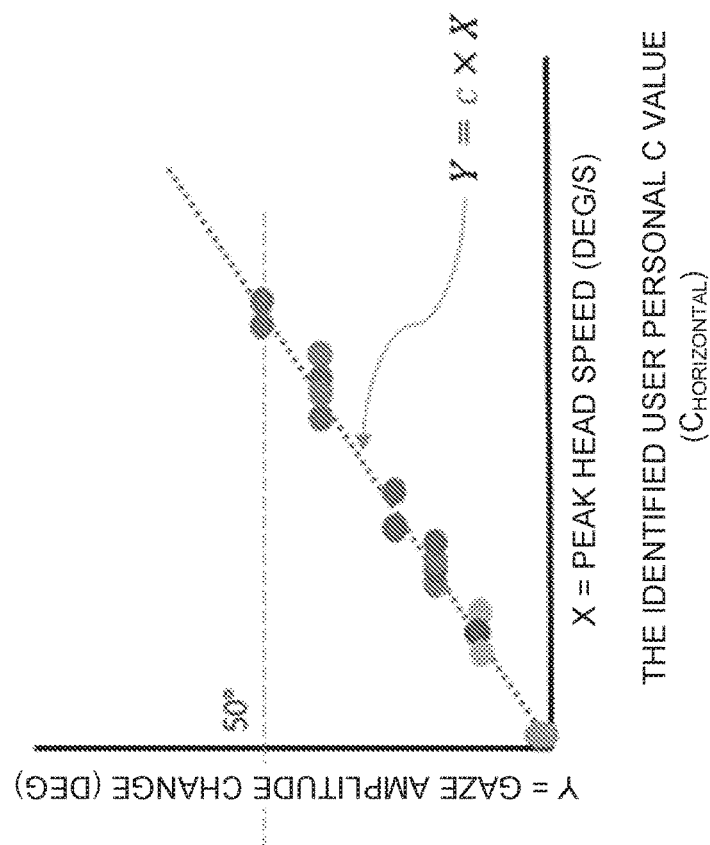
FIG. 13B is a plot of gaze amplitude change versus peak head speed for each example ROI location from FIG. 13A, in accordance with some embodiments.
Figure 13A:
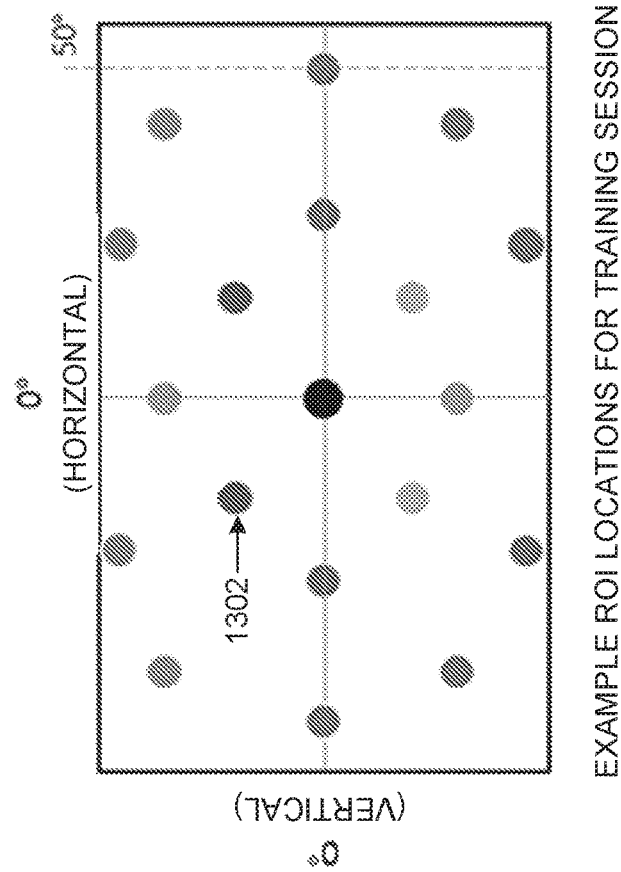
FIG. 13A depicts example ROI locations for a training session, in accordance with some embodiments.

As mentioned previously, each user may have a difference in the proportionality constant (e.g., a "c" value) between (in this case) the peak head speed and the gaze change amplitude. In some embodiments, a training session may be performed to check the user's "c" value. This training session can be performed, for example, by creating ROIs (one by one) on an intended angle (e.g. creating a virtual object) and by requiring the user to move gaze. The VR system may calculate the user's c value by checking the peak head speed of the user while the gaze of the user moves to the intended ROI. FIG. 13A depicts example ROI locations, such as example ROI location 1302, for a training session, in accordance with some embodiments. FIG. 13B is a plot of gaze amplitude change versus peak head speed for each example ROI location from FIG. 13A in accordance with some embodiments. This plot may be used to identify the users personal c value.

Figure 14:
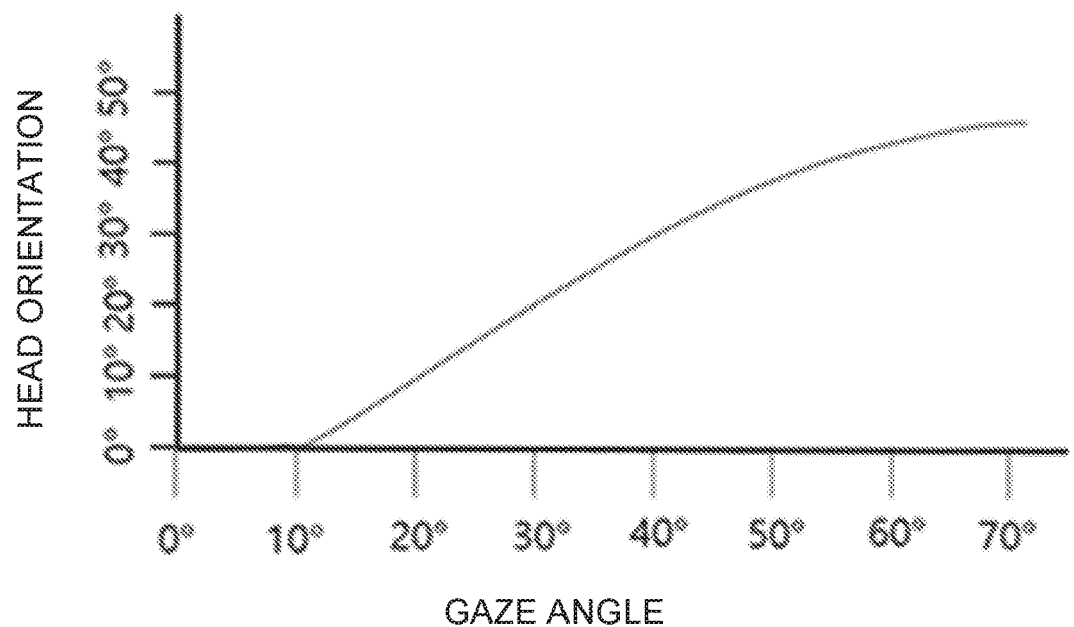
FIG. 14 depicts an example identified relationship between gaze angle and head orientation.

In some embodiments, training sessions may be used to determine the extent to which the user's eye movement and head movement each contribute to achieving a particular gaze angle. Because in accordance with the example the gaze angle is achieved by the sum of the eye and the head angle, an example VR system that has obtained or determined the intended ROI position (angle) may be able to determine the angle of the user's eye based on the head angle of the user. In some embodiments, training sessions may be utilized to compare the user's head orientation and the position (e.g., angle) of the ROI. FIG. 14 depicts an example identified relationship between gaze angle and head orientation, in accordance with some embodiments. In the example, head orientation remains at 0° for gaze angles up to 10° because these small gaze angles may be achieved by moving only the eyes. As shown in the figure, head orientation generally increases for gaze angles larger than 10°. In some embodiments, the relationship between head orientation and gaze angle can be assumed to be a linear relationship.

Figure 15:
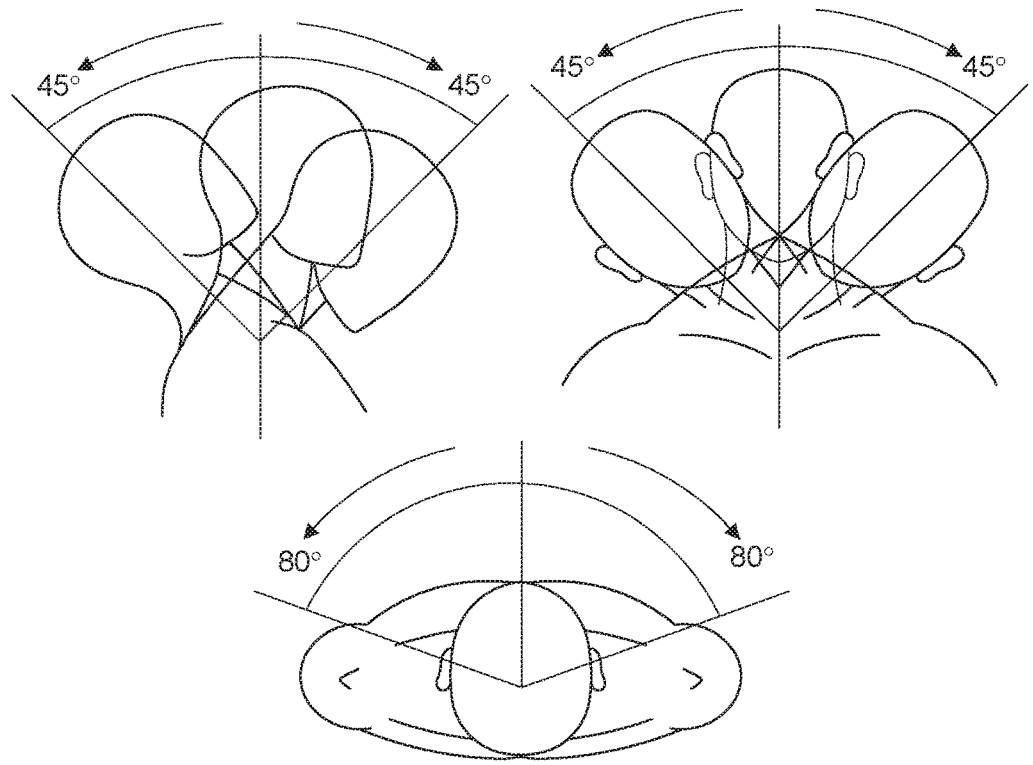
FIG. 15 depicts cervical spine range of motion.

FIG. 15 depicts an example cervical spine range of motion (adapted from Rosengart, M. (2016, Sep. 26). *Basic Assessments and Movement Evaluations for Runners*. Retrieved from https://www.prehabexercises.com/basic-assessments-and-movement-evaluations-for-runners). The range in which a person can rotate his or her head may be limited, e.g., by 80° in the yaw direction and 45° in the pitch direction, although other values may certainly apply. Indeed, the ranges by which a person can rotate his or her head may vary on a person-to-person basis. As the direction of the head deviates from the front of the body, a repulsive force may be affected, and the rotation speed of the head may become relatively low. In those regions (e.g. at orientations relatively further from the center position), it may be helpful to consider that the user's eye movement may take on bigger role in shifting gaze points because head rotation may be limited. Thus, it may be useful to implement a variable weighting to the original c value, in order to account for the head's orientation that is shifted to the direction of the gaze change.

In some embodiments, the c value is weighted in proportion to the deviation of the user's head direction from the center. This weighting of the c value may be described, for each axis, by the following expression:

$$\text{Weighted } c \text{ value} = c \times \left(1 + \frac{\text{head orientation } (deg)}{\text{cervical spine range } (deg)}\right) \quad \text{Eq. 4}$$

The cervical spine range, for example, may be limited to 80° in the Yaw axis, as shown in the example. Eq. 4 may be applied to other axes by utilizing the cervical spine range that corresponds to the motion along that axis. For example, the Pitch axis may utilize the range of motion that corresponds to pitch of the human head, e.g., 45° in the example.

Case 1: One-Step Gaze Change

Figure 16:
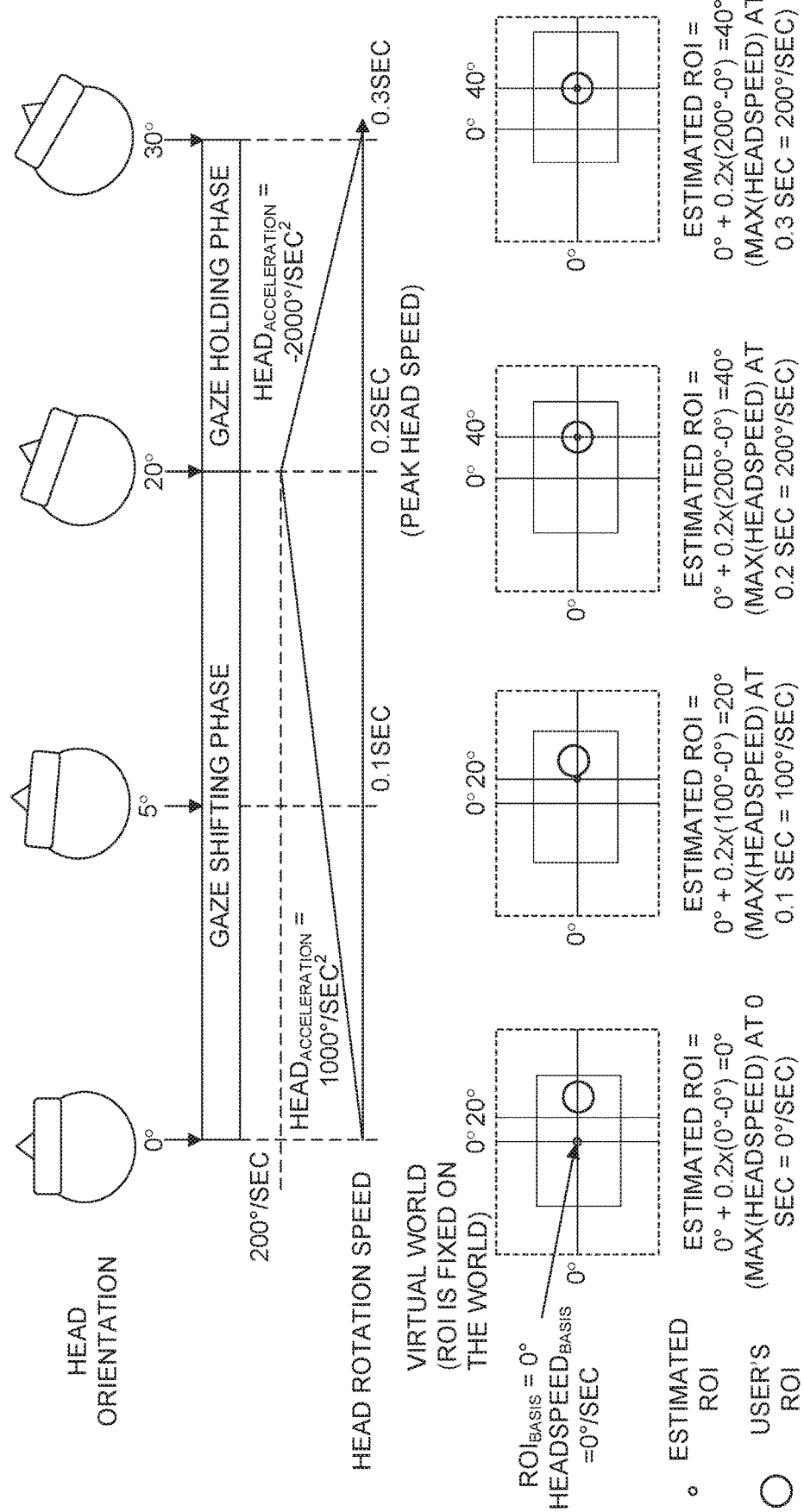
FIG. 16 depicts example ROI estimation for a one-step gaze change, in accordance with some embodiments.

FIG. 16 depicts example ROI estimation for a one-step gaze change, in accordance with some embodiments. In the example, the user's head speed reaches a peak value at 0.2 sec. Because the observed peak head speed at any moment between 0 and 0.2 sec is the speed observed at that moment, the estimated ROI is continuously changed until 0.2 sec. Because the max(Headspeed) does not change after 0.2 sec, the ROI does not change thereafter.

Case 2: Multiple-Step Gaze Changes

Figure 17:
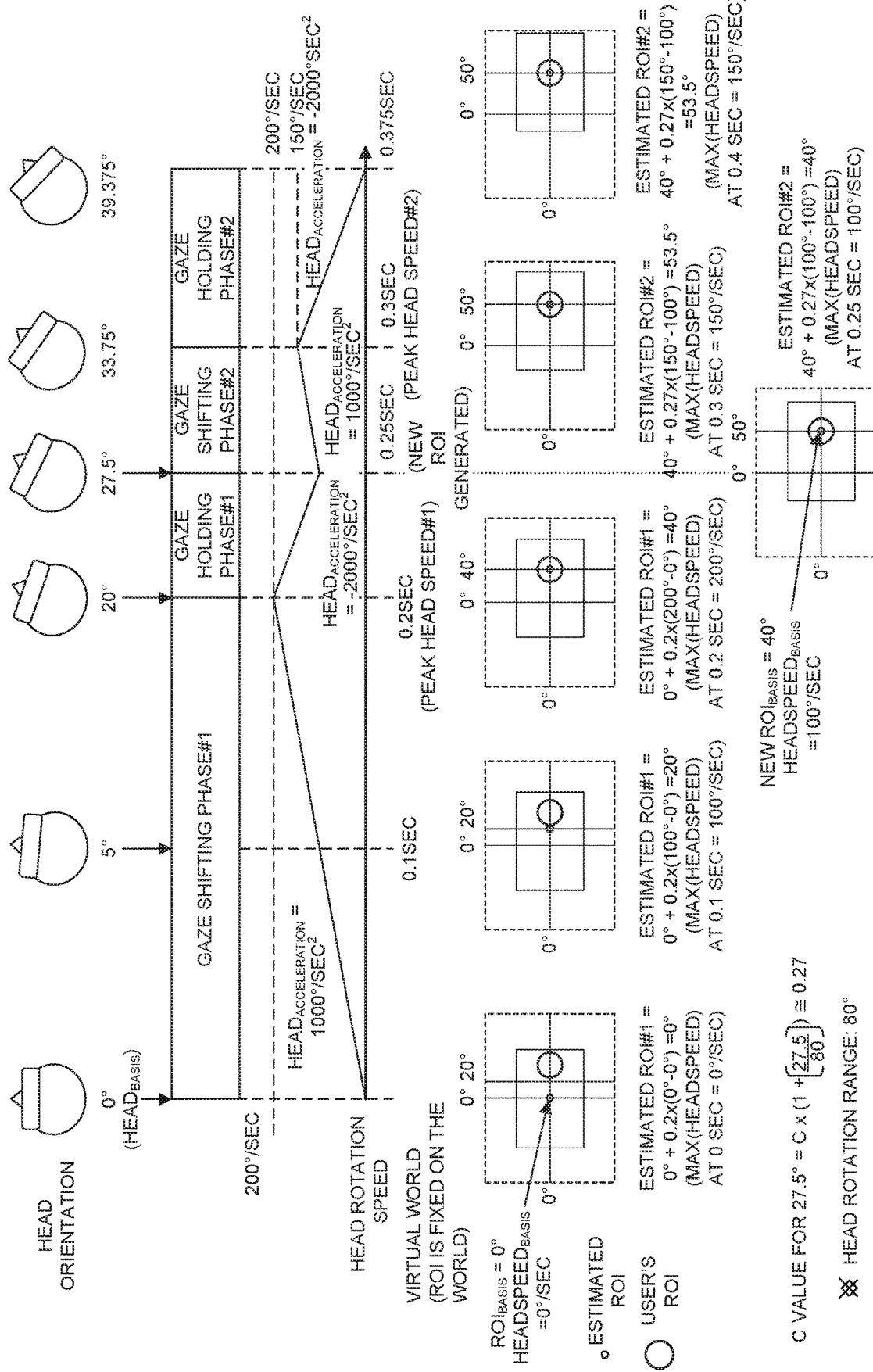
FIG. 17 depicts example ROI estimation for multiple-step gaze changes, in accordance with some embodiments.

FIG. 17 depicts example ROI estimation for multiple-step gaze changes, in accordance with some embodiments. In some scenarios, a user may change to a new target ROI while in the process of moving his/her gaze towards the original target ROI. This may occur when the user is looking around or tracking a particular object in virtual world. FIG. 17 illustrates the situation where a new ROI is estimated as the user moves his head to the new ROI. In the example, a user has intent to move his gaze towards a ROI. In the gaze shifting phase, the user rotates his eyes and his head to the ROI direction to move gaze. The user decelerates his head when he confirms that the ROI is in his field of view, and simultaneously tracks the moving ROI (due to remaining head speed) with his eyes. Then, the user starts moving his gaze to a new ROI before the head is completely stopped. The user may move his gaze to a new ROI if, for example, the user finds the original ROI uninteresting, or if a more interesting area is found.

The example in FIG. 17 shows two gaze changes and their corresponding gaze shifting and gaze holding phases. Before the first gaze change (#1) is completed, a new ROI target to the user is created (at 0.25 sec). Then the user accelerates his head rotation again at 0.25 sec. If the user accelerates his head again, the $ROI_{basis}$ and the $Headspeed_{basis}$ are updated to start a new gaze shifting phase (#2). The new basis is determined by the ROI and head speed at the beginning of the gaze shifting phase (#2). The new $ROI_{basis}$ is an estimated ROI at the time the head velocity starts to accelerate again, and the new $Headspeed_{basis}$ is is a head speed at the same time point. That is, if the head speed starts to increase (even if the initial head speed is not zero), a new gaze shifting phase begins. The new gaze shifting phase #2 starts with the head rotated 27.5 degrees to the right. Therefore, the c value of the proposed solution is weighted and changed to 0.27. The c value, and the basis values of the ROI and the head speed were changed, but the method of obtaining the estimated ROI is the same.

Case 3: Gaze Change Including Constant Head Rotation Speed

Head movement is sometimes considered as a constant acceleration motion, but a user's head may move at a constant speed (constant angular velocity), e.g., when the head speed reaches a speed limit or the user is tracking a specific object. If the VR user's head motion includes constant speed rotation, the ROI estimation method used in case 1 and case 2 may not work as well. One reason is that the ROI estimation of Eq. 2 above may not reflect the changed orientation of the head during the constant speed rotation. Therefore, it may be helpful to reflect the ROI offset in the ROI estimation.

Figure 18:
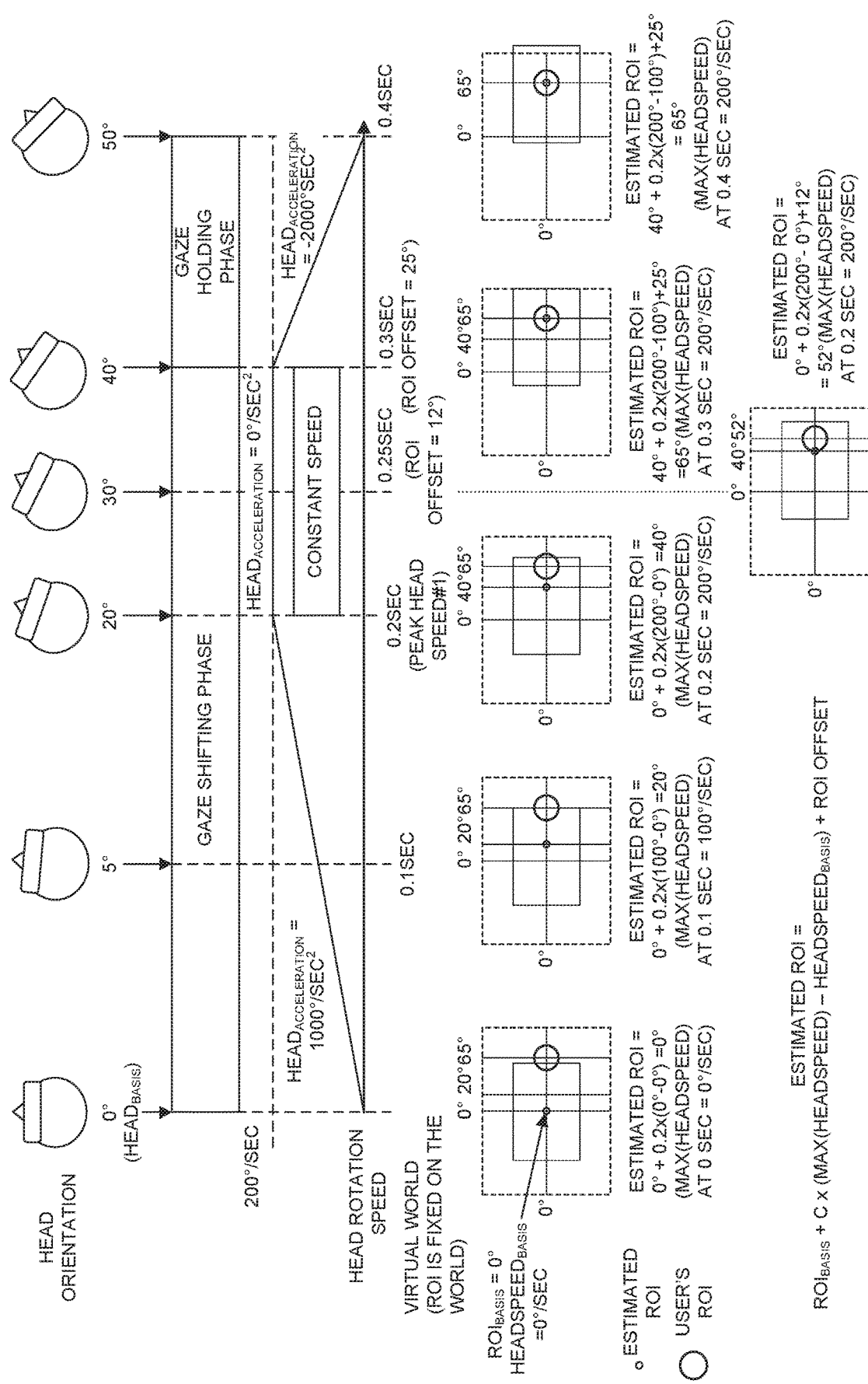
FIG. 18 depicts example ROI estimation for a gaze change that includes constant speed head rotation, in accordance with some embodiments.

FIG. 18 depicts example ROI estimation for a gaze change that includes constant speed head rotation, in accordance with some embodiments. The ROI offset may be, for example, the changed angle of gaze from the change in head orientation. In some embodiments, an ROI offset is added during the ROI estimation process when the user makes constant speed head rotation. An example implementation of the ROI offset operates to address the problem caused by the constant velocity motion error.

Figure 19:
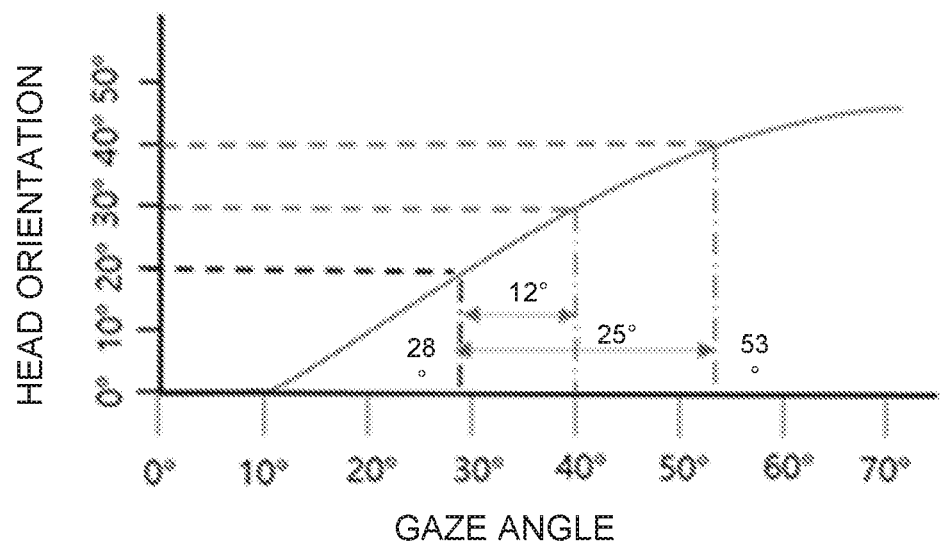
FIG. 19 illustrates an example ROI offset calculation, in accordance with some embodiments.

FIG. 19 illustrates an example ROI offset calculation, in accordance with some embodiments. In some embodiments, the gaze angle that matched with the head orientation at the beginning of the constant speed motion is identified. This angle is compared with the gaze angle of the current head orientation. In the example of FIG. 19 and with reference to FIG. 18, the head orientation when the head starts constant speed rotation is 20° and the matched gaze angle is 28° (from the training result). As a result of constant speed rotation at 0.05 sec (at 0.25 sec) long, the user's head orientation is changed to 30° and the corresponding gaze angle is 40°. Consequently, the determined ROI offset is 12° at 0.25 sec. The estimated ROI while the user performs constant speed head motion is calculated using the following formula:

$$\text{Estimated ROI} = ROI_{basis} + c \times (\max(\text{Headspeed}) - \text{Headspeed}_{basis}) + \text{ROI offset} \quad \text{Eq. 5}$$

Consequently, the estimated ROI at 0.25 sec is determined to be 52°. The ROI offset at 0.3 sec when the constant head rotation was ended is 25°, and the estimated ROI without the offset is 40° (from the head peak speed). Consequently, the final estimated ROI from 0.3 to 0.4 sec is determined to be 65°.

Figure 20:
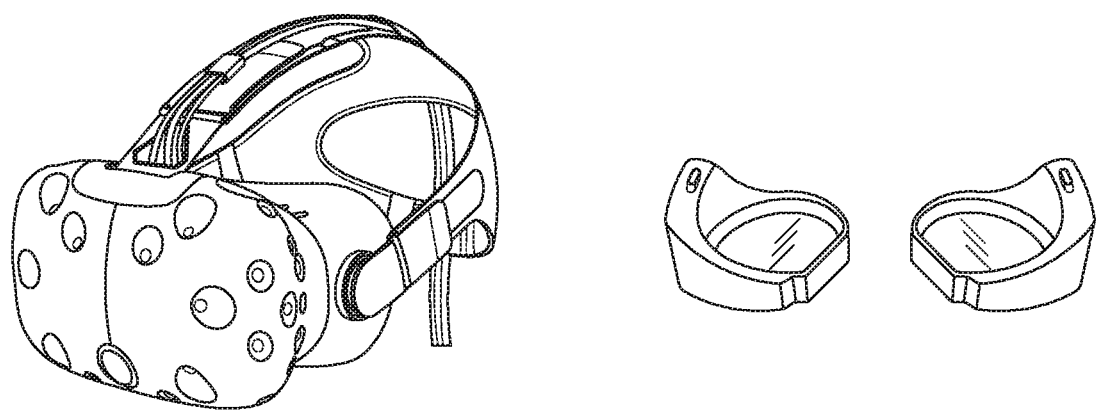
FIG. 20 depicts an example VR HMD and eye tracker.

An experiment was performed in order to verify accuracy using HTC VIVE HMD and aGlass eye-tracking device. Information was obtained about the user's head orientation and user's eye gazing point. The aGlass eye tracker is designed to fit within the HTC Vive HMD and the eye tracking results can be obtained from USB cable connection. Accuracy was evaluated by comparing the estimated ROI with the actual measured gaze direction of the user. FIG. 20 depicts an example VR HMD (such as an HTC VIVE HMD) and eye tracker (such as an aGlass eye tracker).

Figure 21:
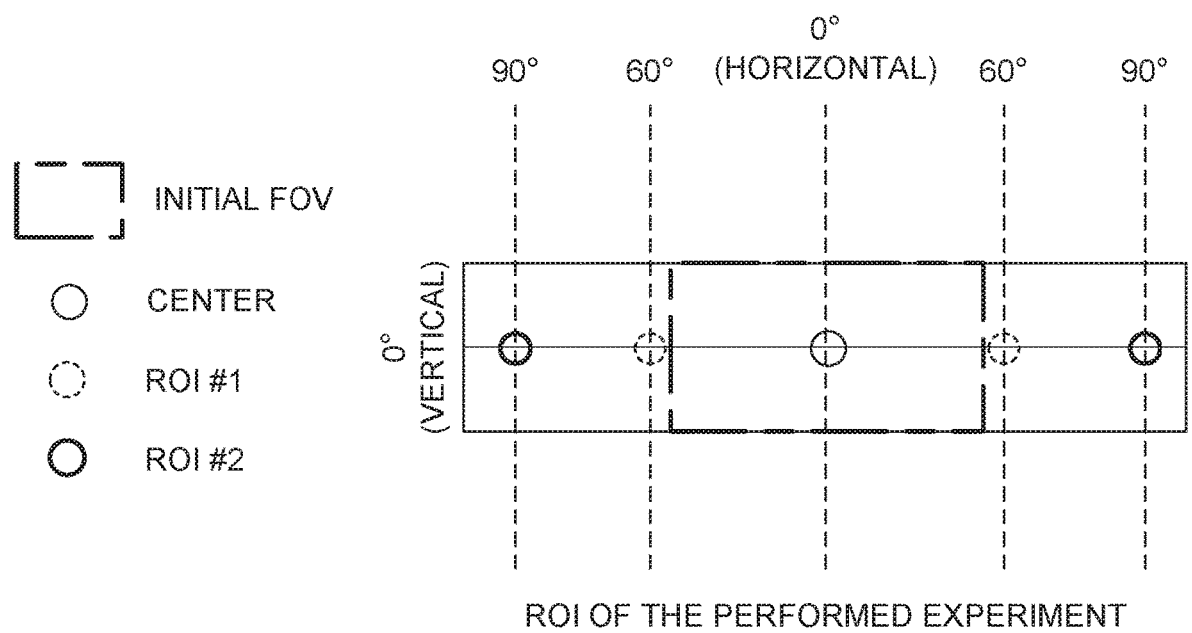
FIG. 21 depicts ROIs of performed experiments.

FIG. 21 depicts ROI of performed experiments. In the experiment, the user is guided to move his gaze, and the head rotation speed and actual gaze direction (head orientation+eye position) of the user are recorded with a 90 Hz sampling rate. The user is asked to change his gaze between the ROI #1, #2 within left/right direction and to change the gaze to the center point again.

During the training phase, the initial value of the proportional constant (c value) is calculated by comparing the recorded peak head rotation speed and the gaze amplitude. The initial c value of yaw axis for each direction was determined by checking the maximum head rotation speed observed while the user was changing the gaze (c_left: 0.6599, c_right: 0.7200).

An example of an algorithm to perform c_value calculation and ROI estimation is implemented using MATLAB. Code for implementing the example algorithm is submitted as an Appendix to this disclosure. As mentioned previously, the estimated ROI location may be determined before the actual gaze change is completed (approximately 200~250 ms earlier than actual gaze movement is completed in the experiment). This lead time is because the proposed solution may determine the estimated ROI at the moment when the user's head turn records the maximum value. Therefore, it may be helpful to consider this time interval when evaluating the accuracy of a proposed solution. The accuracy of the ROI estimation in the experiment was determined assuming a lead time of 250 ms.

Figure 22:
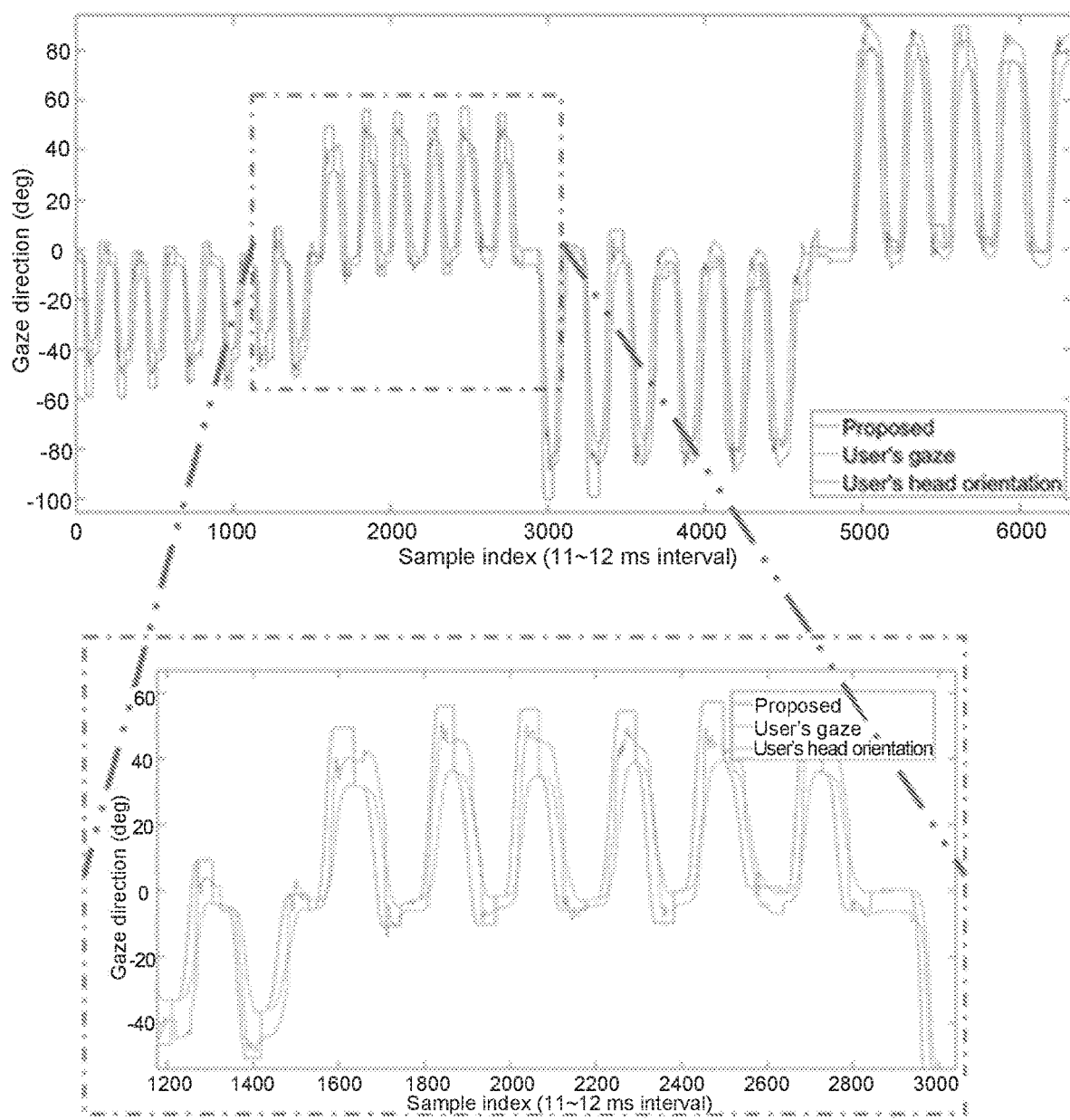
FIG. 22 depicts experimental results of estimated vs. actual gaze vs. head orientation for uniform motion.

FIG. 22 depicts example experimental results of estimated vs. actual gaze vs. head orientation for uniform motion, in accordance with some embodiments. The example results shown in FIG. 22 illustrate that the tested solution can, in accordance with some embodiments, estimate user's ROI before the actual gaze change of the user is completed and achieves higher accuracy than by using only head orientations. The average errors of the method are as follows. The average error between the estimated ROI and the user's gaze (uniform motion) is 6.58 deg. The average error between the user's head orientation and the user's gaze (uniform motion) is 14.8 deg.

Figure 23:
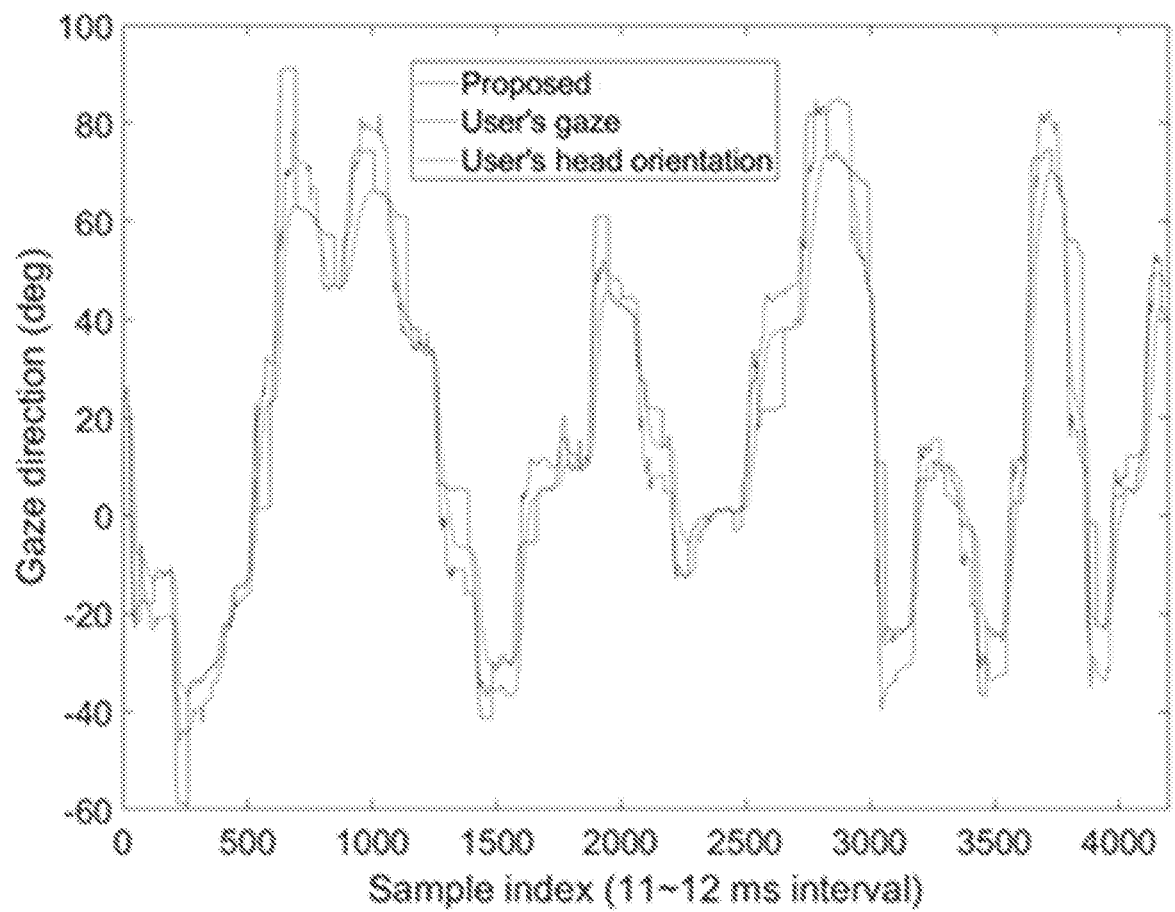
FIG. 23 depicts experimental results of estimated vs. actual gaze vs. head orientation for natural motion.

FIG. 23 depicts example experimental results of estimated vs. actual gaze vs. head orientation for natural motion, in accordance with some embodiments. This additional example experiment was conducted using data from a user who moved more naturally than the previous example experiment for uniform motion. The user's head rotation not only starts from the direction that the upper body is facing (front), but also starts as soon as the new ROI is generated. Thus, every gaze shifting phase is started from a random position, and the c values used for each ROI estimation are weighted depending on the head orientation at each gaze shifting phase's start. The initial c values in the training session performed immediately before the experiment were c_left=0.6003 and c_right=0.6244. The experimental results shown in FIG. 23 illustrate that the proposed solution is more accurate than assuming that users gaze is same as the user's head orientation. The average errors of the method are as follows. The average error between estimated ROI and the user's gaze (natural motion) is 7.21 deg. The average error between user's head orientation and the users gaze (natural motion) is 11.2 deg.

Step 3: High-Resolution Region Determination

Determining the high-resolution area safely and efficiently may be helpful for reducing the probability of the user gazing toward low-resolution areas and for optimizing the computing power consumed by rendering. The previously estimated ROI is only one point without a defined range. Thus, it is especially useful to determine a high-resolution region by extending the estimated ROI.

A first potential consideration in determining the high-resolution area is the user's fovea. In human vision, achieving the perception of an object calls for bringing the view of the object to the center of the eye called the fovea. The fovea covers only about 2° field of view and is in the center of the eye's field of view. Consequently, it may be helpful to expand the high-resolution region by at least 2° to prevent low-resolution from appearing within 2° of the estimated ROI. An additional potential consideration, as discussed above and shown in FIG. 8, is that the user can perform head-rotation free (eye-only) gaze changes of about 20°. Finally, the high-resolution area may be shifted due to time warping procedure. The time warping procedure may be performed immediately before providing the generated contents to the user. The likelihood and degree of the problem caused by time warping may be proportional to the latency of the VR system and the head rotation speed of the user. That is, in situations where the user moves his or her head quickly or the latency of the system is large, an elongated high-resolution area in the direction of head rotation may be determined.

Figure 24:
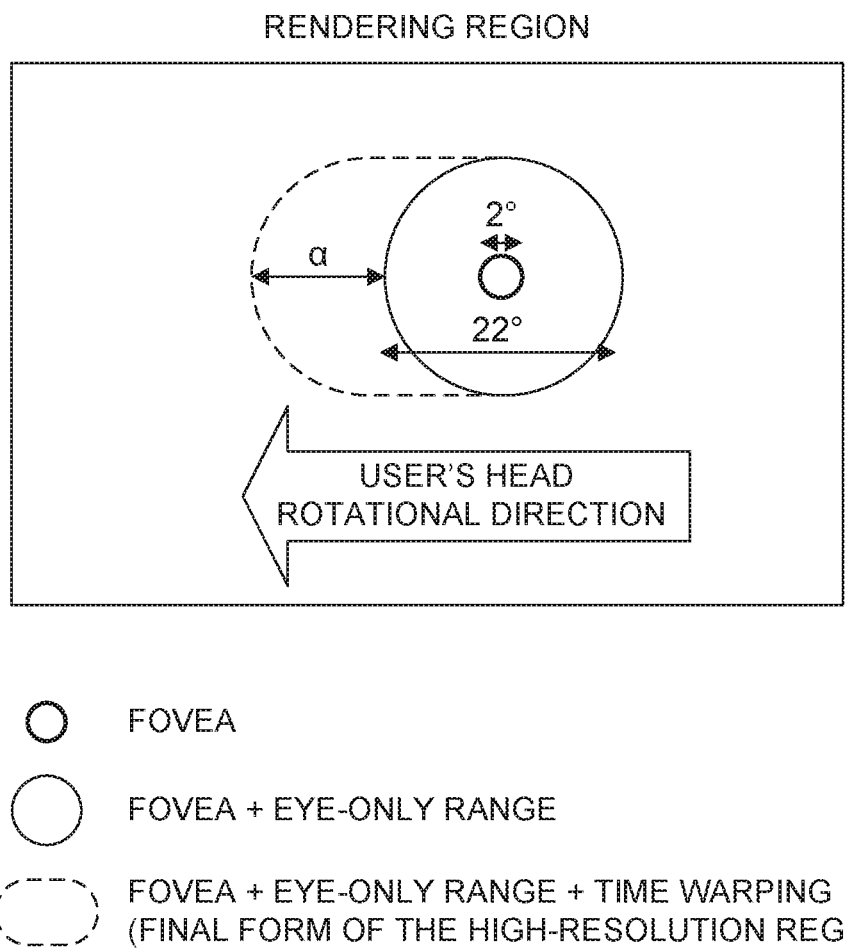
FIG. 24 illustrates the size and shape of an example determined high-resolution region, in accordance with some embodiments.

FIG. 24 illustrates an example size and shape of an example determined high-resolution region, in accordance with some embodiments. In the example, the high-resolution region is shifted in the direction of head rotation and is gradually elongated during the gaze shifting phase as head rotation speed up (as the a becomes bigger). After that, the position of the high-resolution region is fixed (on the virtual world) and becomes smaller again (as the proportional coefficient of the time warping, a, becomes smaller) during the gaze holding phase.

Step 4: Renderer

Figure 25:
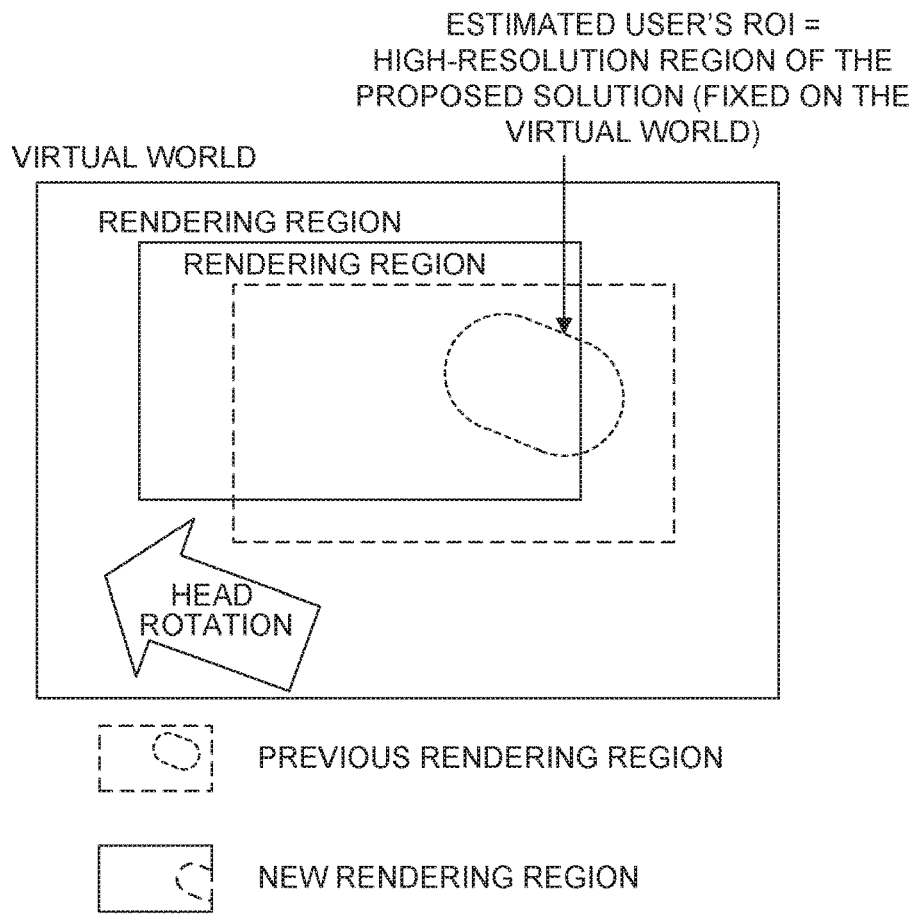
FIG. 25 depicts high-resolution region shifting during gaze holding phase, in accordance with some embodiments.

In some embodiments, a renderer checks the high-resolution area and performs foveated rendering that applies high-resolution only to that area. Note that even if the user is in the gaze holding phase, the position of the high-resolution region on the image may change. That is because the user's ROI is actually in the virtual world, not on the display panel. In other words, the position of the high-resolution area may change within the service frame because the head is still rotating and the eyes compensating for that motion during the user's gaze holding phase. This phenomenon is illustrated in FIG. 25.

In some embodiments, a VR system may utilize an inexpensive eye-tracking system or VR content's metadata analysis. In some embodiments, eye tracking may be performed to improve performance when the users head is not moving (static status). An inexpensive eye-tracking system usually has a relatively large eye-tracking latency. The large latency of the inexpensive eye-tracking system may prove a challenge for foveated rendering since the high-resolution area determined by eye-tracking may already be out of the user's ROI. However, in some embodiments an inexpensive eye tracking system may be implemented, e.g., to provide successful user experiences such as when the user is in static status, even with large latency.

In some embodiments, a VR system may utilize an expensive eye-tracking system operative to enable more efficient rendering. In some embodiments, the VR system may operate to perform the low-cost eye-tracking only when the user makes no head movement. Eye-tracking typically consumes large computing power, including image processing. Foveated rendering may be performed without eye-tracking when the user's head is moving. Therefore, an example system may operate to minimize computational overhead from the proposed combination.

Figure 26:
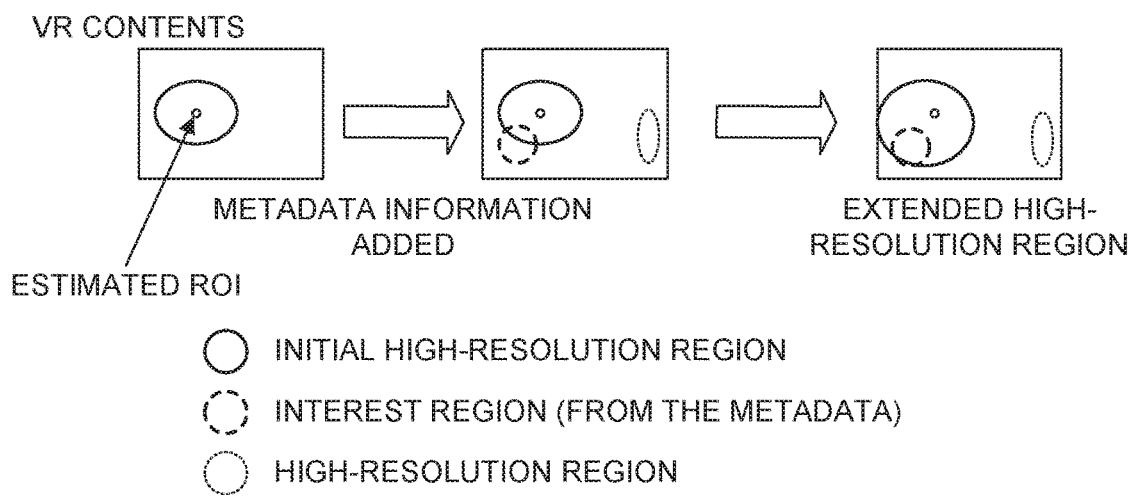
FIG. 26 depicts the adjustment of a high-resolution region to include an expected interest region from metadata, in accordance with some embodiments.

In some embodiments, VR content metadata is utilized to calibrate and scale high-resolution areas. A VR system may utilize information about the location (angle) of an expected ROI of a user. In some instances, VR content creators generally might know in advance (or be able to potentially predict) what content the users are likely to be interested in, and creators might, e.g., utilize such knowledge. For example, if a fast car suddenly appears in a user's sight and passes by, there is a high probability that user will be watching and tracking the car. If the VR content provides metadata about the location of the interesting car, this metadata may be used to increase ROI estimation accuracy (training) and to determine the high-resolution area more accurately. FIG. 26 depicts the adjustment of a high-resolution region to include an expected interest region from metadata, in accordance with some embodiments. In the example, if a VR system identifies interest region around the user's current gaze area, the high-resolution region around the current gaze area may be expanded to cover the metadata-based interest region.

In some embodiments, the c value is calibrated using metadata provided by the content provider. For example, the metadata may include information about interesting ROIs in each VR contents for each specific time. Errors in the expected ROI may be identified and compared to the recorded ROI information in the metadata. In some embodiments, the c value is calibrated if an error in the expected ROI is identified, since this error means that the currently used c value is not appropriate.

In some embodiments, the c value calibration process is as follows. If it is confirmed, for example, that the head rotation the user made was the movement to shift his gaze to the identified (metadata) ROI, the system may determine (e.g., compute, e.g., calculate) $c_{metadata}$=gaze amplitude/peak head speed. Then, a new c value ($c_{new}$) is determined based on the original $c_{old}$ and $C_{metadata}$ using adjusted weight $\partial$, using the following formula:

$$c_{new}=(1-\partial)\times c_{old}+\partial\times c_{metadata}, \quad \text{Eq. 6}$$

where $0<\partial<1$, $c_{old}$=previous c value, $c_{metadata}$=calculated c value using metadata information, and $c_{new}$=new calibrated c value.

The adjusted weight $\partial$ may be based on the reliability of $c_{metadata}$. The reliability, $\partial$, of $c_{metadata}$ is determined based on the user-generated gaze amplitude. For a $c_{metadata}$ from a small gaze change, it may be helpful to set a small $\partial$ value, because the $c_{metadata}$ may be inaccurate due to the eye-only range effect. On the other hand, a $c_{metadata}$ observed during a large gaze change may be relatively reliable, and it may be useful to set a large $\partial$ in order to increase effect of the $c_{metadata}$ in the calibration process. The c value may be continuously calibrated using metadata.

Figure 27:
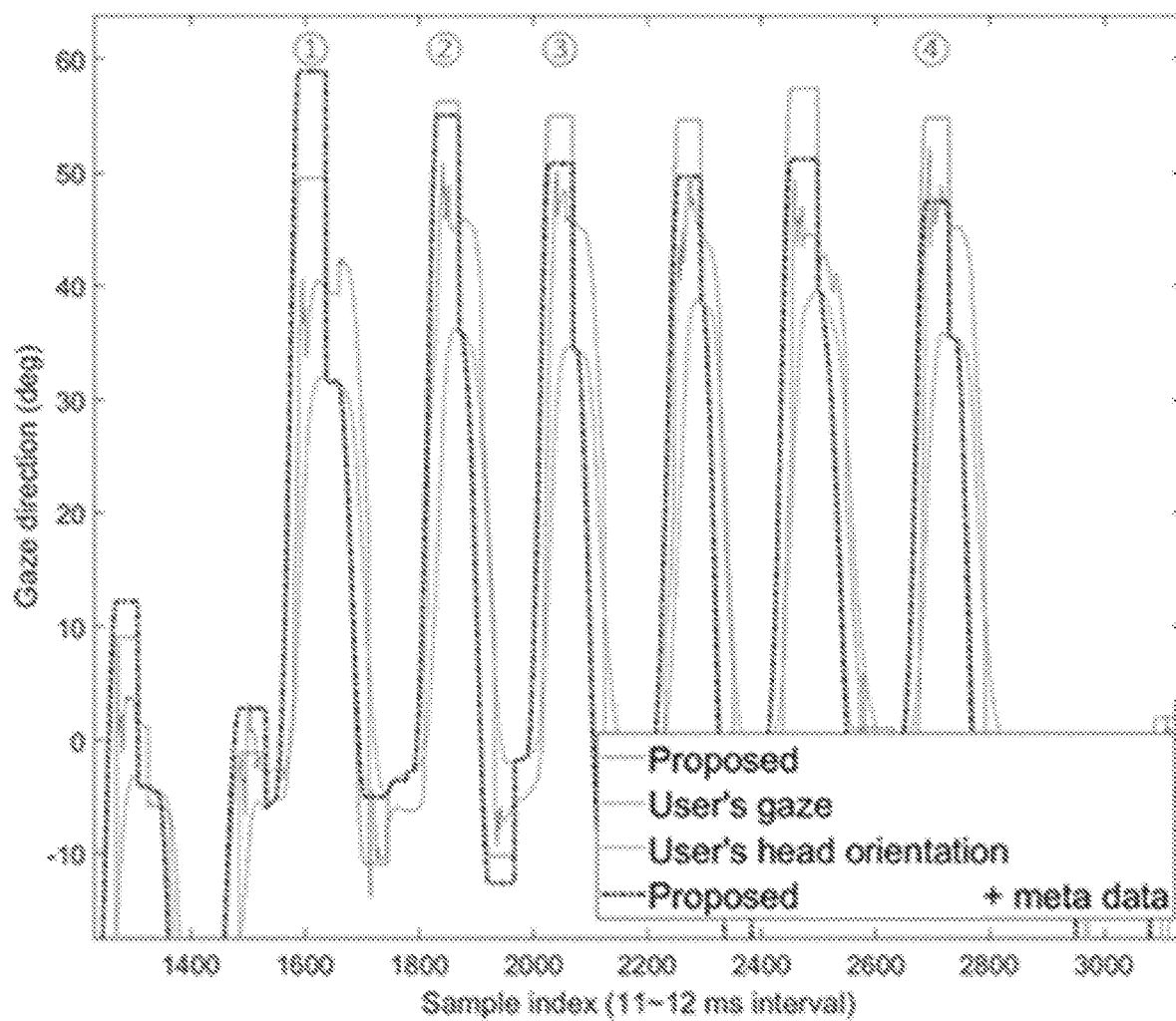
FIG. 27 depicts experimental results of c value calibration using metadata.

FIG. 27 depicts example experimental results of c value calibration using metadata, in accordance with some embodiments. In the experiment, the $\partial$ used is 0.5. Because the initially trained c_right (for the upper direction of the y-axis in the figure) is somewhat larger, the tested method predicted that ROI would be farther than an actual ROI of the user. After the correction of estimation error using metadata, the c_right value is calibrated. FIG. 27 identifies ROI estimations #1-4. In accordance with the example, due to the calibrated new c_right value, ROI estimation result at #2 is closer to the user's actual ROI than the estimation result at #1. The proposed solution repeats the calibration process during operation. At #3, the estimation error is further reduced, and at #4 the user's ROI is estimated most accurately.

Example Message Sequence Charts

Figure 28:
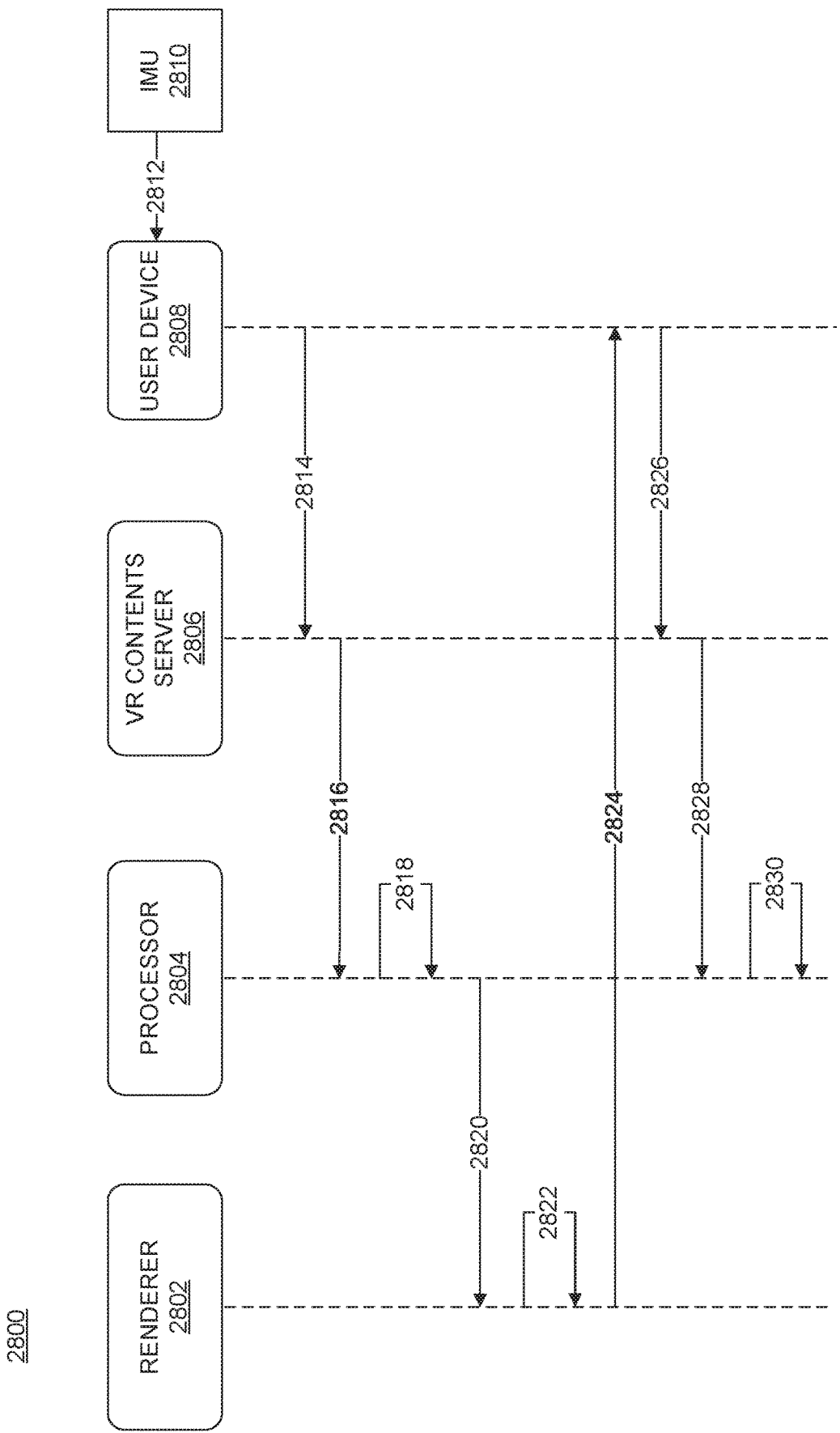
FIG. 28 is a message sequence diagram of an example training session, in accordance with some embodiments.

FIG. 28 is a message sequence diagram of an example training session 2800, in accordance with some embodiments. The example training session includes renderer 2802 (e.g. a graphics card), processor 2804, VR contents server 2806, user device 2808 (e.g. a head mounted display), and inertial measurement unit (IMU) 2810. As shown in the example, the message sequence includes the following. At 2812, user device 2808 receives motion information from IMU 2810. User motion information may be continuously sent to the user device 2808 throughout the process. At 2814, head orientation and rotation speed are sent to VR contents server 2806. At 2816, VR contents server 2806 selects the location where the ROI is to be created and transmits the ROI location and the user's head orientation to the processor 2804. At 2818, the processor 2804 compares the head orientation of the user with the position of the selected ROI to calculate the amplitude of the gaze movement that the user will perform. According to the example, at 2820, head orientation and ROI location information are sent to the renderer 2802. At 2822, renderer 2802 renders an object at the location determined to be the ROI by the VR contents server 2806. At 2824, the content having the intended ROI (e.g. a frame of a VR content) is provided to the user. At 2826, head orientation and rotation speed information (observed by the IMU) are provided to the VR contents server 2806. At 2828, the head orientation and rotation speed information are sent to the processor 2804. At 2830, the processor computes the user's personal c_value by using the observed peak head speed as the user moves the gaze to the ROI. The c_value may be computed, for example, by calculating dividing the gaze amplitude by the observed peak rotation speed.

Figure 29:
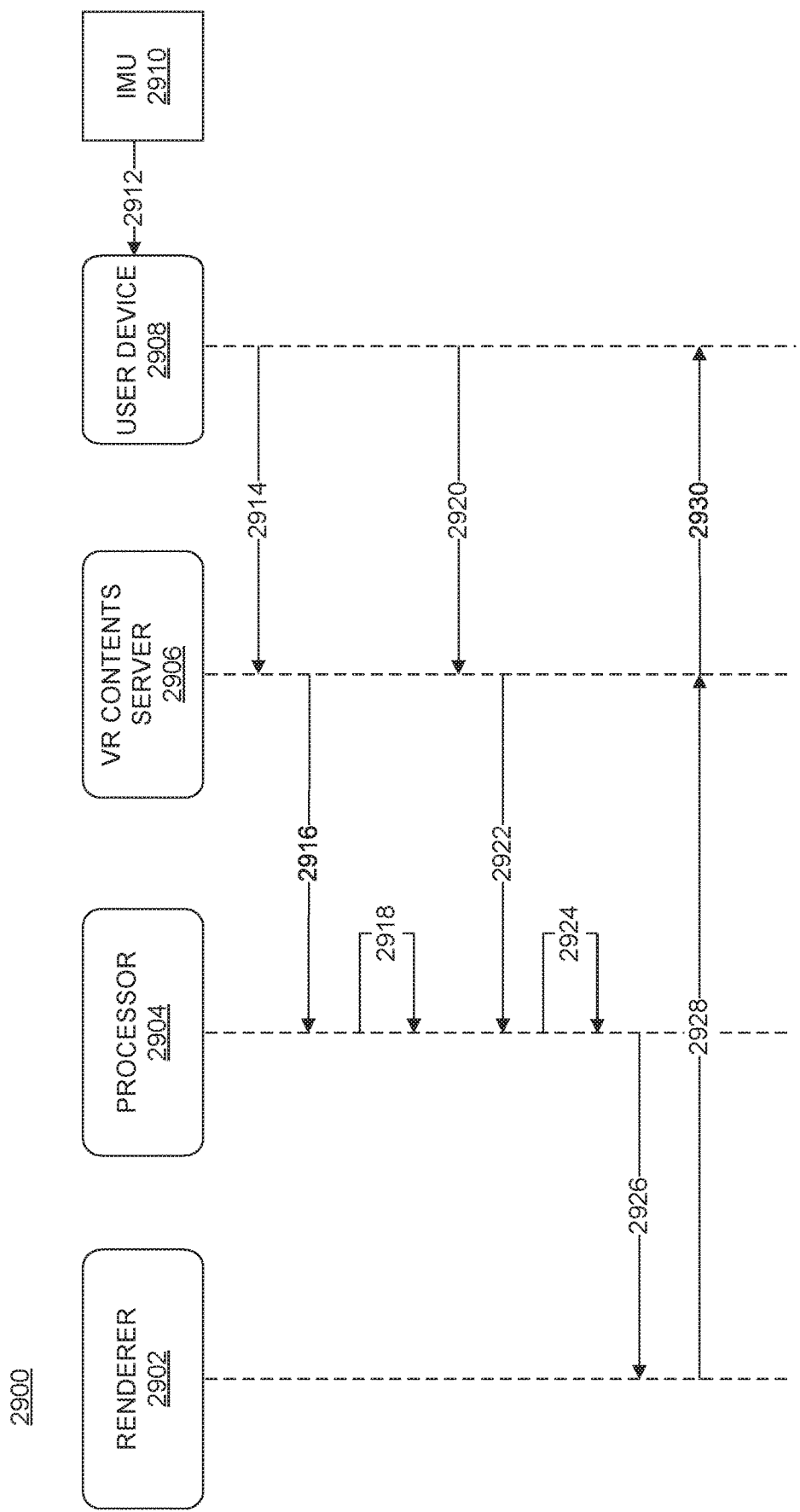
FIG. 29 is a message sequence diagram sequence of an example service session, in accordance with some embodiments.

FIG. 29 is a message sequence diagram sequence of an example service session 2900, in accordance with some embodiments. As shown in the example, the example message sequence of the example service session includes the following. At 2912, user device 2908 receives motion information from IMU 2910. User motion information may be continuously sent to the user device 2908 throughout the process. At 2914, the VR contents server receives the user's head orientation and rotation speed information from the user device 2908. At 2916, the user's head orientation and rotation speed information are and delivered to the processor 2904. At 2918, the processor detects the new gaze shifting phase based on the user's head speed and apply weights to the c_value (e.g. to take into account the initial orientation of the head). For example, the weighted c value may be calculated using Eq. 4, above. At 2920, head orientation and rotation speed information (observed by the IMU) are provided to the VR contents server 2906. At 2922, the head orientation and rotation speed information are sent to the processor 2904. At 2924, the processor uses the calibrated c_value to estimate the user's ROI and determines the high-resolution region. In some embodiments, the size of the high-resolution region is determined by considering the eye-free range, error margin, etc. According to the example, at 2926, the high-resolution region information, head orientation information, and VR contents are provided to the renderer. At 2928, the renderer 2902 performs foveated rendering for the contents using the determined high-resolution region information and provides the foveated rendered content to the VR contents server 2906. At 2930, the VR contents server 2906 packetizes the received contents and sends the packets to the user device 2908.

Figure 30:
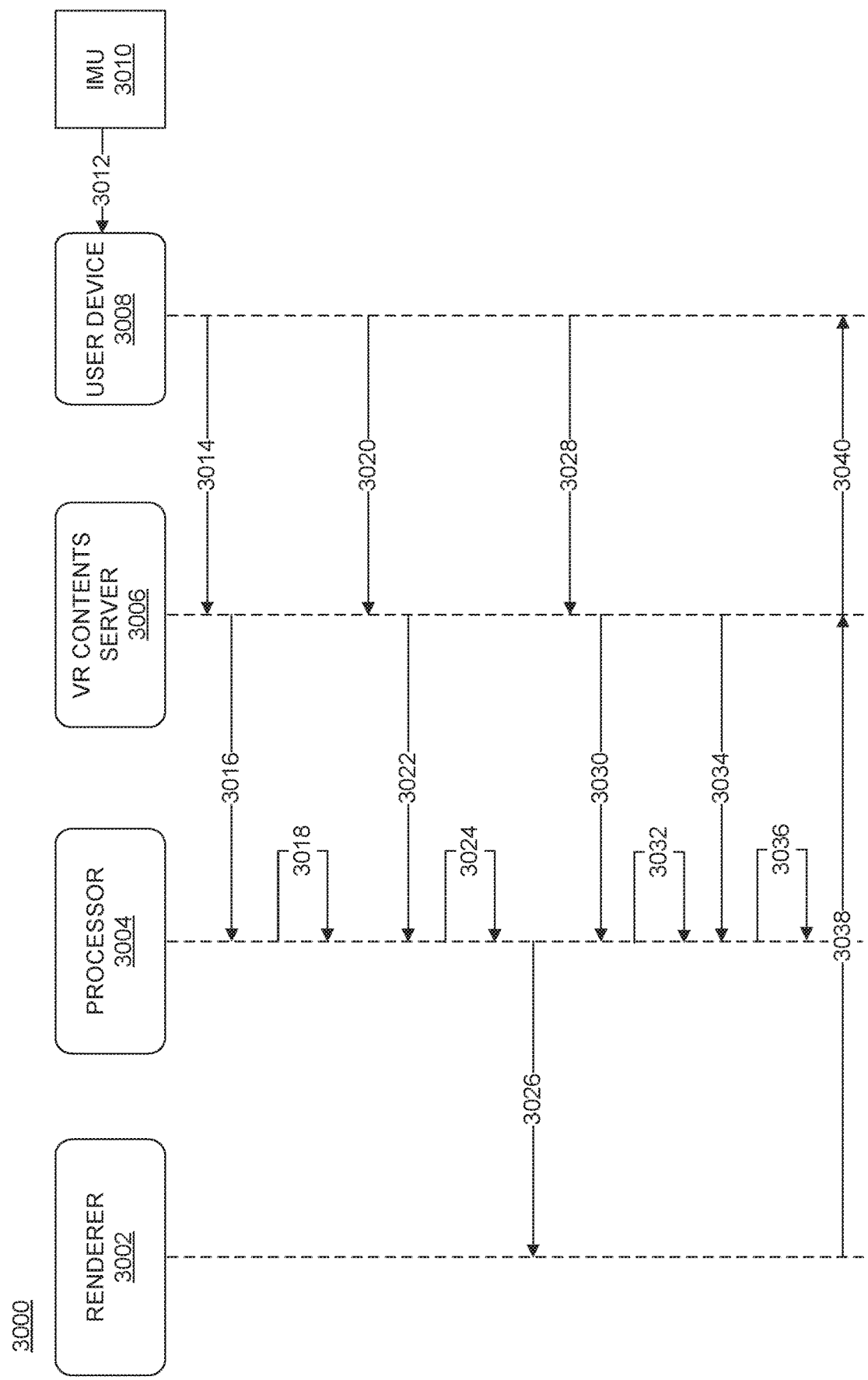
FIG. 30 is a message sequence diagram of an example service session on with metadata-based c value calibration, in accordance with some embodiments.
Figure 31:
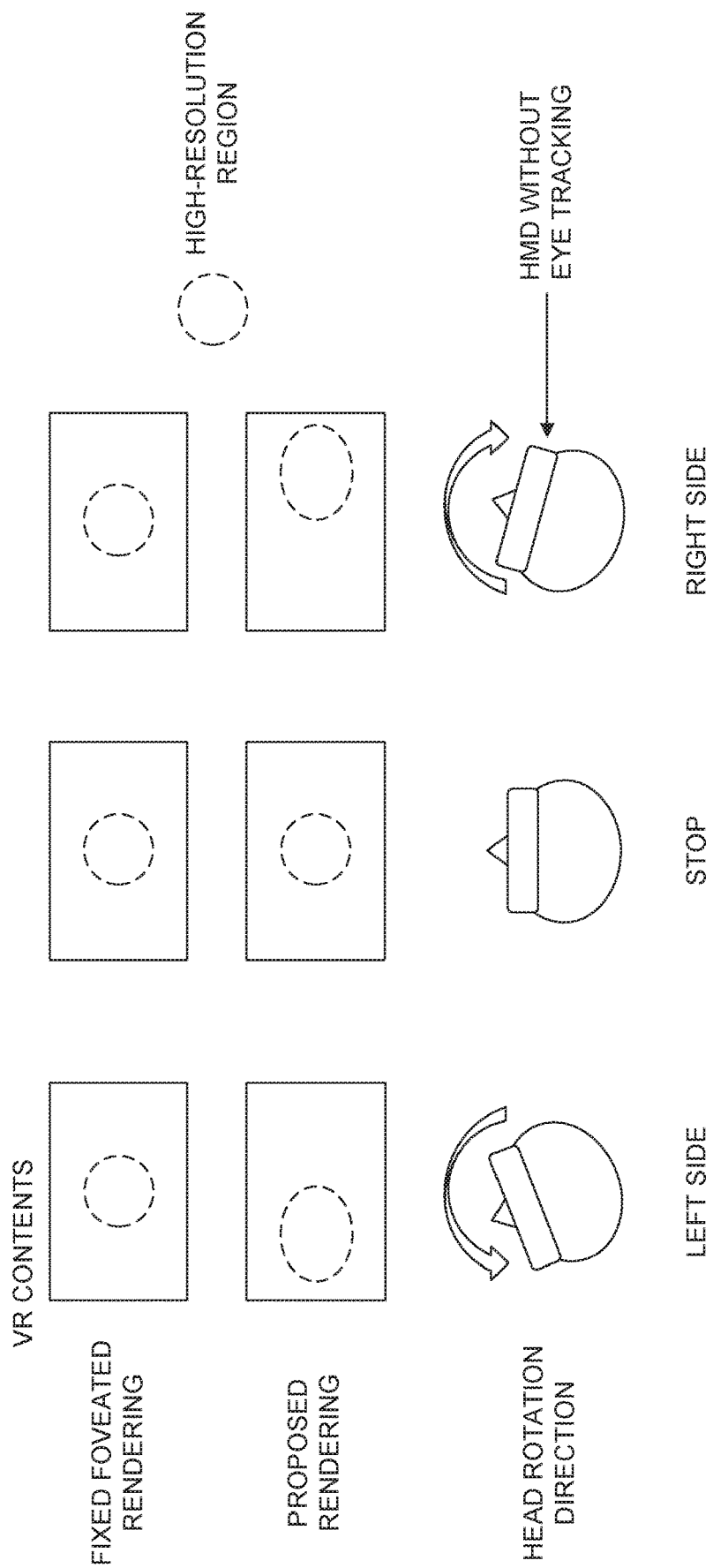
FIG. 31 depicts the rendering of high-resolution regions for different methods of foveated rendering.

FIG. 30 is an message sequence diagram of an example service session 3000 on with metadata-based c value calibration, in accordance with some embodiments. In the example service session 3000, the elements 3012-3026 correspond to elements 2912-2926 of the service session 2900 depicted in FIG. 29, and are performed in substantially the same manner. At step 3028 head orientation and rotation speed information (observed by the IMU) are provided to the VR contents server 3006. At 3030, the head orientation and rotation speed information are sent to the processor 3004. At 3032, the processor confirms that the new gaze holding phase has begun when the user's head rotation speed begins to decrease. At 3034, VR contents server 3006 sends VR contents information to the processor. The contents information (e.g. metadata) may be used to estimate the ROI. At 3036, the processor 3004 compares the estimated ROI with an expected ROI from metadata to calculate the error of the current c_value and performs a c_value calibration to determine the calibrated c_value, $c_{new}$, $c_{new}$ may be calculated, for example, using Eq. 6 above. At 3038, the renderer 3002 performs foveated rendering for the contents using the determined high-resolution region information and provides the foveated rendered content to the VR contents server 3006. At 3040, the VR contents server 3006 packetizes the received contents and sends the packets to user device 3008.

Examples in Accordance with Some Embodiments

Some embodiments identify the area the user is watching within the service frame by matching to the head orientation angle detected by IMU data to the eye position probability distribution functions. Unlike some example methods of estimating the ROI based on the rotational speed of the head, other example methods estimate, e.g., the position the user is watching on the panel of the HMD. Of course, it should be understood that combinations of these or other example methods may be used in accordance with some embodiments.

Figure 32:
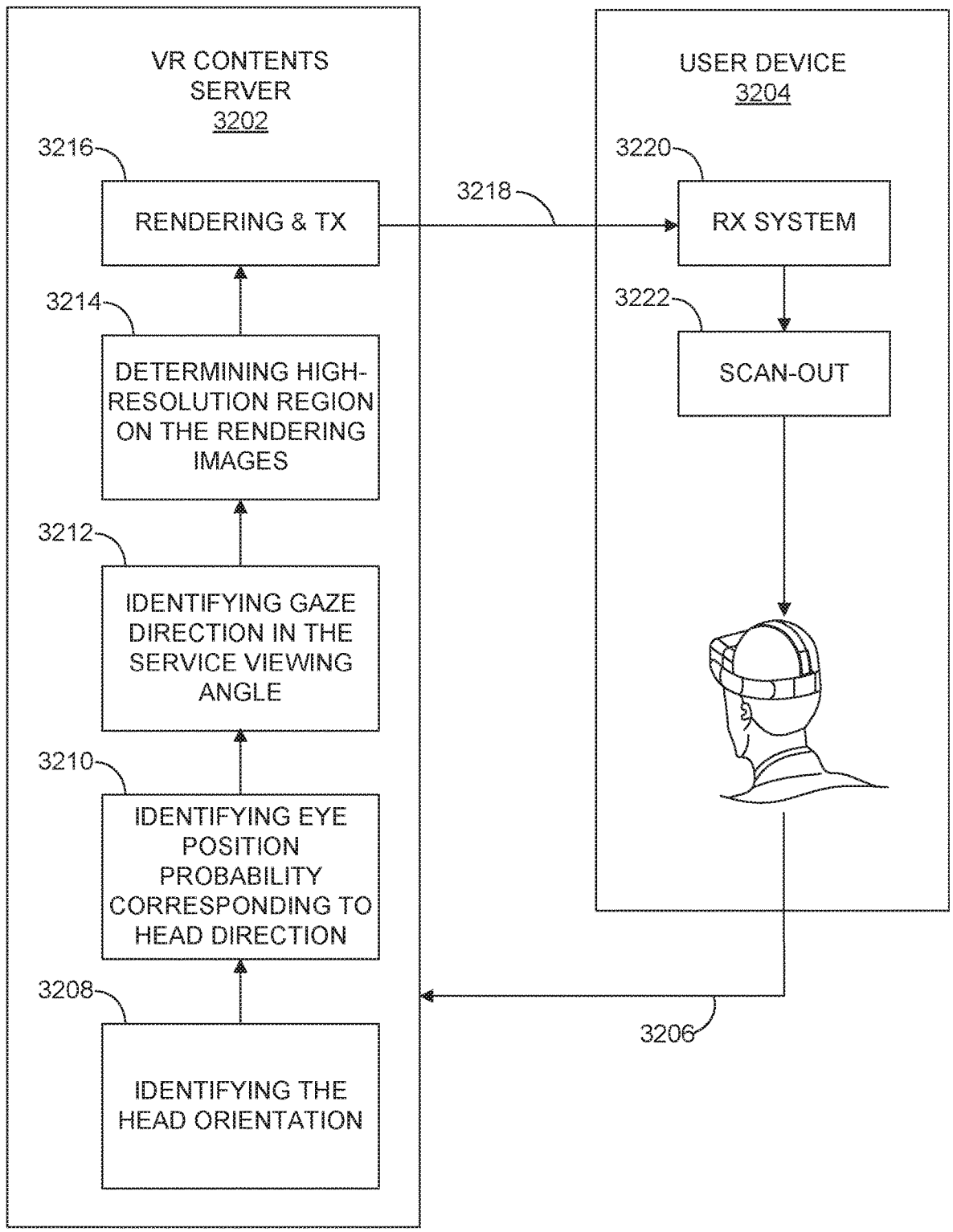
FIG. 32 is a process flow diagram of an example method in accordance with some embodiments.

FIG. 32 is a process flow diagram of an example method, in accordance with some embodiments. The example method in FIG. 32 begins at the point of receiving IMU data from the user device (e.g., example user device 3204) for convenience of explanation. However, it should be understood that processes of the VR system may be executed repeatedly as VR contents are played. The overall process of example method depicted in FIG. 32 is as follows. At 3206, VR contents server 3202 receives IMU data from user device 3208. At 3208, the head orientation of the user is identified. At 3210, the eye position probability distribution corresponding to the user's head direction is identified. At 3212, gaze direction (in the service viewing angle) is identified. In some embodiments, gaze direction is estimated based on the detected eye position and the probability distribution. At 3214, a location of the high-resolution region on the image is determined. At 3218, includes sending foveated rendered images (e.g. VR contents) are sent from VR contents server 3202 to user device 3204. Foveated rendered images may be received by RX system 3220. The method may further include, at 3224, scanning out the image on the user device. Details of the method in FIG. 32 are further elaborated in the steps below.

Step 1: Identifying Head Orientation

The VR contents server uses the IMU data received from the user device to check the head orientation of the user. The yaw and pitch values of the head orientation of the user are utilized. These values may be obtained from IMU data, as discussed previously.

Step 2: Eye Position Estimation

Figure 33:
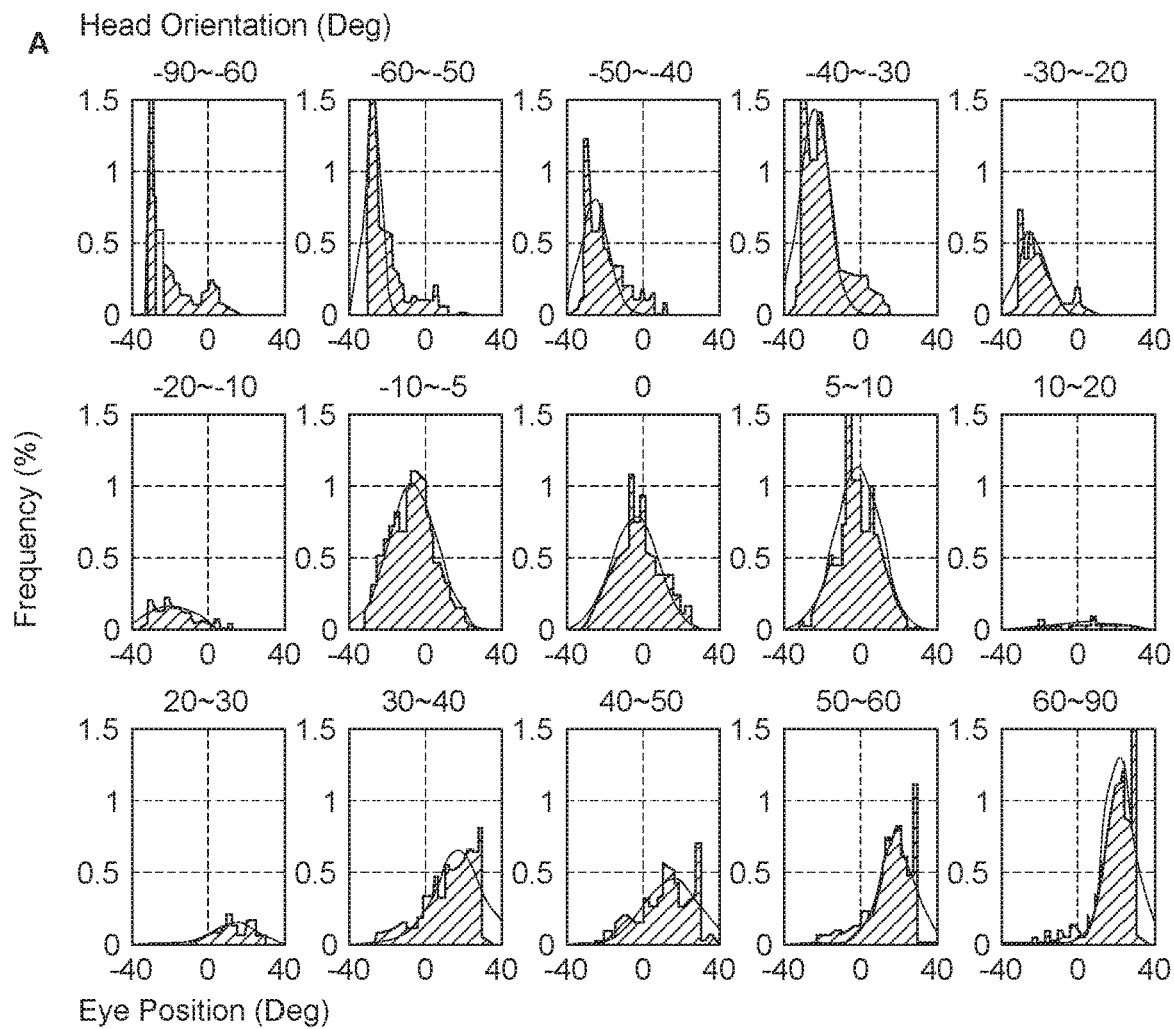
FIG. 33 illustrates the relationship between head orientation angle and eye position distribution about the yaw direction.
Figure 34:
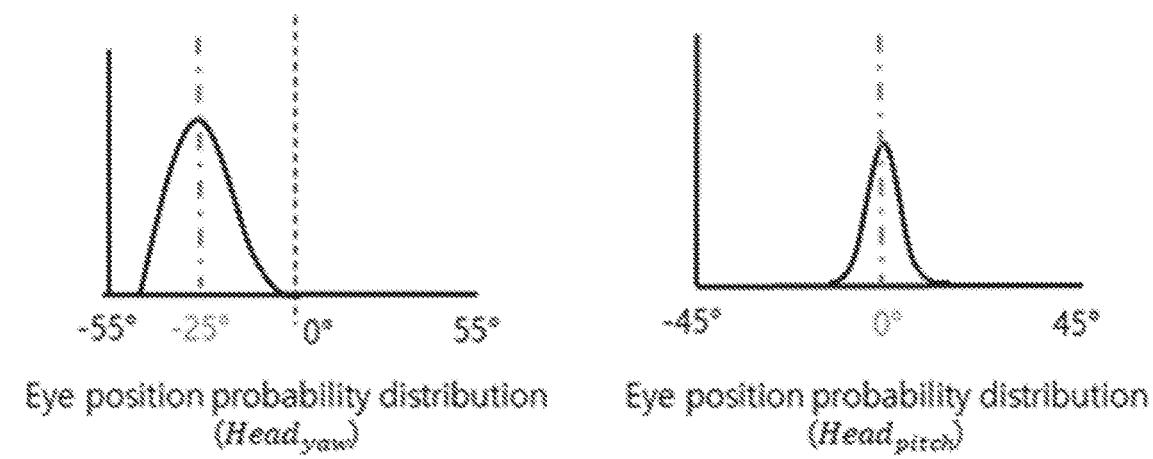
FIG. 34 depicts an example eye position probability distribution for a given head orientation.

The user's eye position may be estimated based on the observed user's head orientation ($Head_{yaw}$, $Head_{pitch}$). The system may utilize the relationship between head orientation and eye position (about yaw and pitch, respectively). The relationship between the two can checked by a probability distribution of the eye position for the head orientation, as illustrated in the example of FIG. 33 (adapted from Fang, Yu, et al. "Eye-head coordination for visual cognitive processing." *PloS one* 10.3 (2015): e0121035). The head orientation of the user identified in Step 1 is matched to the probability distribution graph to obtain the eye position probability distribution for the yaw and pitch directions. FIG. 34 depicts an example eye position probability distribution for a given head orientation.

The estimation of the eye position may be completed by taking the angle at which the eye position has the highest probability. For example, the estimated eye position in the FIG. 34 is (−25, 0) for the Yaw and Pitch axes, respectively.

Step 3: Identifying Gaze Direction in the Service Viewing Angle

Figure 35:
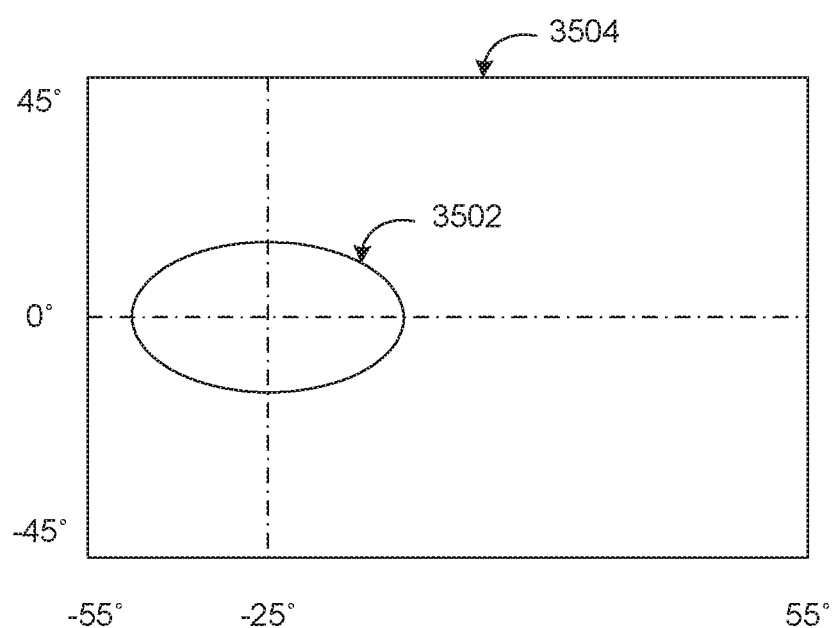
FIG. 35 depicts an example gaze estimation utilizing a probability distribution of eye position.

The eye position probability for the head direction has a distribution range, so it may be helpful to consider the range. Based on the eye position that has already been determined, a range of gaze is selected to include a certain amount of the eye position probability (e.g. 80%). In the probability graph shown in FIG. 34, the eye position probability has a wider distribution in the yaw axis. Consequently, it may be useful to determine a longer gaze range in the horizontal direction. FIG. 35. depicts an example gaze estimation utilizing a probability distribution of eye position, in accordance with some embodiments. In the example, the region 3502 represents an estimated gaze range in the service viewing angle 3504. The service viewing angle 3504 is 110° by 90°, although this viewing angle is provided merely as an example.

Step 4: Determining High-Resolution Region

For binocular images, gaze direction may be determined separately for each eye. This may be useful because the position of each eye is different when the user forms a certain gaze angle. Therefore, the high-resolution area of two images for each eyes may have different positions.

Figure 36:
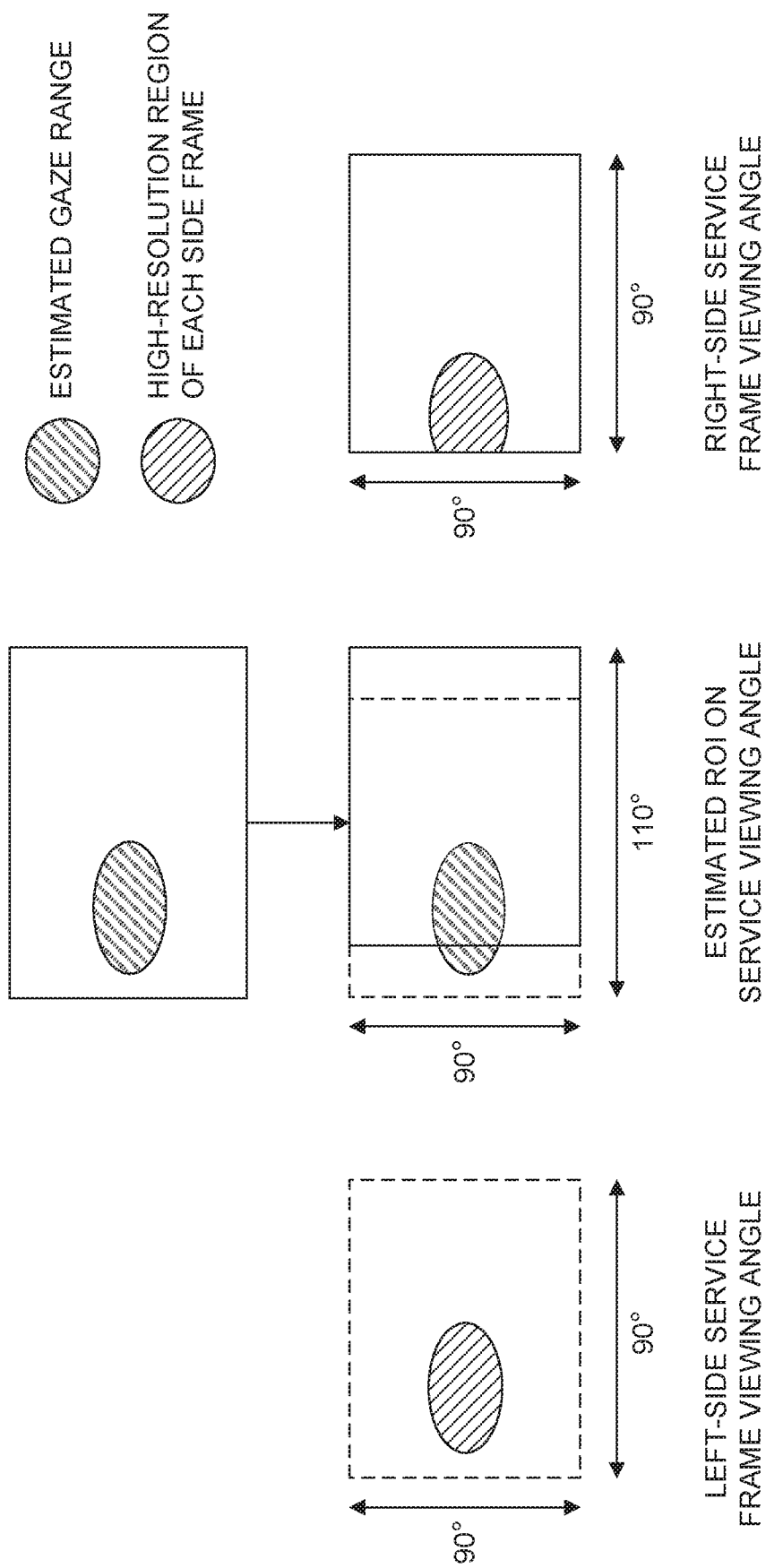
FIG. 36 depicts the determination of high-resolution regions, in accordance with some embodiments.

FIG. 36 depicts the determination of high-resolution regions, in accordance with some embodiments. The high-resolution rendering region may be extended by considering the user's head movement direction, similar to the methods previously described. That is, by extending the high-resolution area in the direction that the head rotates, even if the user device performs timewarping on the service frame, the high-resolution region still appears in the user's fovea. FIG. 37 depicts high-resolution region extension into the direction of head rotation, in accordance with some embodiments.

Example Implementations

In some scenarios, the ROI is estimated when the user turns his head and performs a single gaze change. One such example scenario is elaborated below.

Figure 38:
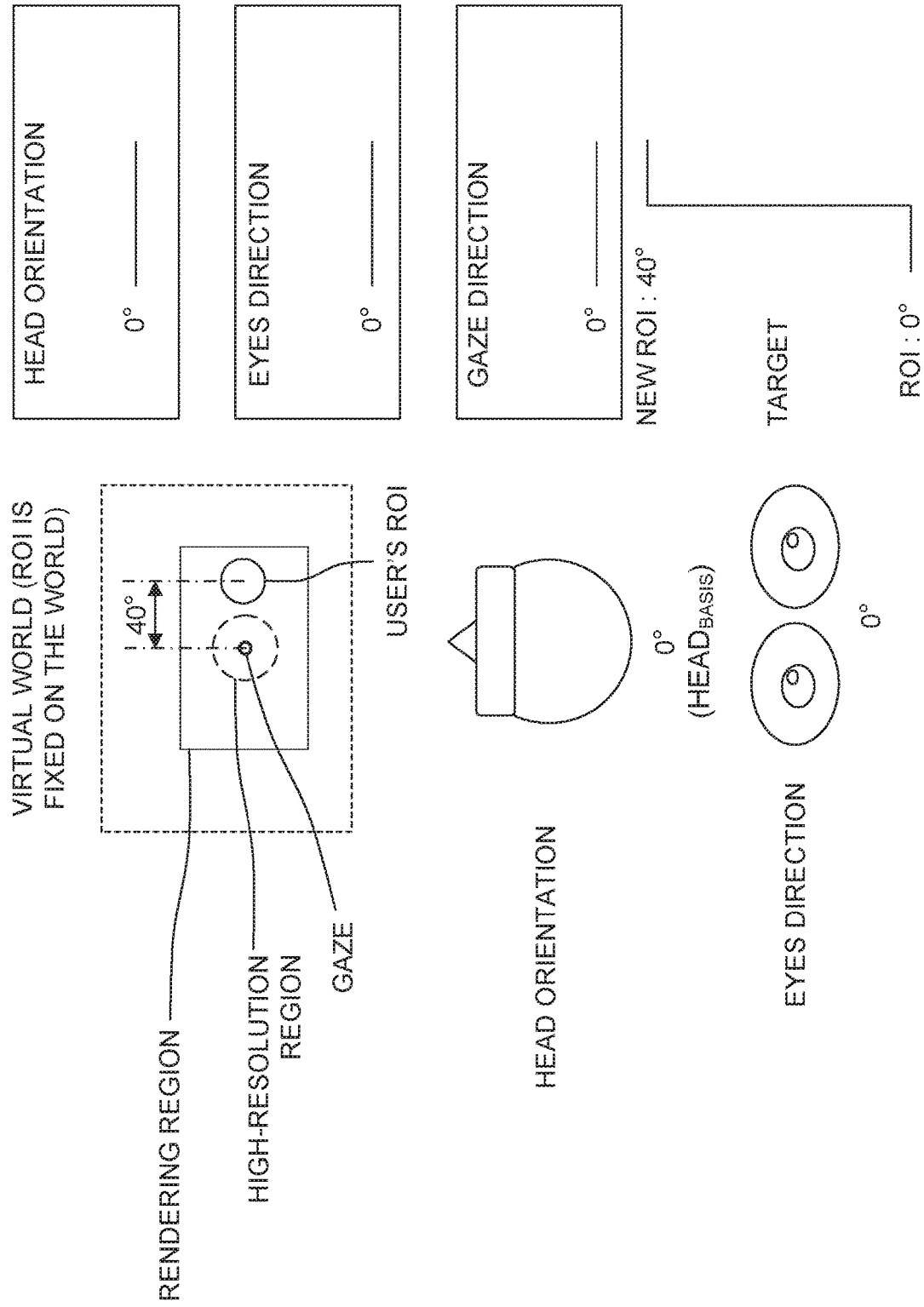
FIG. 38 depicts a user's gaze and a determined high-resolution region immediately after a change of ROI, in accordance with some embodiments.

First, the user's ROI is changing into right direction)(40° of the user's head direction. The user has not yet started to move their gaze for the changed ROI. Therefore, since there is no head motion of the user is identified via the IMU, the high-resolution region is determined to be in the center of the screen ($Head_{basis}$:0°. FIG. 38 depicts a user's gaze and a determined high-resolution region immediately after a change of ROI, in accordance with some embodiments.

Then, when the user starts to move his gaze, the user's head starts to rotate and the eyes starts to move in the direction of the ROI. This is the beginning of the gaze shifting phase. The eye movements are relatively fast compared to the rotation of the head, perform more of the gaze shift (during 0~0.1 sec). ROI is estimated by multiplying the peak speed observed by the IMU by a proportional constant of the user (reflecting the user's personal head motion characteristics). Because the maximum observed head rotation rate for a user is 10°/sec until 0.1 sec, the estimated ROI of the solution has been shifted 20° at 0.1 sec (using a proportional constant of 2 for the user). This calculation is shown in the equation below:

$$\text{Estimated ROI at 0.1 sec} = 0° (\text{Head}_{Basis}) + 2 \times 10° = 20° \quad \text{Eq. 7}$$

At the same time, in accordance with the example, a high-resolution area is determined based on the user's head rotation speed and direction. Consequently, an oval-shaped high-resolution area has been determined. As a result, the high-resolution area is rendered longer in the ROI direction while approaching the user's ROI.

Figure 39:
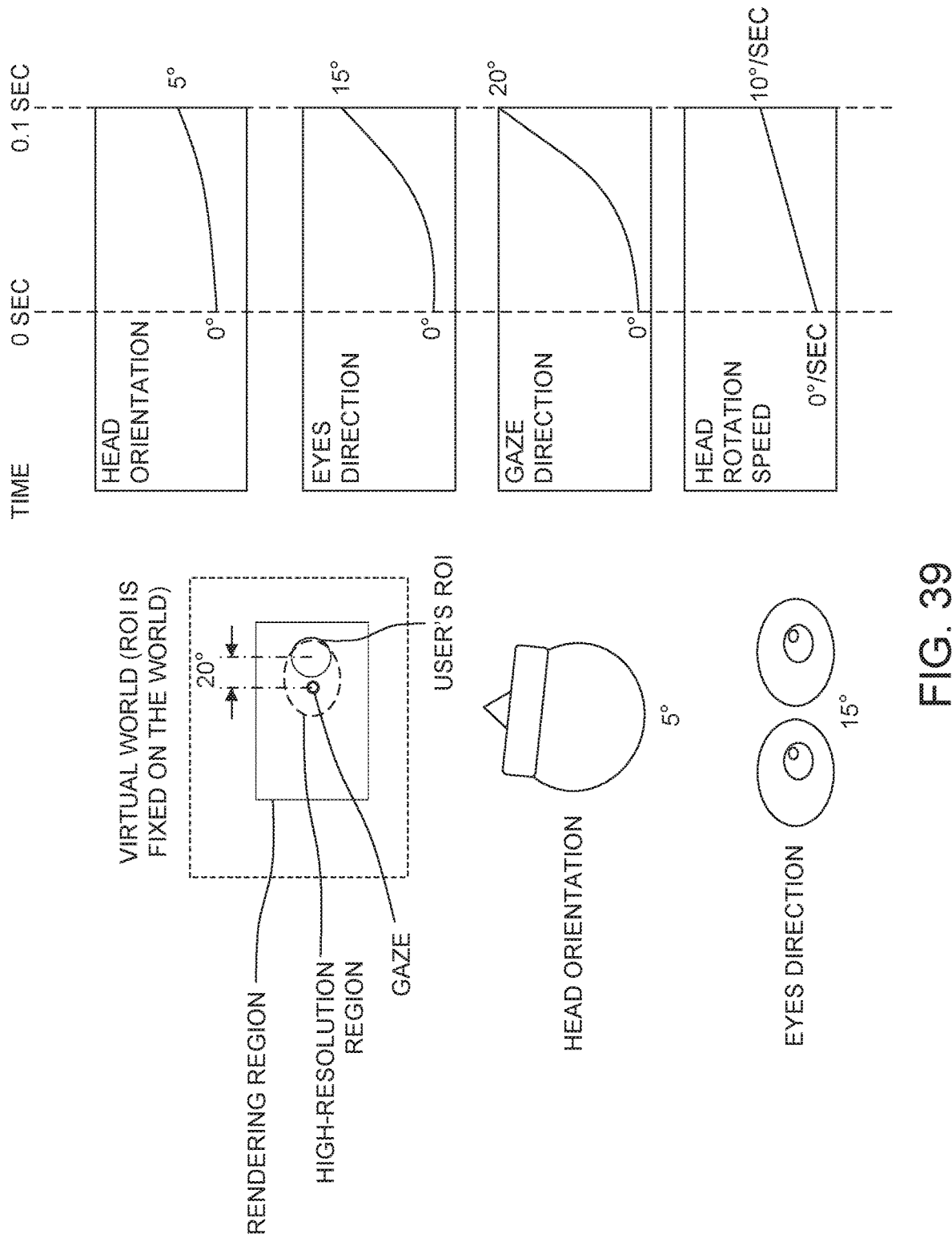
FIG. 39 depicts the initial head and eye movement and the determined high-resolution region at the beginning of the users gaze shift, in accordance with some embodiments.

FIG. 39 depicts the initial head and eye movement and the determined high-resolution region at the beginning of a user's gaze shift.

Next, the user accelerates his head continuously. A 0.2 sec, the ROI enters into the user's gaze and the gaze shift is completed. The estimated ROI matches the actual ROI of the user at 0.2 sec when head rotation speed has peak speed. This calculation is shown in the equation below:

$$\text{Estimated ROI at 0.2 sec} = 0° (\text{Head}_{Basis}) + 2 \times 20° = 40° \quad \text{Eq. 8}$$

Figure 40:
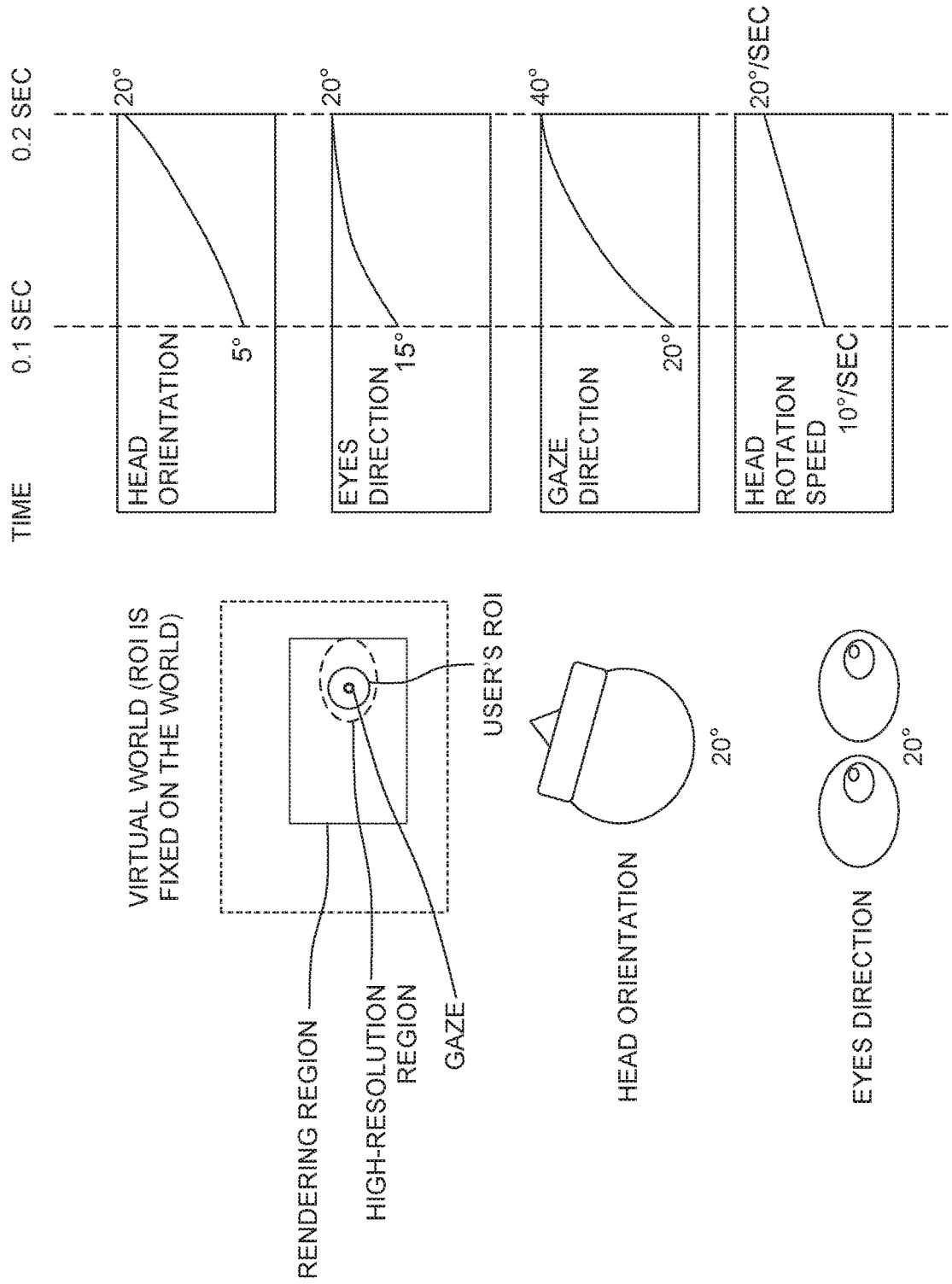
FIG. 40 depicts the head and eye movement and the determined high-resolution region during the users gaze shift, in accordance with some embodiments.

FIG. 40 depicts the head and eye movement and the determined high-resolution region during the users gaze shift. As illustrated in the figure, the high-resolution region is determined as an elongated shape to the right side due to the user's fast head rotation.

Then, the user's head moves in the direction of the ROI, but the speed is decreasing. This constitutes the gaze holding phase. During this time, the user's eyes move back to the center position to maintain the gaze on the ROI. During this interval, the user's peak head speed is 20°/sec, which is the value measured at 0.2 sec.

Figure 41:
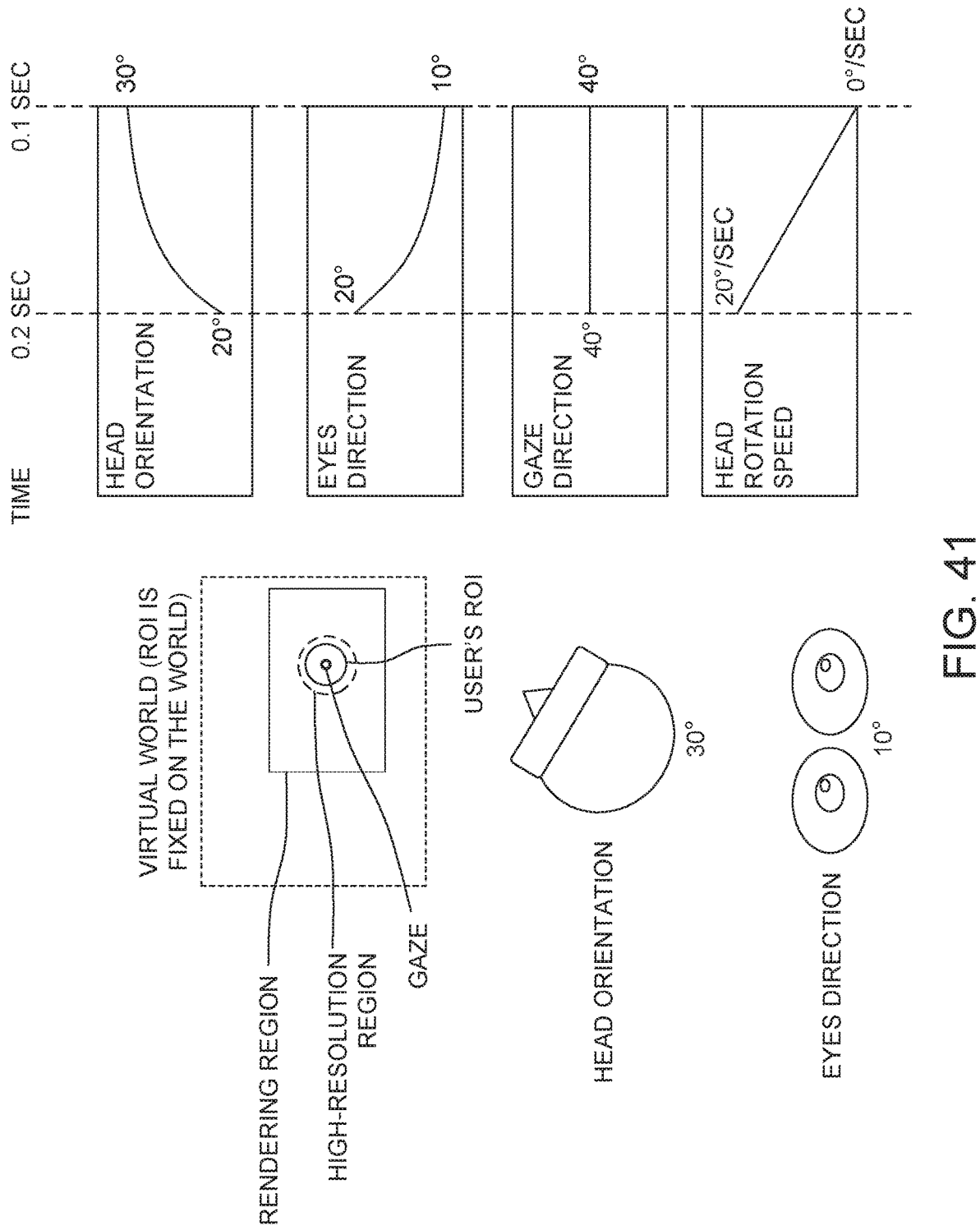
FIG. 41 depicts the head and eye movement and the determined high-resolution region after the user's gaze shift, in accordance with some embodiments.

FIG. 41 depicts the head and eye movement and the determined high-resolution region after the user's gaze shift. Because the head peak speed does not change within 0.2 to 0.3 sec, the estimated ROI does not change. On the other hand, as the user's head rotation speed decreases, the high-resolution area gradually recovers to a circular shape. At 0.3 sec, when the user's head rotation was stop, the high-resolution region becomes a complete circle shape surrounding the user's ROI. The estimated ROI is 40° and the calculation is the same as Eq. 8 above.

Figure 42:
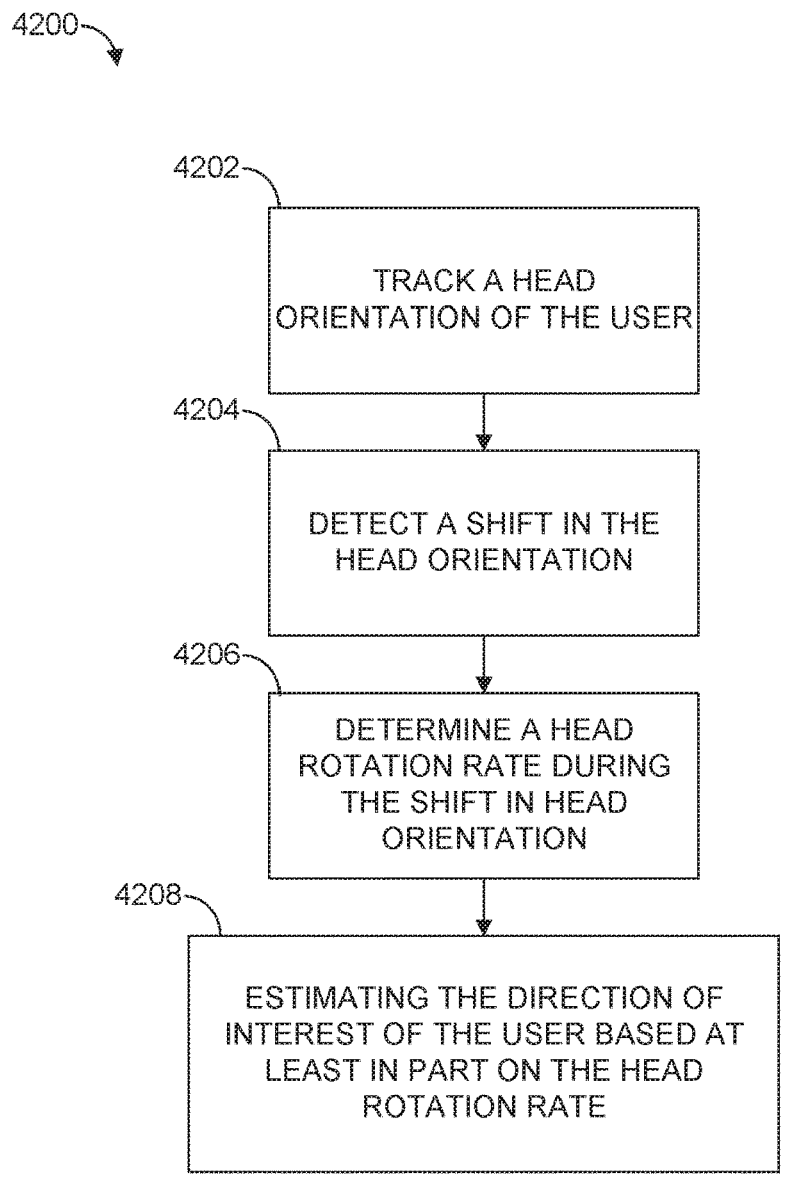
FIG. 42 is a flow diagram of an example method of estimating a direction of interest of a user in accordance with some embodiments.

FIG. 42 is a flowchart of an example method of estimating a direction of interest of a user in accordance with some embodiments. The method 4200 includes, at 4202, tracking a head orientation of the user. At 4204, a shift in the head orientation is detected. At 4206, a head rotation rate during the shift in head orientation is determined. At 4208, the direction of interest of the user is predicted based at least in part on the head rotation rate.

Figure 43:
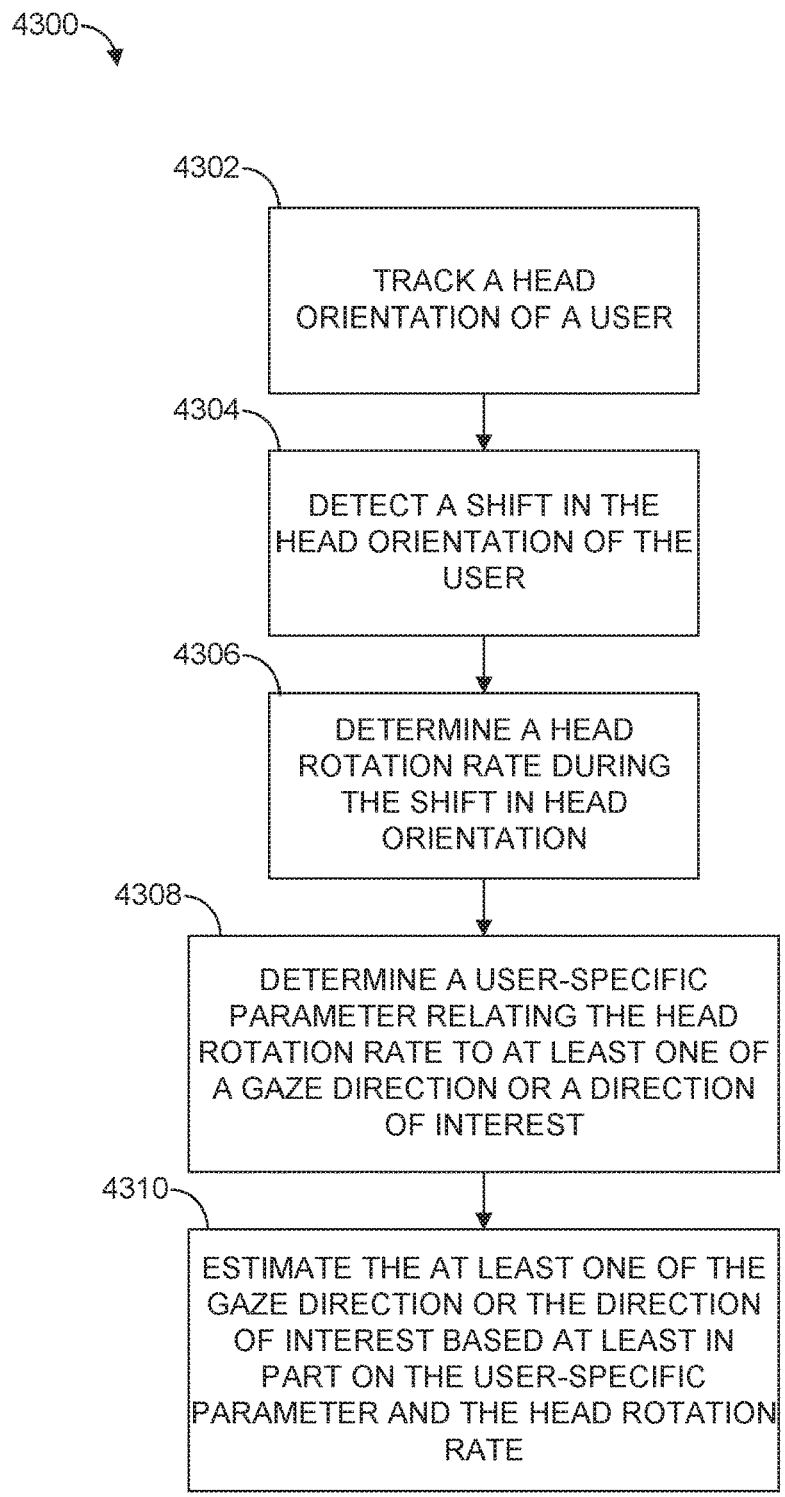
FIG. 43 is a flow diagram of an example method in accordance with some embodiments.

FIG. 43 is a flowchart of an example method, in accordance with some embodiments. The method 4300 includes, at 4302, tracking a head orientation of the user orientation.

At 4304, a shift in the head orientation is detected. At 4306, a head rotation rate during the shift in the head orientation is determined. At 4308 a user-specific parameter relating the head rotation rate to at least one of a gaze direction or a direction of interest is determined. At 4310, the at least one of the gaze direction or the direction of interest is estimated based at least in part on the user-specific parameter and the head rotation rate.

Figure 44:
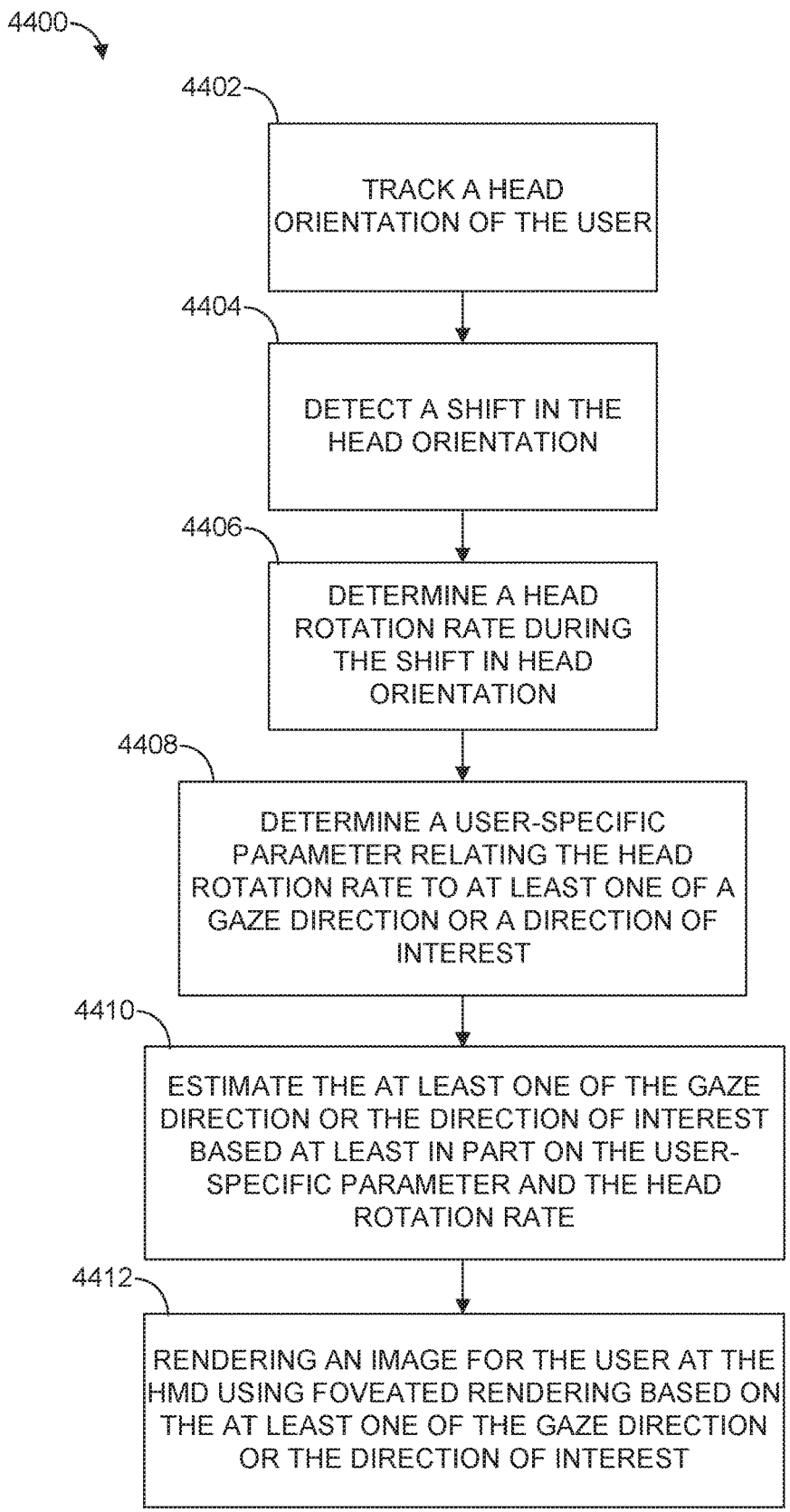
FIG. 44 is a flow diagram of an example method performed at least in part by a head-mounted display (HMD) configured to be worn by a user, in accordance with some embodiments.
Figure 46:
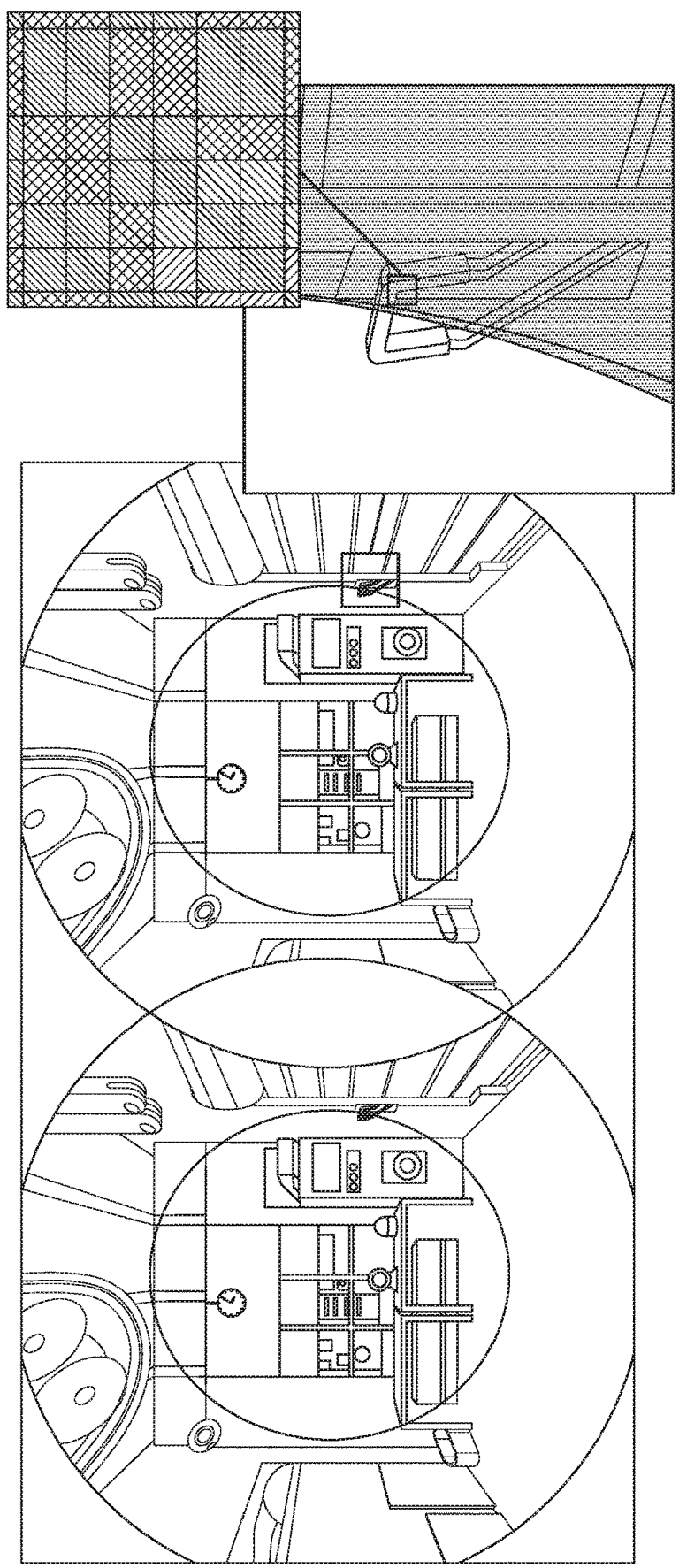
FIG. 46 illustrates radial density masking, a method used in foveated rendering
Figure 47:
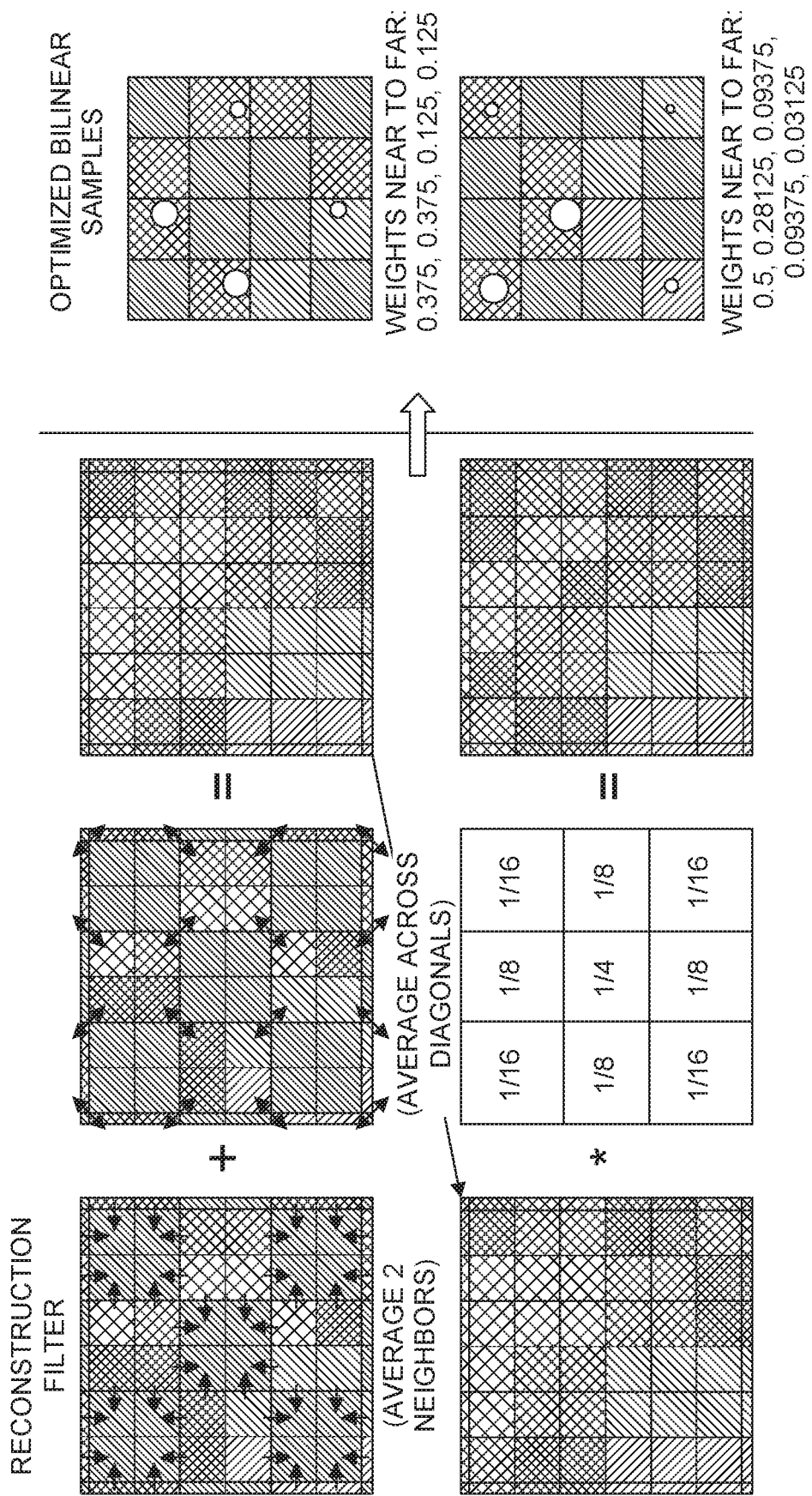
FIG. 47 depicts an example reconstruction filter.
Figure 48:
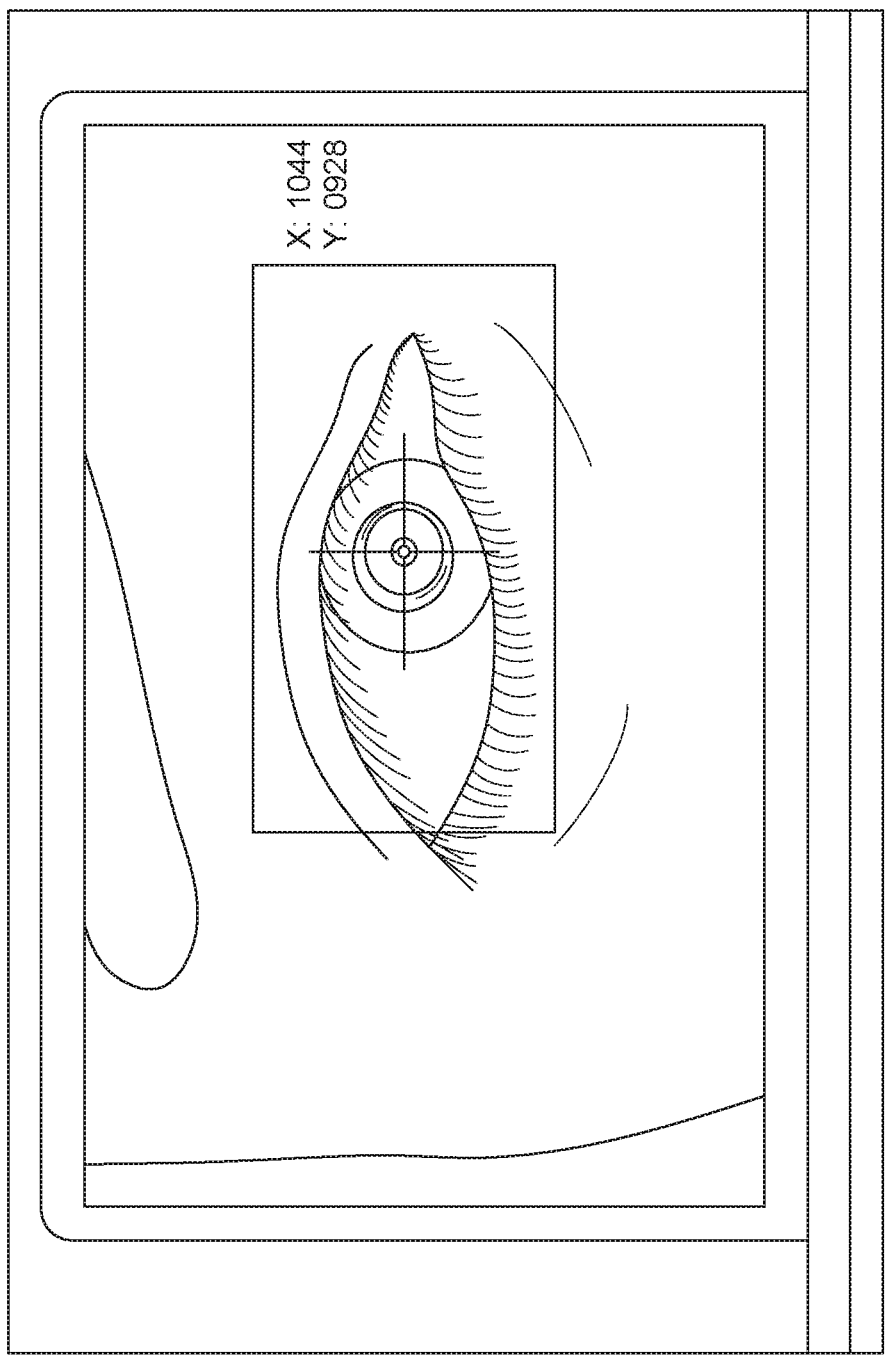
FIG. 48 depicts an example of eye tracking.
Figure 49:
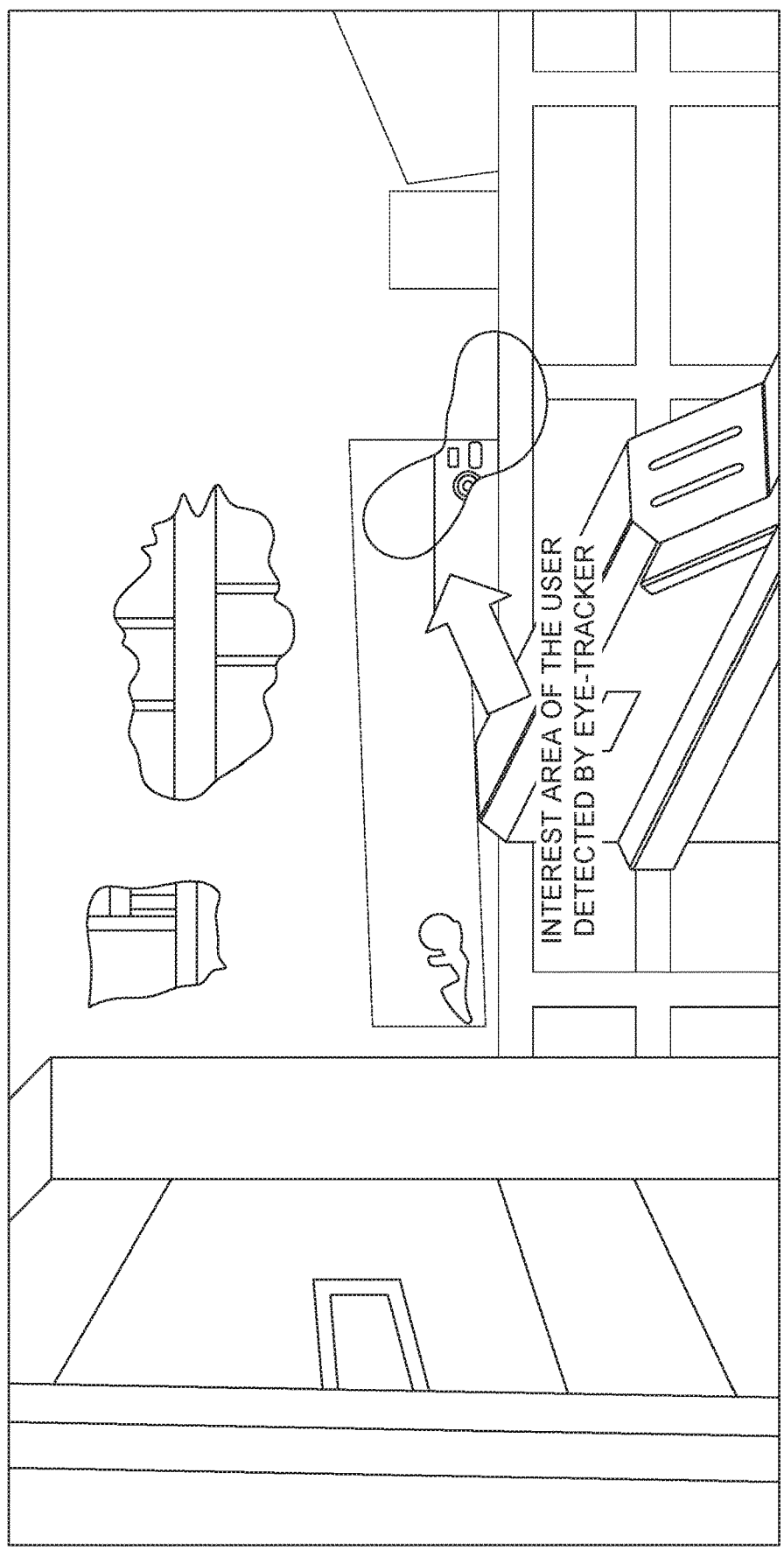
FIG. 49 depicts an example of area of interest detection using eye tracking.

FIG. 44 is a flowchart of a method performed at least in part by a head-mounted display (HMD) configured to be worn by a user, in accordance with some embodiments. The method 4400 includes, at 4402, tracking a head orientation of the user. At 4404, a shift in the head orientation is detected. At 4306, a head rotation rate during the shift in the head orientation is determined. At 4408 a user-specific parameter relating the head rotation rate to at least one of a gaze direction or a direction of interest is determined. At 4410, the at least one of the gaze direction or the direction of interest is estimated based at least in part on the user-specific parameter and the head rotation rate. At 4412, an image for the user is rendered at the HMD using foveated rendering based on the at least one of the gaze direction or the direction of interest.

An example method of estimating gaze direction of a user in accordance with some embodiments may include: tracking a user's head orientation; detecting a shift in the head orientation; determining a head rotation speed during the shift in head orientation; and predicting the gaze direction of the user based at least in part on the head rotation speed.

For some embodiments of the example method, tracking the head orientation may be performed using an inertial measurement unit.

For some embodiments of the example method, the method may be performed by a head-mounted display.

For some embodiments of the example method, detecting a shift in head orientation may include detecting that angular acceleration of the user's head exceeds a predetermined acceleration threshold.

For some embodiments of the example method, detecting a shift in head orientation may include detecting that the angular acceleration of the users head exceeds a predetermined threshold.

For some embodiments of the example method, determining a head rotation speed may include determining a maximum head rotation speed during the shift in head orientation.

For some embodiments of the example method, predicting the gaze direction may include adding an offset to a basis gaze direction, the offset being proportional to the head rotation speed.

Some embodiments of the example method may further include setting the basis gaze direction equal to the users head orientation in response to a determination that the head rotation speed is below a predetermined speed threshold.

Some embodiments of the example method may further include calculating the offset by multiplying the head rotation speed by a proportionality constant.

For some embodiments of the example method, the proportionality constant may depend on a direction of the head rotation.

For some embodiments of the example method, the proportionality constant may depend on a position of the head relative to a neutral position.

For some embodiments of the example method, the head rotation speed may be determined by subtracting a basis head rotation speed from a measured head rotation speed.

Some embodiments of the example method may further include rendering an image for the user using foveated rendering based on the predicted gaze direction.

Some embodiments of the example method may further include rendering an image for the user using foveated rendering, with a portion of the image toward the predicted gaze direction being rendered with higher quality than a portion of the image away from the predicted gaze direction.

Some embodiments of the example method may further include animating an avatar of the user using the predicted gaze direction as an avatar eye direction.

Some embodiments of the example method may further include determining user interest in an object based on the predicted gaze direction.

For some embodiments of the example method, the method may be performed without eye tracking.

Some embodiments of the example method may further include, in response to a determination that angular acceleration of the users head is decreasing, holding the predicted gaze direction at a substantially constant value.

Some embodiments of the example method may further include, in response to a determination that the user's head is in at least one predetermined central orientation, setting the predicted direction equal to the head orientation.

An example method of estimating gaze direction of a user in accordance with some embodiments may include: determining a users head orientation relative to predetermined central head orientation; and estimating the gaze direction based on the head orientation.

An example method in accordance with some embodiments may include estimating a users gaze direction based at least in part on an angular speed of the user's head movement.

Some embodiments of the example method may further include performing foveated rendering for the user based on the estimated gaze direction.

An example apparatus in accordance with some embodiments may be configured to perform any of the example methods listed above. For some embodiments of the example apparatus, the apparatus may be a head-mounted display.

Another example apparatus in accordance with some embodiments may include: a processor and a non-transitory computer-readable medium storing instructions operative, when executed on the processor, to perform any of the example methods listed above. For some embodiments of the example apparatus, the apparatus may be a head-mounted display.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

APPENDIX

```
%% C_value calculation (training session)
Numof_gaze_change=2; %Gaze change counter
Head_basis=zeros(1000);  % Observed head direction
Gaze_basis=zeros(1000); % Gaze_basis (to calculate gaze amplitude)
Gaze_amplitude=zeros(1000); % Observed amplitude of the gaze change (during
each gaze change)
Head_amplitude=zeros(1000); % Observed amplitude of the head direction
(during each gaze change)
Max_speed=zeros(1000); % Observed max_speed of the head rotation (during each
gaze change)
speed_basis=zeros(1000); % Head_speed basis
Gaze_change=zeros(1000); % logged index to confirm the timing of gaze change
Right_max=zeros(1,10000); % Observed max head rotation speed (in the right
direction)
Right_amp=zeros(1,10000); % Observed gaze amplitude(right)
Left_max=zeros(1,10000); % Observed max head rotation speed (in the left
direction)
Left_amp=zeros(1,10000); % Observed gaze amplitude(left)
Eye_x=zeros(1,10000); % Eye_position (horizontal)
New_Head_Ori=zeros(1,10000); % Recently observed head orientation
Head_speed=zeros(1,10000); % Recently observed head rotation speed
New_Gaze=zeros(1,10000); % Recently observed gaze direction (Head orientation
+ Eye position)
Time=zeros(1,10000);
Timeinterval=zeros(1,10000);
Datasize=40000 ;
%$$$$$$ X is the log file data $$$$$$$
for i=1:1:Datasize
if mod(i,9)==1 % X(mod(i,9)  =   time log
Time(mod(i,9)+floor(i/9))=X(i);
elseif mod(i,9)==6 % X(mod(i,6)  =   Head orientation (horizontal)
New_Head_Ori(mod(i,9)+floor(i/9))=X(i) -166;
elseif mod(i,9)==8 % X(mod(i,8)  =   Eye position (x axis)
Eye_x(mod(i,9)+floor(i/9))=X(i);
end
end
%$$$$$$$$$$$$$$$$$$$$$$$$$$$$$$$$$$$$
% Some eye position log has zero value (due to error).
for i=2:1:Datasize/9
     if Eye_x(i)==0
        Eye_x(i)=Eye_x(i-1); % correct error value (replaced immediately
preceding value)
     end
end
%$$$$$$$$$$$$$$$$$$$$$$$$$$$$$$$$$$$$$$$$$$$$$$$$$$
for i=30:1:4330   %   reallocate log file index and calculate head speed, gaze
direction (index   =   30~4330 => 1~4301)
   Timeinterval(i-29)=Time(i)-Time(i-1); % Time interval of logged data
   if Timeinterval(i-29)>100 | | Timeinterval(i-29)< -100
        Timeinterval(i-29)=11;            % correct error value
   end
   Head_speed(i-29)=(New_Head_Ori(i)-New_Head_Ori(i-1))/Timeinterval(i-29);
% Head speed calculation (Amount of the head orientation changes/Time
interval)
   New_Gaze(i-29)=New_Head_Ori(i)+((Eye_x(i)-0.5)*110);  %   Gaze direction
(Head orientation + Eye direction) ##The recorded eye position has a value of
0 ~ 1, so we converted that to 0 ~ 110deg
                                                        % 110deg =>
horizontal FOV
   New_Head_Ori(i-29)=New_Head_Ori(i);
end
New_speed_smooth=smoothdata(Head_speed, 'rloess',85)*1000; %loess , 75
state=3;
for   i=2:1:4300
    if (abs(New_speed_smooth(i))-abs(New_speed_smooth(i-1)))<= -0.5 | |
abs(New_speed_smooth(i))   <   1  % The head is fixed or facing the front. That
is, the previous gaze shifting phase has ended.
```

APPENDIX-continued

```
            if state ~= 0
               Numof_gaze_change=Numof_gaze_change+1; % Increase Gaze change count
               state=0;
            end
            % Update each basis value to estimate the next ROI.
            Gaze_basis(Numof_gaze_change)=(New_Gaze(i)); % Gaze_basis update
            Head_basis(Numof_gaze_change)=(New_Head_Ori(i)); % Head_basis update
            speed_basis(Numof_gaze_change) = (New_speed_smooth(i));   % speed_basis update
            % Update done
       elseif  (abs(New_speed_smooth(i))-abs(New_speed_smooth(i-1))) > 0.5 &&
New_speed_smooth(i) > 0.5 % Gaze shifting & right direction (during acceleration)
            Max_speed(Numof_gaze_change)=abs(New_speed_smooth(i)-speed_basis(Numof_gaze_change));  % Max speed logging & updating
            Right_max(Numof_gaze_change)=abs(New_speed_smooth(i)-speed_basis(Numof_gaze_change));  % Max speed logging & updating (for c_right)
            Gaze_amplitude(Numof_gaze_change)=abs((New_Gaze(i))-Gaze_basis(Numof_gaze_change));  % Gaze_amplitude logging & updating
            Right_amp(Numof_gaze_change)=abs((New_Gaze(i))-Gaze_basis(Numof_gaze_change));  % Gaze amplitude logging & updating (right direction)
            Head_amplitude(Numof_gaze_change)=abs((New_Head_Ori(i)-Head_basis(Numof_gaze_change))); % Head orientation amplitude
            Gaze_change(Numof_gaze_change)=i;
            state=1;
       elseif (abs(New_speed_smooth(i))-abs(New_speed_smooth(i-1))) > 0.5 &&
New_speed_smooth(i) < -0.5 % For left direction
            Max_speed(Numof_gaze_change)=abs(New_speed_smooth(i)-speed_basis(Numof_gaze_change)); %same as right direction
            Left_max(Numof_gaze_change)=abs(New_speed_smooth(i)-speed_basis(Numof_gaze_change));
            Gaze_amplitude(Numof_gaze_change)=abs((New_Gaze(i))-Gaze_basis(Numof_gaze_change));
            Left_amp(Numof_gaze_change)=abs((New_Gaze(i))-Gaze_basis(Numof_gaze_change));
            Head_amplitude(Numof_gaze_change)=abs((New_Head_Ori(i)-Head_basis(Numof_gaze_change)));
            Gaze_change(Numof_gaze_change)=i;
            state=2;
       end
end
%Trained c_values (using training session data)
% c_value_right=sum(Right_amp) / sum(Right_max);
% c_value_left=sum(Left_amp) / sum(Left_max);
%% ROI_estimation
c_value_right=0.6244;  %  training session result
c_value_left=0.6003;
Gaze_state=0; % Gaze shifting =1,  Gaze holding = 0
Numof_gaze_change=2; %Gaze change counter
Head_basis=zeros(1000); % Observed head direction
ROI_basis=zeros(1,1000); % ROI_basis
Head_amplitude=zeros(1000); % Observed amplitude of the head direction (during each gaze change)
Max_speed=zeros(1000); % Observed max_speed of the head rotation (during each gaze change)
speed_basis=zeros(1000); % Head_speed basis
Gaze_change=zeros(1000); % logged index to confirm the timing of gaze change
Predicted_gaze=zeros(1,10000); % Predicted gaze point (Estimated ROI)
Right_max=zeros(1,10000); % Observed max head rotation speed (in the right direction)
Left_max=zeros(1,10000); % Observed max head rotation speed (in the left direction)
Error=zeros(1,10000);
Error_Head=zeros(1,10000);
state=3; % state  initial value ( state = 0 => Gaze holding, state = 1 => Rotate right, state = 2 => Rotate left)
for i=2:1:4300
    if (abs(New_speed_smooth(i))-abs(New_speed_smooth(i-1)))<= -0.5 ||
abs(New_speed_smooth(i) ) < 1 % The head is fixed or facing the front. That is, the previous gaze shifting phase has ended.
            if state ~= 0
            Numof_gaze_change=Numof_gaze_change+1; % Increase Gaze change count
            state=0;
       end
       % Update each basis value to estimate the next ROI.
       Head_basis(Numof_gaze_change)=(New_Head_Ori(i)); % Head _basis
```

APPENDIX-continued

```
update
          speed_basis(Numof_gaze_change) = (New_speed_smooth(i) ); %
speed_basis update
          ROI_basis(Numof_gaze_change)=New_Head_Ori(i); % ROI_basis update
          % Update done
    elseif (abs(New_speed_smooth(i))-abs(New_speed_smooth(i-1))) >0.5 &&
New_speed_smooth(i) > 0.5 % Gaze shifting & right direction
          Max_speed(Numof_gaze_change)=abs(New_speed_smooth(i)-
speed_basis(Numof_gaze_change) ); % Max speed logging & updating
          Right_max(Numof_gaze_change)=abs(New_speed_smooth(i)-
speed_basis(Numof_gaze_change) ); % Max speed logging & updating (for c_right)
          Head_amplitude(Numof_gaze_change)=abs((New_Head_Ori(i)-
Head_basis(Numof_gaze_change))); % Head orientation amplitude
          Gaze_change(Numof_gaze_change)=i;
          if state == 0
             state=1;
          end
    elseif (abs(New_speed_smooth(i))-abs(New_speed_smooth(i-1))) > 0.5 &&
New_speed_smooth(i) < -0.5
          Max_speed(Numof_gaze_change)=abs(New_speed_smooth(i)-
speed_basis(Numof_gaze_change) ); %same as right direction
          Left_max(Numof_gaze_change)=abs(New_speed_smooth(i)-
speed_basis(Numof_gaze_change));
          Head_amplitude(Numof_gaze_change)=abs((New_Head_Ori(i)-
Head_basis(Numof_gaze_change)));
          Gaze_change(Numof_gaze_change)=i;
          if state == 0
             state=2;
          end
      else % Adding ROI offset (during constant velocity rotation) - Offset was
simply applied
ROI_basis(Numof_gaze_change)=ROI_basis(Numof_gaze_change)+(New_Head_Ori(i)-
New_Head_Ori(i-1) );
      end
      if (abs(New_speed_smooth(i))-abs(New_speed_smooth(i-1)))<=  0 % gaze
holding phase
      Predicted_gaze(i)=Predicted_gaze(i-1);
    elseif New_Head_Ori(i)/New_Head_Ori(i-1) < 0 % To eliminate the cumulated
error, predicted gaze is initialized as the head crosses the front
          Predicted_gaze(i)=ROI_basis(Numof_gaze_change);
    elseif abs(New_speed_smooth(i))-abs(New_speed_smooth(i-1)) > 0 &&
(New_speed_smooth(i) ) > 0 % Gaze prediction (ROI_basis * weighted c_value *
speed_amplitude
Predicted_gaze(i)=ROI_basis(Numof_gaze_change)+(c_value_right*(1+Head_basis(N
umof_gaze_change) / 80)*(New_speed_smooth(i)-speed_basis(Numof_gaze_change)));
%c_value_left*(1+ROI_basis(Numof_gaze_change) / 100)
    else %abs(New_speed_smooth(i))-abs(New_speed_smooth(i-1)) > 0 &&
(New_speed_smooth(i) ) < 0
          Predicted_gaze(i)=ROI_basis(Numof_gaze_change)+(c_value_left*(1-
Head_basis(Numof_gaze_change) / 80)*(New_speed_smooth(i)-
speed_basis(Numof_gaze_change)));
%c_value_left*(1+ROI_basis(Numof_gaze_change) / 100)
    end
    if i<4271&& i > 70
    Error(i)=abs(abs(Predicted_gaze(i))-abs(New_Gaze(i+20))); %Calculating
predictive error (about gaze direction after 250m5)
    Error_Head(i)=abs(abs(New_Head_Ori(i))-abs(New_Gaze(i+20))); %Calculating
head-eye error (about gaze direction after 250ms)
    end
end
plot(Predicted_gaze(100:4300));
hold on
plot(New_Gaze(100:4300));
hold on
plot(New_Head_Ori(100:4300));
figure( )
plot(Error);
Avg_error_Prediction=sum(Error) /4200;
Avg_error_Head=sum(Error_Head) /4200;
```

What is claimed is:

1. A method comprising:
   tracking a head orientation of a user;
   detecting a shift in the head orientation of the user;
   determining a head rotation speed of the user during the shift in the head orientation;
   determining a user-specific parameter relating the head rotation speed to at least one of a gaze direction or a direction of interest; and
   estimating the at least one of the gaze direction or the direction of interest based at least in part on the user-specific parameter and the head rotation speed.

2. The method of claim 1, wherein determining the head rotation speed comprises determining a difference between a maximum head rotation speed during the shift in head orientation and an initial head rotation speed measured prior to the shift in head orientation.

3. The method of claim 1, wherein determining the user-specific parameter comprises:
   determining a predicted change in gaze direction; and
   determining the user-specific parameter by comparing the head rotation speed to the predicted change in gaze direction.

4. The method of claim 3, further comprising:
   directing the user to shift gaze from a first region of interest on a display to a second region of interest on the display,
   wherein the predicted change in gaze direction is equivalent to an angular distance between the first region of interest and the second region of interest on the display.

5. The method of claim 4, wherein directing the user to shift gaze from the first region of interest on the display to the second region of interest on the display comprises generating, at the display, a virtual object at a location on the display associated with the second region of interest.

6. The method of claim 3, wherein determining the predicted change in gaze direction comprises determining a predicted change in gaze direction based at least in part on metadata particular to content being shown to the user on the display.

7. The method of claim 1, wherein determining the user-specific parameter comprises:
   in a training mode, determining an initial value of the user-specific parameter; and
   in a service mode, updating the initial value of the user-specific parameter based at least in part on metadata particular to content being shown to the user on the display.

8. The method of claim 1, further comprising:
   adjusting the user-specific parameter based on a direction of the head rotation of the user.

9. The method of claim 1, wherein estimating the at least one of the gaze direction or the direction of interest comprises estimating a change in direction by multiplying a head orientation speed by the user-specific parameter.

10. The method of claim 9, wherein estimating the at least one of the gaze direction or the direction of interest further comprises:
    estimating the gaze direction by:
       identifying an initial gaze direction; and
       adding the estimated change in direction to the initial gaze direction.

11. The method of claim 10, further comprising:
    determining that the head rotation speed is substantially constant for a time period during the shift in head orientation; and
    wherein estimating the gaze direction further comprises:
       adding an offset to the estimated change in direction and the initial gaze direction.

12. The method of claim 9, wherein estimating the at least one of the gaze direction or the direction of interest further comprises:
    estimating the direction of interest by:
       identifying an initial direction of interest; and
       adding the estimated change in direction to the initial direction of interest.

13. The method of claim 12, further comprising:
    determining that the head rotation speed is substantially constant for a time period during the shift in head orientation; and
    wherein estimating the direction of interest further comprises:
       adding an offset to the estimated change in direction and the initial direction of interest.

14. The method of claim 1, further comprising, in response to a determination that an angular acceleration of the user's head is decreasing, holding the at least one of the gaze direction or the direction of interest at a substantially constant value.

15. The method of claim 1, further comprising rendering, at a display of an HMD, a first region having a first resolution and a second region having a second resolution, wherein the first resolution is greater than the second resolution, and wherein the first region corresponds to the at least one of the gaze direction or the direction of interest.

16. The method of claim 1, further comprising rendering an image at a display of an HMD using foveated rendering based on at least one of the estimated gaze direction or the estimated direction of interest.

17. The method of claim 1, further comprising rendering an image using foveated rendering, with a portion of the image toward the at least one of the estimated gaze direction or the estimated direction of interest being rendered with higher quality than a portion of the image away from the at least one of the estimated gaze direction or the estimated direction of interest.

18. The method of claim 1, further comprising animating an avatar of the user using the at least one of the estimated gaze direction or the estimated direction of interest as an avatar eye direction.

19. A method, performed at least in part by a head-mounted display (HMD) configured to be worn by a user, comprising:
    tracking a head orientation of the user;
    detecting a shift in the head orientation;
    determining a head rotation speed during the shift in the head orientation;
    determining a user-specific parameter relating head rotation speed to at least one of a gaze direction or a direction of interest;
    estimating the at least one of the gaze direction or the direction of interest based at least in part on the user-specific parameter and the head rotation speed; and
    rendering an image for the user at the HMD using foveated rendering based on the at least one of the gaze direction or the direction of interest.

20. An apparatus comprising:
a processor; and
a memory storing instructions operative, when executed by the processor, to cause the apparatus to:
track a head orientation of a user;
detect a shift in the head orientation of the user;
determine a head rotation speed of the user during the shift in the head orientation;
determine a user-specific parameter relating the head rotation speed to at least one of a gaze direction or a direction of interest; and
estimate the at least one of the gaze direction or the direction of interest based at least in part on the user-specific parameter and the head rotation speed.

* * * * *